(12) United States Patent
Schneider

(10) Patent No.: US 7,136,932 B1
(45) Date of Patent: Nov. 14, 2006

(54) FICTITIOUS DOMAIN NAME METHOD, PRODUCT, AND APPARATUS

(76) Inventor: Eric Schneider, 13944 Cedar Rd. #258, University Heights, OH (US) 44118

( * ) Notice: Subject to any disclaimer, the term of this patent is extended or adjusted under 35 U.S.C. 154(b) by 0 days.

(21) Appl. No.: 09/532,500

(22) Filed: Mar. 21, 2000

Related U.S. Application Data

(60) Provisional application No. 60/175,825, filed on Jan. 13, 2000, provisional application No. 60/160,125, filed on Oct. 18, 1999, provisional application No. 60/157,075, filed on Oct. 1, 1999, provisional application No. 60/143,859, filed on Jul. 15, 1999, provisional application No. 60/135,751, filed on May 25, 1999, provisional application No. 60/130,136, filed on Apr. 20, 1999, provisional application No. 60/125,531, filed on Mar. 22, 1999.

(51) Int. Cl.
*G06F 15/16* (2006.01)

(52) U.S. Cl. ................ 709/245; 709/223; 709/222; 709/217

(58) Field of Classification Search ............... 709/245, 709/220, 223, 222, 217
See application file for complete search history.

(56) References Cited

U.S. PATENT DOCUMENTS

| | | | | |
|---|---|---|---|---|
| 5,664,170 | A * | 9/1997 | Taylor | 395/200.5 |
| 5,764,906 | A | 6/1998 | Edelstein et al. | |
| 5,812,776 | A | 9/1998 | Gifford | |
| 6,009,459 | A | 12/1999 | Belfiore et al. | |
| 6,151,624 | A * | 11/2000 | Teare et al. | 709/217 |
| 6,182,148 | B1 | 1/2001 | Tout | 709/245 |
| 6,314,469 | B1 * | 11/2001 | Tan et al. | 709/245 |
| 6,338,082 | B1 * | 1/2002 | Schneider | 709/203 |
| 6,430,623 | B1 * | 8/2002 | Alkhaitb | 709/245 |
| 6,678,717 | B1 * | 1/2004 | Schneider | 709/203 |
| 6,836,805 | B1 * | 12/2004 | Cook | 709/245 |
| 2002/0073233 | A1 | 6/2002 | Gross | 709/245 |

FOREIGN PATENT DOCUMENTS

| | | |
|---|---|---|
| WO | WO09922488 A2 | 5/1999 |
| WO | WO09939275 A1 | 8/1999 |

OTHER PUBLICATIONS

Statement of the policy oversight committee, The Economic Structure of Internet Generic Top-Level Domain Name Registries Analysis and Recommendation, Jul. 23, 1998.*
Berners-Lee T., "RFC 1630: Universal Resource Identifiers in WWW—A Unifying Syntax for the Expression of Names and Addresses of Objects on the Network as used in the World-Wide Web", IETF, Jun. 1994, <http://www.faqs.org/rfcs/rfc1630.html>.

(Continued)

*Primary Examiner*—Jason Cardone
*Assistant Examiner*—Adnan Mirza

(57) ABSTRACT

When a network resource request having a domain name is received, it can be determined whether the domain name is a fictitious domain name (FDN). For instance, the highest level domain (HLD) of a domain name that is determined not resolvable is called a top level domain alias (TLDA) and such a domain name is a FDN having a TLDA. Rather than displaying an error message upon determining that a domain name is (fictitious) a FDN, instead a URL having a resolvable domain name can be generated. Content if any, may then be located, presented, displayed, notified, and/or accessed accordingly. For example, the autosearch feature of a web browser can be enabled to provide further resolution processing by generating and/or resolving a resolvable domain name upon detecting a FDN from a received domain name.

56 Claims, 31 Drawing Sheets

OTHER PUBLICATIONS

Mockapetris P., "RFC 1035: Domain Names—Implementation and Specification", IETF, Nov. 1987, <http://www.faqs.org/rfcs/rfc1035.html>.

Harrenstien K., Stahl M., and Feinler E., "RFC 954: Nicname/Whois", IETF, Oct. 1985, <http://www.faqs.org/rfcs/rfc954.html>.

Crowe, Robert "The Telephone Exchange Name Project", Web Site(1998), from <http://ourwebhome.com/TENP/TENproject.html>.

NTIA-DOC, "Improvement of Technical Management of Internet Names and Addresses", Federal Register V63 N34, Feb. 20, 1998, from <http://www.ntia.doc.gov/ntiahome/domainname/022098fedreg.htm>.

NTIA-DOC, "RFC on the enhancement of the .us Domain Space", Aug. 4, 1998, from <http://www.ntia.doc.gov/ntiahome/domain-name/usrfc/dotusrfc.htm>.

Wired News Report, "The Postal Proposal", Wired News, May 8, 1999, from <http://www.wired.com/news/technology/0,1282,131-30,00.html>.

Wired News Report, "Deep Space Web?", Wired News, Jul. 22, 1999, from <http://www.wired.com/news/technology/0,1282,139-09,00.html>.

Oakes, Chris, "Internet Keywords Patent Spat", Wired News, Jul. 22, 1999, from <http://www.wired.com/news/technology/0,1282,-13892,00.html>.

* cited by examiner

| Default | Zip Code | City | State |
|---|---|---|---|
| T | 44114 | cleveland | oh |
| T | 44115 | cleveland | oh |
| F | 44116 | cleveland | oh |
| T | 44116 | rockyriver | oh |
| F | 44117 | cleveland | oh |
| T | 44117 | euclid | oh |
| T | 44118 | cleveland | oh |
| F | 44118 | clevelandheights | oh |
| F | 44118 | eastcleveland | oh |
| F | 44118 | shakerheights | oh |
| F | 44118 | universityheights | oh |

| Row | Location Field | Generated URI |
|---|---|---|
| 1 | example.com<br>www.example.com<br>http://www.example.com | http://www.example.com:80/index.html |
| 2 | example.company | http://example.com<br>http://company.example.com<br>http://example.company.com<br>http://example.com/company/index.html<br>http://example.com/example.company/<br>http://example.com/example/company/<br>http://example.com/pany/index.html |
| 3 | free.love:to | http://free.to<br>http://love.free.to<br>http://free.love.to<br>http://free.to/love |
| 4 | 800.555.1212 | http://www.1212.800.555.com |
| 5 | http://example.44106<br>http://example.44106:us | http://example.cleveland.oh.us |
| 6 | foo@bar.company | mailto:foo@bar.com |

*Fig. 13*

| Name | TLD | Registrant | Address | Phone Number | E-mail | Password | Expiration | Etc. |
|---|---|---|---|---|---|---|---|---|
| name.game | .net | John Doe | 123 Main St. NYC | 212.555.TLDA | info@tlda.com | tlda555 | 200003221200 | demo |
| top.stories | .to | Jane Smith | Cleveland, OH | 216.555.NAME | 555@tut.net | L342 | 200002062236 | geog |

| Name | TLD |
|---|---|
| name.game | .net |
| top.stories | .to |
| best.buys | .com |

| Name | Method | Scheme | Web | Domain | TLD | Port | Path | Component |
|---|---|---|---|---|---|---|---|---|
| top.stories | 3 | http:// | www | example | .to | :80 | count/top.stories | search string |
| search.now | 2 | ftp:// | www2 | | | :21 | | stuff |
| name.game | 4 | | | name | .net | | | etc. |

| Method Name | Method # | Rank | Example/Function | Form |
|---|---|---|---|---|
| Truncate | 3 | 1 | top.stories=top.st | SLD.TLD |
| Replace | 1 | 2 | top.stories=top.to | SLD.TLD |
| Path | 4 | 3 | top.stories=top.to/stories | SLD.TLD/TLDA |
| Rotate | 5 | 4 | top.stories=stories.top.to | TLDA.SLD.TLD |
| Append | 9 | 5 | top.stories=top.stories.to | SLD.TLDA.TLD |
| Delimit | 2 | 6 | top.stories=top.st/ories | SLD.TLD/A |
| Reverse | 8 | 7 | top.stories.today=today.stories.top.to | TLDA.SLD.3LD.TLD |
| Custom | 16 | 8 | top.com.today=today.top.com | TLDA.3LD.SLD |
| Query | 6 | 9 | top.stories=top.com/cgi-bin/index.cgi?tlda=stories | |
| PURI | 7 | 10 | top.stories=top.com/any/path/equals/stories | |
| Netword | 15 | 11 | top.stories=somename.com | |
| Centraal | 14 | 12 | top.stories=anothername.com | |
| ZipNames | 10 | 13 | top.stories=yetanothername.com | |
| Netscape | 13 | 14 | top.stories=onemorename.com | |
| Microsoft | 11 | 15 | top.stories=microsoft.com/news | |
| AOL | 12 | 16 | top.stories=aol.com/topstories | |

Dear John,

TLDA is pleased to introduce to you how to get started on the Internet right away with your very own TLDA name.

If you don't have a way to connect to the Internet then ask a friend who is on-line or go to your local library and come to our website WWW.TLDA.COM and learn how you can register and use your very own TLDA name.

You can give your new TLDA name to friends or print your TLDA name on your business card so people know how to reach you on the Internet!!

We have reserved a few names for you to try risk free.
John.Doe 
123.Coventry  2030
Smithtown.Pizza 
Coventry.Wine 

Come to our web site and type or scan in any TLDA names listed above.

If you are not interested in the names we have set aside for you, then you can trade them in and pick another name to get started with the TLDA name service.

If you'd like-- call our toll free number for more information or to reserve your TLDA name right away!

Sincerely,
Your local TLDA representative

*Fig. 20b*

FICTITIOUS DOMAIN NAME METHOD, PRODUCT, AND APPARATUS

RELATED APPLICATIONS

This application claims the benefit of the following provisional patent applications, which are hereby incorporated by reference:

1. U.S. Provisional Application Ser. No. 60/175,825 filed Jan. 13, 2000, by Schneider, entitled "Method and apparatus for determining the availability of similar identifiers across naming systems."

2. U.S. Provisional Application Ser. No. 60/160,125 filed Oct. 18, 1999, by Schneider, entitled "Method and system for integrating resource location, search services, and registration services."

3. U.S. Provisional Application Ser. No. 60/157,075 filed Oct. 1, 1999, by Schneider, entitled "Method and apparatus for integrating resource location and registration services of valid and fictitious domain names."

4. U.S. Provisional Application Ser. No. 60/143,859 filed Jul. 15, 1999, by Schneider entitled "Method and apparatus for generation, registration, resolution, and emulation of name space."

5. U.S. Provisional Application Ser. No. 60/135,751 filed May 25, 1999, by Schneider entitled "Method and system for name space resolution."

6. U.S. Provisional Application Ser. No. 60/130,136 filed Apr. 20, 1999, by Schneider entitled "Method and system for integrating resource location and registration services."

7. U.S. Provisional Application Ser. No. 60/125,531 filed Mar. 22, 1999, by Schneider entitled "Method and system for the emulation of name space."

FIELD OF THE INVENTION

This invention generally relates to name space, and more specifically relates to a method, product, and apparatus for more effectively using domain name space.

DOCUMENT DISCLOSURE PROGRAM

The application for patent is based on a disclosure filed on Jul. 17, 1998, as Disclosure Document No. 442,796 under the Document Disclosure Program.

BACKGROUND OF THE INVENTION

In the same way that a street address represents a location in the physical world, a domain name can be used to represent a location on the Internet. In the physical world, one relies on both street addresses and the postal system to send information back and forth between individuals and organizations. On the Internet, one relies on the Domain Name System (DNS) to translate domain names into Internet addresses.

In general, names are thought of as discrete emblems used to establish or designate identity; addresses are thought of as emblems designating location. Domain names might seem to be unusual because they appear to be both names and addresses; they both locate and identify Internet resources. Yet people's personal names, for example, establish identity, and such identifiers travel with the individual rather than changing when the person changes location. Street addresses or geographic names, by contrast, are more static in order to establish location. Yet such addresses and geographic names also serve to identify the physical place, differentiating it from other places.

Geographic names of all kinds—street addresses, zip codes, counties—are in fact overlays on an unchanging numerical system of longitude and latitude, which is a universally recognized designator and locator for a particular place on the earth's surface. In this sense, geographic names are much like Internet domain names, which are an overlay of Internet address number designations.

Name space is a set of names in which all names are unique. Address space is a set of addresses in which all addresses are unique. Names are commonly used as mnemonic devices to help remember information. For instance, names are used to remember telephone numbers, and domain names are used to remember Internet addresses.

Currently, national phone numbers take the form of an international dialing code, area code, prefix, and number (e.g., 1-212-555-1212). During the turn of the century, phone companies built "exchanges" known as Central Offices to serve a certain geographical area. The exchange was named after the first prefix installed in that office. Before phones had dials on them, an operator connected the caller's request to the name of the exchange and number, such as Spring 3456 or Pennsylvania 5000. In the late 1920's, once dials started appearing on phones, a caller could connect the phone number by first dialing the first three letters of the exchange and then the number. For example, the caller would dial the S-P-R in Spring and then the 3456 or the P-E-N in Pennsylvania 5000. Back then, phone numbers were written with the dialed letters capitalized such as SPRing 3456 and PENnsylvania 5000, as a mnemonic device.

By the 1930s, large cities were dropping the third letter from the dialing routine and replacing it with a number, in order to increase the available numbers for each exchange. So numbers such as SPRing 3456 would become SPring2-3456 and PENnsylvania 5000 would become PEnnsylvania6-5000. This simple change added 80,000 new numbers to existing exchanges. Exchange names helped foster a sense of place, and community, in the same way that cities do. For over 30 years exchange names were published in phone directories and had become common use worldwide.

Area codes were being used up faster by the early 1960's than was predicted in 1947 when the area code scheme was finalized as part of the North American Numbering Plan (NANP). As a result, exchange names were continually being reassigned causing confusion and aggravation in communities throughout major cities in the country. During the early 1970's, as exchange names were phased out and 1-800 toll free numbers introduced, industry recognized and extended the use of mnemonics for commercial advertising and name branding. During the 1980's, 1-800 names were popularized to the point where brokers would buy names with the hope of selling or leasing the 1-800 names from their growing portfolio. In fact, courts have almost unanimously held that telephone mnemonics may be protected as trademarks. In recent years, the shortage of seven letter names used as a mnemonic device led to the strategy for obtaining telephone numbers that correspond to eight and nine letter names. In recent years, two new toll free exchanges (1-888, 1-877) were added because of the saturation of 1-800 numbers. Exchange names are but one example of name space. A recent area of worldwide concern is the allocation of name space on the Internet.

The Internet is a vast computer network having many smaller networks that span the world. A network provides a distributed communicating system of computers that are interconnected by various electronic communication links and computer software protocols. Because of the Internet's distributed and open network architecture, it is possible to transfer data from one computer to any other computer world wide. In 1991, the World-Wide-Web (WWW or Web) revolutionized the way information is managed and distributed through the Internet.

The Web is based on the concept of hypertext and a transfer method known as Hypertext Transfer Protocol (HTTP) which is designed to run primarily over a Transmission Control Protocol/Internet Protocol (TCP/IP) connection that employs a standard Internet setup. A server computer can provide the data and a client computer can display or process it. TCP can then convert messages into streams of packets at the source, then reassembles them back into messages at the destination. Internet Protocol (IP) handles addressing, seeing to it that packets are routed across multiple nodes and even across multiple networks with multiple standards. HTTP protocol permits client systems connected to the Internet to access independent and geographically scattered server systems also connected to the Internet.

HTTP provides a method for users to obtain data objects from various hosts acting as servers on the Internet. User requests for data objects are made by means of a HTTP request, such as a GET request. A GET request is comprised of the GET request keyword, the full path of the data object, the name of the data object, and a HTTP protocol version, such as "HTTP/1.0". In the following GET request, a request is being made for the data object with a path name of "/example/" and a name of "file.html":

GET/example/file.html HTTP-Version

Processing of a GET request entails the establishing of an TCP/IP connection with the server named in the GET request and receipt from the server of the data object specified. After receiving and interpreting a request message, a server responds in the form of a HTTP RESPONSE message. Response messages begin with a status line comprising a protocol version followed by a numeric Status Code and an associated textual Reason Phrase. Space characters separate these elements. The format of a status line is as follows: Status-Line=HTTP-Version Status-Code Reason-Phrase The status line always begins with a protocol version and status code, e.g., "HTTP/1.0 200". The status code element is a three-digit integer result code of the attempt to understand and satisfy a prior request message. The reason phrase is intended to give a short textual description of the status code. The first digit of the status code defines the class of response. There are five categories for the first digit. 1XX is an information response. It is not currently used. 2XX is a successful response, indicating that the action was successfully received, understood and accepted. 3XX is a redirection response, indicating that further action must be taken in order to complete the request. 4XX is a client error response. This indicates a bad syntax in the request. Finally, 5XX is a server error. This indicates that the server failed to fulfill an apparently valid request.

Client side browsers, such as Netscape Navigator or Microsoft Internet Explorer provide efficient graphical user interface (GUI) based client applications that implement the client side portion of the HTTP protocol. One format for information transfer is to create documents using Hypertext Markup Language (HTML). HTML pages are made up of standard text as well as formatting codes that indicate how the page should be displayed. The client side browser reads these codes in order to display the page. A web page is static when it requires no variables to display information or link to other predetermined web pages. A web page is dynamic when arguments are passed which are either hidden in the web page or entered from the client browser to supply the necessary inputs displayed on the web page. Common Gateway Interface (CGI) is a standard for running external programs from a web server. CGI specifies how to pass arguments to the executing program as part of the HTTP server request. Commonly, a CGI script takes the name and value arguments from an input form of a first web page which is used as a query to access a database server and generate an HTML web page with customized data results as output that is then passed back to the client browser for display.

The Web is a means of accessing information on the Internet that allows a user to "surf the web" and navigate the Internet resources intuitively, without technical knowledge. The Web dispenses with command-line utilities, which typically require a user to transmit sets of commands to communicate with an Internet server. Instead, the Web is made up of millions of interconnected web pages, or documents, which can be displayed on a computer monitor. Hosts running special servers provide the Web pages. Software that runs these Web servers is relatively simple and is available on a wide range of computer platforms including PC's. Equally available is a form of client software, known as a Web browser, which is used to display Web pages as well as traditional non-Web files on the client system.

A Uniform Resource Identifier (URI) is a compact string of characters for identifying an abstract or physical resource. URIs are the generic set of all names and addresses that refer to objects on the Internet. URIs that refer to objects accessed with existing protocols are known as Uniform Resource Locators (URLs). A URL is the address of a file accessible on the Internet. The URL contains the name of the protocol required to access the resource, a domain name or IP address that identifies a specific computer on the Internet, and a hierarchical description of a file location on the computer. In addition, the last (optional) part of the URL may be a "query string" preceded by "?" or a "fragment identifier" preceded by "#". The fragment identifier indicates a particular position within the specified file. For example the URL "http://www.example.com:80/index.html#appendix", where "http" is the scheme or protocol, "www.example.com" is the host server name or Fully Qualified Domain Name (FQDN), "80" is the port connection for the HTTP server request, "index.html" is the filename located on the server, and "appendix" is the identifier to display a specific portion of the HTML file called "index". The URL "http://www.example.com" also retrieves an HTML file called "index" on the HTTP server called "example.com". By default, when either a port or filename is omitted upon accessing a HTTP server via a URL, the client browser interprets the request by connecting via port 80, and retrieving the HTML file called "index".

Similar to a URL, postal codes were developed to provide a hierarchical description for locating a post office. In June 1962, the Presidential appointed Advisory Board of the Post Office Department, after a study of its overall mechanization problems, made several primary recommendations. One was that the Department give priority to the development of a coding system, called the ZIP (Zoning Improvement Plan) Code, a five-digit code assigned to every address throughout the country. The first digit designated a broad geographical area of the United States, ranging from zero for the Northeast to nine for the far West. This was followed by two digits that more closely pinpointed population concentrations and those sectional centers accessible to common transportation networks. The final two digits designated small post offices or postal zones in larger zoned cities.

Introduced in 1983, the ZIP+4 code added a hyphen and four digits to the existing five-digit ZIP Code. The first five numbers continued to identify an area of the country and delivery office to which mail is directed. The sixth and seventh numbers denote a delivery sector, which may be several blocks, a group of streets, a group of post office boxes, several office buildings, a single high-rise office building, a large apartment building, or a small geographic area. The last two numbers denote a delivery segment, which might be one floor of an office building, one side of a street between intersecting streets, specific departments in a firm, or a group of post office boxes.

Because an Internet address is a relatively long string of numbers (e.g., 31.41.59.26) that is difficult to remember, Internet users rely on domain names, memorable and sometimes catchy words corresponding to these numbers, in order to use electronic mail (e-mail) and to connect to Internet sites on the Web. The DNS is a set of protocols and services on a network that allows users to utilize domain names when looking for other hosts (e.g., computers) on the network. DNS is composed of a distributed database of names. The names in the DNS database establish a logical tree structure called the domain name space. Each node or domain in the domain name space is named and can contain subdomains. Domains and subdomains are grouped into zones to allow for distributed administration of the name space.

The DNS provides a mechanism so backup databases can be identified in case the first one becomes unavailable. DNS databases are updated automatically so that information on one name server does not remain out-of-date for long. A client of the DNS is called a resolver; resolvers are typically located in the application layer of the networking software of each TCP/IP capable machine. Users typically do not interact directly with the resolver. Resolvers query the DNS by directing queries at name servers, which contain parts of the distributed database that is accessed by using the DNS protocols to translate domain names into IP addresses needed for transmission of information across the network.

The Berkeley Internet Name Domain (BIND) implements an Internet name server for the UNIX operating system. The BIND consists of a name server and a resolver library. BIND is fully integrated into UNIX network programs for use in storing and retrieving host names and addresses by calling a routine from the resolver library called gethostbyname( ) which returns the IP address corresponding to a given Internet host name. Error return status from gethostbyname( ) is indicated by return of a NULL pointer.

At the heart of Netscape client products lies the Netscape Network Library (netlib). A necessity of any network based client browser application is to send and receive data over a connection. This is accomplished in netlib by making a call to NET_GetURL( ). Among NET_GetURL( )'s arguments is a URL_Struct which contains the actual URL to be retrieved. When a call to NET_GetURL( ) is made, a connection is established between the client making the request and the host machine named in the URL, a request is sent in a particular format specified by the protocol (e.g., http, ftp), and data is received by the client, from the host machine.

In order to resolve host names, netlib uses a standard DNS lookup mechanism. NET_FindAddress( ) makes the gethostbyname( ) call to lookup the IP address for the specified host from a DNS database stored on a DNS server, and is called from NET BeginConnect( ). If a numeric IP address is passed into NET_FindAddress( ), it is passed directly into the gethostbyname( ) call which will always return success when an IP address is passed in. NET_FindAddress( ) is actually called repeatedly until it returns success or failure. Upon success the host entity struct is filled out, and cached. Upon failure, the host entity struct is freed and the "not found" result is passed back up to the caller.

A domain name includes two parts: a host and a domain. Technically, the letters to the right of the "dot" (e.g., tlda.com) are referred to as Top Level Domains (TLDs), while hosts, computers with assigned IP addresses that are listed in specific TLD registries are known as second-level domains (SLDs). For the domain name "tlda.com"; ".com" is the TLD and "tlda" is the SLD. Domain name space is the ordered hierarchical set of all possible domain names either in use or to be used for locating an IP address on the Internet. TLDs are known as top-level domains because they comprise the highest-order name space available on the Internet. SLDs, as well as third-level domains (3LDs) such as "31d.tlda.com", are subsidiary to TLDs in the hierarchy of the DNS.

There are two types of top-level domains, generic and country code. Generic top-level domains (gTLDs) were created to allocate resources to the growing community of institutional networks, while country code top-level domains (ccTLDs) were created for use by each individual country, as deemed necessary. More than 240 national, or country-code TLDs (e.g., United States (.us), Japan (.jp), Germany (.de) etc.) are administered by their corresponding governments, or by private entities with the appropriate national government's acquiescence. A small set of gTLDs does not carry any national identifier, but denote the intended function of that portion of the domain space. For example, ".com" was established for commercial networks, ".org" for not-for-profit organizations, and ".net" for network gateways. The set of gTLDs was established early in the history of the DNS and has not been changed or augmented in recent years (COM, ORG, GOV, and MIL were created by January 1985, NET in July 1985, and INT was added in November 1988).

There are proposed solutions for revamping ".us" in order to create a more viable use for the United States TLD. On Aug. 3, 1998, a request for comments was printed in the federal register by the National Telecommunications and Information Administration (NTIA) for public opinion on the enhancement of the ".us" Domain Space. At present, the Internet Assigned Numbers Authority (IANA) administers ".us" as a locality-based hierarchy in which second-level domain space is allocated to states and US territories. This name space is further subdivided into localities. General registration under localities is performed on an exclusive basis by private firms that have requested delegation from IANA. The ".us" name space has typically been used by branches of state and local governments, although some commercial names have been assigned. Where registration for a locality has not been delegated, the IANA itself serves as the registrar.

Some in the Internet community have suggested that the pressure for unique identifiers in ".com" could be relieved if commercial use of the ".us" space was encouraged. Commercial users and trademark holders, however, find the current locality-based system too cumbersome and complicated for commercial use. Expanded use of the ".us" TLD could alleviate some of the pressure for new generic TLDs and reduce conflicts between American companies and others competing for the same domain name. Clearly, there is much opportunity for enhancing the ".us" domain space, and the ".us" domain could be expanded in many ways without displacing the current geopolitical structure. Over the next few months, the U.S. government will work with the private sector, along with state and local governments, to determine how best to make the ".us" domain more attractive to commercial users. In fact, news reports have conveyed that serious proposals have been submitted by the United States Postal Service (USPS) to become a critical factor in the revamping of ".us" domains.

The Commercial Internet eXchange Association (CIX) is a non-profit, trade association of network service providers promoting and encouraging the development of the public data communications internetworking services industry, in both national and international markets. CIX has also been lobbying for better use of the ".us" system. According to a draft from CIX in March 1998—in response to a White House "Green Paper" released the previous month on the proposed rule for "Improvement of Technical Management of Internet Names and Addresses"—CIX states concerns that ".us" is not widely used for commercial purposes. Indeed, sites employing this domain may not be frequently visited. It is widely acknowledged that the ".us" domain suffers from structural deficiencies and requires extensive reform. The lack of a commercially viable name space for the U.S. contributes directly to the demand for ".com" SLDs and the alleged critical shortage of gTLDs. Therefore, reform of the ".us" may help alleviate the need for gTLDs and be more consistent with international practices of using ccTLDs, at least in the short and medium term. The DNS is operated by a Network Information Center (NIC) in each counrty to act as authority for administering the respective ccTLD zone file portion of the DNS database. The Internet Information Center (InterNIC) previously administered by the National Science Foundation (NSF), was formed to preside as authority over the gTLD zone files. In 1993, InterNIC was privatized and Network Solutions Inc. (NSI) was chosen to preform the registration and propagation of these key gTLDs, under a five-year cooperative agreement with the NSF.

Every request to resolve a domain name by locating a particular host on the Internet must necessarily, by default, refer to the root zone file on the NSI root nameservers in order to be directed to the appropriate nameserver containing the SLD names registered under the particular TLD indicated in the host's request. Accordingly, unless and until a TLD root nameserver or any SLD nameserver, is referred to in the root zone file, that nameserver will not be globally recognized on the Internet and the names serviced thereby will not be universally resolvable.

The Internet domain name registration market is lucrative and rapidly growing. The demand over the past year for domain names or SLDs has exceeded 400,000 new registrations monthly. InterNIC also registers 3LDs, but the number of registrations is little in comparison to SLDs. The most common use of 3LDs is for the designation of DNS servers, e-mail servers, or other specialized computer functions whereas the primary use for SLDs are for accessing web sites and brand name recognition. Furthermore, the arbitrarily limited number of TLDs has created a severe shortage of desirable domain names in the ".com" registry, leading to substantial pent-up demand for alternative domain name resources. Experimental registry systems offering name registration services in an alternative set of exclusive domains such as ".space" or ".love" developed as early as January 1996. Although visible to only a fraction of Internet users, alternative DNS systems such as the Name.Space, AlterNIC, and eDNS registries have contributed to the community's dialogue on the evolution of DNS administration. Competition argues that TLDs become an issue of free speech and should not be restricted to the current limited set of gTLDs and ccTLDs.

Customers registering second-level domains in alternative TLDs cannot be reached by other Internet users because these domains, which are not listed in the root zone file, cannot be resolved by other Internet DNS name servers. Only if competitors individually negotiated with each of the scores of thousands of name server operators on the global Internet, something that is a physical and financial impossibility, for inclusion of alternative TLDs would there be any possibility that its domain names could be universally resolvable. As a result, competition has been unable to offer a commercially viable registration service in its TLDs, and has been unable to effectively compete in the domain name market.

In an effort to shift the overseeing of the Internet out of government hands and into the private sector, NSI's original extension to the cooperative agreement was extended six months to have then expired Sep. 30, 1998. Most recently, NSI and officials from the Department of Commerce's NTIA have agreed to a two-year extension of their Cooperative Agreement through Sep. 30, 2000. Included in the extension are provisions to transfer relevant US Government authority over some domain name system functions to a new non-profit corporation. Incorporated and headquartered in California, the Internet Corporation for Assigned Names and Numbers (ICANN) is the non-profit corporation that was formed to take over responsibility for the IP address space allocation, protocol parameter assignment, domain name system management, and root server system management functions now performed under U.S. Government contract by IANA and other entities. The IANA, also headquartered in California, is the overall authority for day-to-day administration of the DNS. IANA staff carry out administrative responsibilities for the assignment of IP Addresses, Autonomous System Numbers, TLDs, and other unique parameters of the DNS and its protocols.

ICANN, NTIA, and NSI agreed to a migration to a shared registration system (SRS) in a phased approach beginning Mar. 31, 1999 with full implementation by Jun. 1, 1999. NSI has implemented a SRS to support multiple licensed, accredited registrars offering registration services. NSI and other domain name registrars function as retailers of domain name registration services through NSI's SRS. NSI will also continue in its role as the registry or wholesaler of ".com", ".net", and ".org" domain name registrations. To date, NSI has registered more than 7,000,000 domain names, or SLDs, in ".com", ".net", ".org", and ".edu".

There is a particular increase in articles and publications emphasizing the importance of name space and the perceived shortage of ".com" names. References have been made that NASA is seeking authorization for ".mars" as an extension of terrestrial geography. Speaking on the opening day of the annual Internet Society (ISOC) conference in Geneva on Jul. 22, 1998, Vint Cerf, a founding President of ISOC, said the domain name debate should also encompass ".earth" or ".mars" because that's where real-time science data is going to travel from in the not-too-distant future. He said, "The idea is to take the interplanetary Internet design and make it a part of the infrastructure of the Mars mission." Ironically that same day, an on-line Wired News article reports that Netword LLC has sued Centraal Corp. for patent infringement on its Internet keyword system. The system uses plain English instead of URLs to retrieve Web addresses. The technology lets companies and site owners register simple keywords that browsers can use to access Web sites. "Chevy," for example, could be used as an alias to replace the lengthier Web address "http://www.chevrolet.com". The system works using a client browser plug-in. U.S. Pat. No. 5,764,906 issued on Jun. 9, 1998, by Edelstein et al. and assigned to Netword LLC, entitled, "Universal electronic resource denotation, request and delivery system" is a system that works by users guessing a short mnemonic alias without the user being required to know the Web page's URL.

There is another cited patent that relies on a translation database to retrieve URLs and access resources. U.S. Pat. No. 5,812,776 issued on Sep. 22, 1998 by Gifford, entitled, "Method of providing internet pages by mapping telephone number provided by client to URL and returning the same in a redirect command by server" allows a user to access a hypertext page by providing a conventional telephone number or other descriptor. The server maps such a telephone number or descriptor to a target page identifier using a translation database and automatically directs the client to retrieve the desired page.

Patent applications published abroad indicate further efforts of simplification in resource location. WIPO Patent Application WO9922488A2 published on May 6, 1999 by Osaku, et al., entitled, "Method and system for accessing information on a network" discloses methods and systems for accessing a network URL through a pre-assigned simplified network address, correlating to the URL, and for displaying the home page having the URL as its address. WIPO Patent Application WO9939275A1 published on Aug. 5, 1999 by Teare, et al., entitled, "Navigating network resources using metadata" discloses mechanisms for associating metadata with network resources, and for locating the network resources in a language-independent manner. The metadata may include a natural language name of the network resource, its location, its language, its region or intended audience, and other descriptive information.

URLs are used in media and written in documents or typed within e-mail, and data files, etc. as a means to make reference to accessible online content that helps express the context of the ideas one wishes to communicate. URLs are generally written in an abbreviated manner as partial URLs or domain names (e.g., "http://www.example.com" is the URL, "www.example.com" is the FQDN, and "example.com" is the domain name). During the early stages of commercialization on the Internet, businesses displayed the full URL when advertising a commercial or display ad as a means to locate the resources of the business on the Internet. Improvements have been made to recognize partial URLs when entered in the location field of a web browser or network accessible device for automatically appending protocol information so a full URL request can be made. By submitting a domain name or FQDN in the location field, the browser modifies the request by adjusting the partial URL and adding "http://" in front of the domain name or FQDN in order to construct a valid URL. As a result of this convenience, companies have modified their advertising and distribution of URLs through print, film, radio, television and other media as "example.com" or "www.example.com" instead of the URL "http://www.example.com".

The "www" in "www.example.com" has become the de facto standard for web server software to connect with hosts on the World Wide Web portion of the Internet. However, in an effort to shorten the URL length both in advertising and as a means of input, a DNS resource record has been used to create aliases for the actual FQDN. The CNAME Record are sometimes called "aliases" but are technically referred to as "Canonical Name" (CNAME) entries. These records enable the use of pointing more than one domain name to a single host. Using canonical names makes it easy to host both an FTP server and a Web server on the same machine. The CNAME record "example.com. IN CNAME www.example.com." enables a domain name to become an alias of a FQDN. This alias allows resolvers to process input such as "http://example.com" to resolve to a web server at the URI "http://www.example.com".

Entering a URL in the location field of a web browser serves as a means to locate a network resource corresponding to the URL. Because the location field is essential for accessing network resources, the design of such location fields have rivaled much competition and innovation between existing web browser products from companies such as Netscape and Microsoft. Improvements to better track and organize sites of URLs that users have visited such as Bookmark folders, URL history, and the personal toolbar are all examples of functionality designed to help users navigate. Other improvements include spell checking and an autocomplete feature from the URL history as text is entered into the location field.

A more recent feature called Smart Browsing is integrated into Netscape Navigator that uses Internet Keywords so users can streamline the use of URLs and get fast access to web sites using the browser's location field. Any single or multiword strings typed into the browser's location field that does not include a "." are sent via HTTP to a server at "netscape.com". The keyword server pulls the string and compares it to several separate lists of keyword-URL pairs. If the keyword system finds a match, it redirects the user's browser to the URL of the keyword-URL pair. Failing a match against the lists, the user's browser is redirected to a Netscape Search page with the typed string as the search query. The "." versus " " is a key factor in determining what services are used. Depending on context, the detection of only a "." delimiter implies a domain name used for name resolution services whereas the detection of only a " " delimiter implies a search request used for directory services.

The autosearch feature of Microsoft Internet Explorer (MSIE) is another example of an improvement to the location field of a web browser. The details of the autosearch feature is disclosed in U.S. Pat. No. 6,009,459 issued on Dec. 28, 1999 by Belfiore, et al., entitled, "Intelligent automatic searching for resources in a distributed environment." The '459 patent specifies a mechanism for a computer system to automatically and intelligently determine what a user intended when the user entered text within the location field of a web browser. Often users improperly enter URLs or enter search terms in a user interface element that requires URLs. If the user enters text that is not a URL, the system may first try to construct a valid URL from the user-entered text. If a valid URL cannot be constructed, the browser then automatically formats a search engine query using the user-entered text and forwards the query to an Internet search engine.

In addition, the '459 patent specifies a template registry that categorizes the specific suitability of a plurality of search engines to locate web sites related to a determined meaning of the specified text. The template is an entry in the registry that includes replaceable characters that may be replaced with the processed text. An example template registry entry that causes the Yahoo! search engine to be called is "http://msie.yahoo.com/autosearch?% s". The % s is filled in with information regarding the search terms.

MSIE browser may redirect input such as an unresolvable domain name to the autosearch feature, but is configured to prompt the client browser to display an error message. The unresolvable domain name has never been further processed by the autosearch or routed to another naming service or namespace provider for further resolution or registration processing.

Due to the perceived shortage of TLDs, the struggle to add new TLDs has enabled industry to overlook solutions for extending the use of domain name space. Prior art clearly demonstrates that there is a need for a system to provide further use of domain name space. Accordingly, in light of the above, there is a strong need in the art for systems, method, and devices for enhancing how domain name space can be more extensively used on a network such as the Internet.

The present invention provides know-how for new and creative purchasing strategies of domain names from countries around the globe. The invention enables users to create and distribute through at least one media source indicia such as a fictitious domain name (FDN) having a Top Level Domain Alias (TLDA) for use in advertising in connection with a resolvable URI that can be calculated and/or generated from such indicia. The present invention takes advantage of the reverse hierarchy of the DNS to create a mapping between trademarks and domain names. The invention enables the creative use of FDNs to emulate resolvable valid domain names (VDNs) or real domain names (RDNs). The present invention helps a user to enter less input while navigating online information more precisely in fewer steps. The invention enables a domain name holder such as an entity or individual to license subdomains for redirection or storage. The present invention allows the possibility for unlikely parties to exchange commerce through licensing and/or partnering.

The present invention serves as a control point for an entity to track demographics, accounting data, or display targeted advertising to a user. The invention measures response rate per media to determine market share and effectiveness of targeted advertising. The present invention assures that the tracking of all TLDA redirection activity is logged and accounted for particularly when it pertains to the distribution of revenues to all parties involved. The invention does not have to rely upon any kind of translation database or registry to convert an FDN into a valid URI.

The present invention takes advantage of extending the use of postal and zip codes for locating resources. The present invention allows for port aliasing that is used for TLD redirection and querying of identifiers and URNs. The invention allows a registrant to register in any combination, a resolvable TLD, a method of resolution including a template, a PURI as a suffix, prefix or both, a search string, an address corresponding to a prefix or suffix delimiter, or component data for the purpose of generating a resolvable URI from a TLDA. The present invention eliminates the extra step of accessing a resource and then searching from such resource by processing a TLDA as a search request in the form SLD.TLDA to simultaneously access and search the resource. The invention further allows for immediate personalized results based on providing geographic or other identifiers as the TLDA search term. The present invention provides URI redirection from HLDs and SLDs to vertical market directory services, which can be endorsed, branded, and sponsored by organizations that serve such markets. The invention allows for new information spaces to be created as a result of reorganizing how TLDA name space is distributed to SLD holders.

The present invention provides a definable ranking or hierarchy by enabling registrants to favor resolution methods that may provide a strategic buying advantage or gain broader appeal for the distribution of the registered name as indicia/trademark. The invention allows SLD holders across different TLDs to register TLDA names and emulate a shared SLD name space reducing the likelihood of trademark disputes. The present invention allows for the automatic reception of indicia such as FDNs via print or machine readable code by any means such as but not limited to optical and magnetic data reading input devices to process such indicia and generate at least one valid URI for accessing resources in a network. The invention enables generated available TLDA names to be temporarily reserved which are targeted and personalized for distribution to potential users based on having some knowledge of geographic, demographic, or psychographic data about such potential users. The present invention enables query results to be used as survey data to promote statistics of what TLDAs may become possible TLDs in the future, sales leads to contact companies and provide personalized demonstration of how TLDA names can be used for advertising, branding, market segmentation, and product differentiation.

The invention provides a distributed cache for minimizing bandwidth of server requests across the backbone of the Internet. The present invention allows for the extended use of registered names by submitting the registered TLDA name on behalf of the registrant if so desired to reserve such a name at a future date for newly approved TLDs of the DNS. The invention may use a template of the MSIE autosearch feature for the purposes of TLDA redirection rather than purpose of searching in lieu of making browser modifications resulting in the savings of distribution costs for software updates.

In general, in accordance with the present invention a method for locating a network resource from an identifier having a domain name includes the steps of determining whether the domain name is fictitious, resolving the identifier in response to determining that the domain name is not fictitious, generating another identifier in response to determining that the domain name is fictitious, and resolving the generated identifier.

In accordance with an aspect of the present invention, a method for locating a network resource from a first identifier having a domain name includes determining that the domain name is a fictitious domain name (FDN) with respect to a domain name system (DNS) root, generating a second identifier, and locating the network resource from the second identifier.

In accordance with another aspect of the present invention, a method for registering a fictitious domain name (FDN) having a top level domain alias (TLDA) that is available for registration includes registering the FDN, and providing the option of pre-registering the FDN to be automatically registered at a later date as a domain name that is not fictitious when it is determined that the TLDA has become approved as a top level domain and is resolvable by a domain name system.

In accordance with yet another aspect of the present invention, a method for sending a message with a first email address having a first domain name includes determining that the first domain name is a fictitious domain name with respect to a domain name system root, generating a second email address having a second domain name that is not fictitious, and sending the message with the second email address.

In accordance with additional aspects of the present invention, a system which implements substantially the same functionality in substantially the same manner as the methods described above is provided.

In accordance with yet other additional aspects of the present invention, a computer-readable medium that includes computer-executable instructions may be used to perform substantially the same methods as those described above is provided.

The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

BRIEF DESCRIPTION OF THE DRAWINGS

FIG. 10b presents an exemplary table in accordance with the present invention illustrating the minimum data structure of postal code information.

FIG. 13 is a table of generated URI equivalents to input in accordance with the present invention.

FIG. 14b presents an exemplary table in accordance with the present invention illustrating the minimum data structure for a registry.

FIG. 14c presents an exemplary table in accordance with the present invention illustrating the minimum data structure for name translation information.

FIG. 15a presents an exemplary table in accordance with the present invention illustrating the minimum data structure for component data and PURIs.

FIG. 15b is an illustration of method number and associated rankings in accordance with the present invention.

FIG. 20b is an illustration of correspondence that may be sent to a potential registrant in accordance with the present invention.

DETAILED DESCRIPTION OF THE INVENTION

Figure 1A:
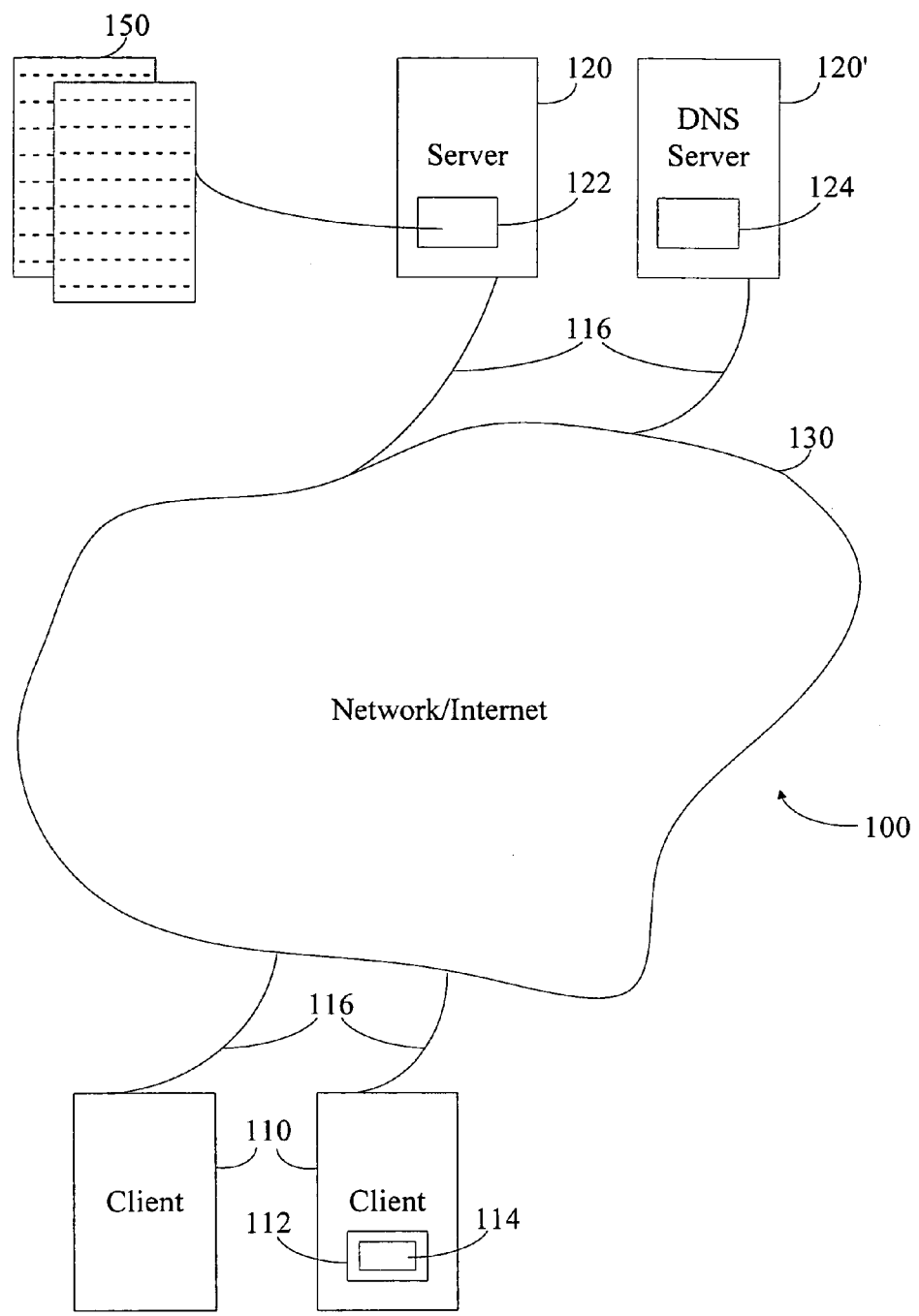
FIG. 1a is a block diagram of an exemplary distributed computer system in accordance with the present invention.

The present invention will now be described with reference to the drawings, wherein like reference numerals are used to refer to like elements throughout.

Turning first to the nomenclature of the specification, the detailed description which follows is represented largely in terms of processes and symbolic representations of operations by conventional computer components, including a local processing unit, memory storage devices for the local processing unit, display devices, and input devices. Furthermore, these processes and operations may utilize conventional computer components in a heterogeneous distributed computing environment, including remote file servers, computer servers, and memory storage devices. Each of these conventional distributed computing components is accessible to the local processing unit by a communication network.

Operative manipulations within the computer are often referred to in terms such as adding, comparing, moving, positioning, placing, illuminating, removing, altering, etc., which are often associated with manual operations performed by a human operator. The operations described herein are machine operations performed in conjunction with various input provided by a human operator or user that interacts with the computer. The machines used for performing the operation of the present invention include local or remote general-purpose digital computers or other similar computing devices.

For the purposes of this discussion, a process is generally defined as being a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering, etc., which are often associated with manual operations performed by a human operator. The operations described herein are machine operations performed in conjunction with various input provided by a human operator or user that interacts with the computer. The machines used for performing the operation of the present invention include local or remote general-purpose digital computers or other similar computing devices.

In addition, it should be understood that the programs, processes, method, etc. described herein are not related or limited to any particular computer or apparatus nor are they related or limited to any particular communication network architecture. Rather, various types of general-purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

FIG. 1a illustrates an exemplary system for providing a distributed computer system 100 in accordance with one aspect of the present invention and may include client computers or any network access apparatus 110 connected to server computers 120 via a network 130. The network 130 can use Internet communications protocols (IP) to allow the clients 110 to communicate with the servers 120. The network access apparatus 110 may include a transceiver, modem, or other network interface device to communicate with the electronic network 130. The modem can communicate with the electronic network 130 via a line 116 such as a telephone line, an ISDN line, a coaxial line, a cable television line, a fiber optic line, or a computer network line. Alternatively, the modem can wirelessly communicate with the electronic network 130. The electronic network 130 can be accessed via an on-line service, an Internet service provider, a local area network service, a wide area network service, a cable television service, a wireless data service, an intranet, a satellite service, or the like.

The client computers 110 can be any network access apparatus including hand held devices, palmtop computers, personal digital assistants (PDAs), notebook, laptop, portable computers, desktop PCs, workstations, and/or larger/smaller computer systems. It is noted that the network access apparatus can have a variety of forms, including but not limited to, a general purpose computer, a network computer, a network television, an internet television, a set top box, a web-enabled telephone, an internet appliance, a portable wireless device, a television receiver, a game player, a video recorder, and/or an audio component, for example.

Each client 110 typically includes one or more processors, memories, and input/output devices. An input device can be any suitable device for the user to give input to client computer 110; for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, or cable box. A data glove, an eye tracking device, or any MIDI device could also be used. A display device could be any suitable output device, such as a display screen, text-to-speech converter, printer, plotter, fax, television set, or audio player. Although the input device is typically separate from the display device, they could be combined; for example: a display with an integrated touchscreen, a display with an integrated keyboard, or a speech-recognition unit combined with a text-to-speech converter.

The servers 120 can be similarly configured. However, in many instances server sites 120 include many computers, perhaps connected by a separate private network. In fact, the network 130 may include hundreds of thousands of individual networks of computers. One aspect of the present invention includes a specific type of server system 120 called a DNS server system 120' which stores in memory a DNS database 124 having DNS records that translate domain names into IP addresses and vice versa. The DNS server system 120' is connected 116 to a network 130.

The DNS is a distributed database (of mappings) 124 implemented in a hierarchy of DNS servers (name servers) 120' and an application-layer protocol that allows hosts and name servers to communicate in order to provide the translation service. Name servers 120' are usually UNIX machines running BIND software. In order to deal with an issue of scale of the Internet, the DNS uses a large number of name servers 120', organized in a hierarchical fashion and distributed around the world. No single name server 120' has all of the mappings 124 for all of the hosts in the Internet. Instead, the mappings 124 are distributed across many name servers 120'.

Although the client computers 110 are shown separate from the server computers 120, it should be understood that a single computer could perform the client and server roles. Those skilled in the art will appreciate that the computer environment 100 shown in FIG. 1a is intended to be merely illustrative. The present invention may also be practiced in other computing environments. For example, the present invention may be practiced in multiple processor environments wherein the client computer includes multiple processors. Moreover, the client computer need not include all of the input/output devices as discussed above and may also include additional input/output devices. Those skilled in the art will appreciate that the present invention may also be practiced with Intranets and more generally in distributed environments in which a client computer requests resources from a server computer.

During operation of the distributed system 100, users of the clients 110 may desire to access information records 122 stored by the servers 120 while utilizing, for example, the Web. The records of information 122 can be in the form of Web pages 150. The pages 150 can be data records including as content plain textual information, or more complex digitally encoded multimedia content, such as software programs, graphics, audio signals, videos, and so forth. It should be understood that although this description focuses on locating information on the World-Wide-Web, the system can also be used for locating information via other wide or local area networks (WANs and LANs), or information stored in a single computer using other communications protocols.

The clients 110 can execute Web browser programs 112, such as Netscape Navigator or MSIE to locate the pages or records 150. The browser programs 112 enable users to enter addresses of specific Web pages 150 to be retrieved. Typically, the address of a Web page is specified as a URI or more specifically as a URL. In addition, when a page has been retrieved, the browser programs 112 can provide access to other pages or records by "clicking" on hyperlinks (or links) to previously retrieved Web pages. Such links can provide an automated way to enter the URL of another page, and to retrieve that page.

A client of the DNS is called a resolver 114. Resolvers 114 are typically located in the application layer of the networking software of each TCP/IP capable machine. Users typically do not interact directly with the resolver 114. Resolvers 114 query the DNS by directing queries at name servers, which contain parts of the distributed database that is accessed by using the DNS protocols to translate domain names into IP addresses needed for transmission of information across the network. DNS is commonly employed by other application-layer protocols—including HTTP, SMTP and FTP—to translate user-supplied domain names to IP addresses. When a browser program 112 (e.g., an HTTP client), running on a user's machine, requests a URL having a resolvable domain name, in order for the user's machine to be able to send an HTTP request message to a server 120, the user's machine must obtain the IP address of the domain name. The user machine then runs the resolver 114 (DNS client) on the client-side of the DNS application. The browser 112 extracts the domain name from the URL and passes the domain name to the resolver 114 on the client-side of the DNS application. As part of a DNS query message, the DNS client 114 sends the domain name to a DNS server system 120' connected to the Internet. The DNS client 114 eventually receives a reply, which includes the IP address for the domain name. The browser then opens a TCP connection 116 to the HTTP server process 120 located at the IP address.

Figure 1B:
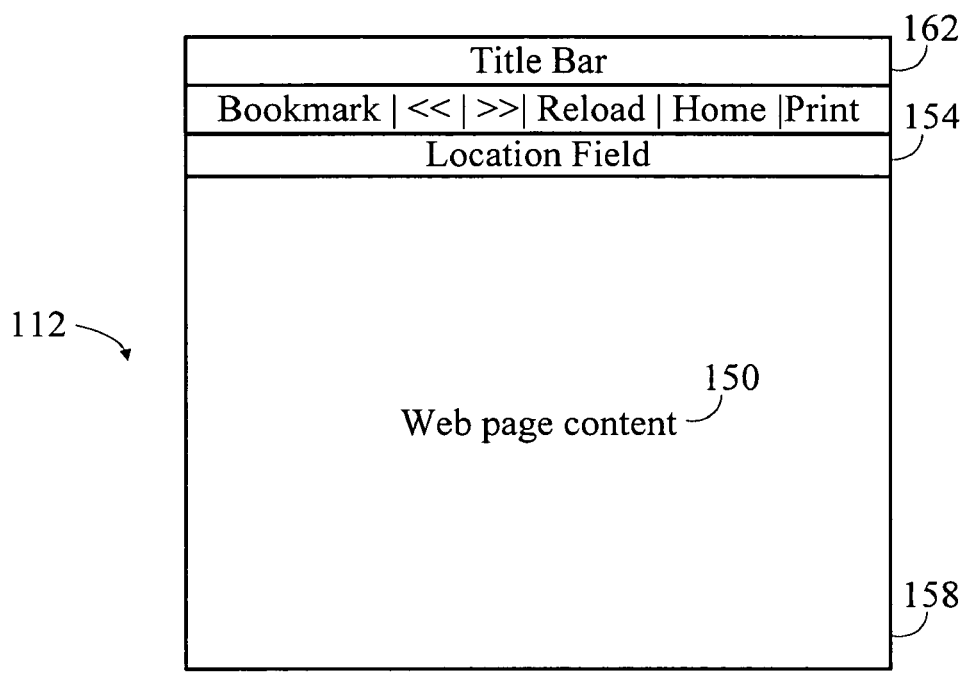
FIG. 1b is a diagram depicting the location field used in a conventional web browser.

FIG. 1b more specifically illustrates an exemplary selection of common operative components of a web browser program 112. The web browser 112 enables a user to access a particular web page 150 by typing the URL for the web page 150 in the location field 154. The web page 150 content corresponding to the URL in the location field 154 can be displayed within the client area of the web browser display window 158, for example. Title information from the web page 150 is displayed in the title bar 162 of the web browser 112.

Figure 1C:
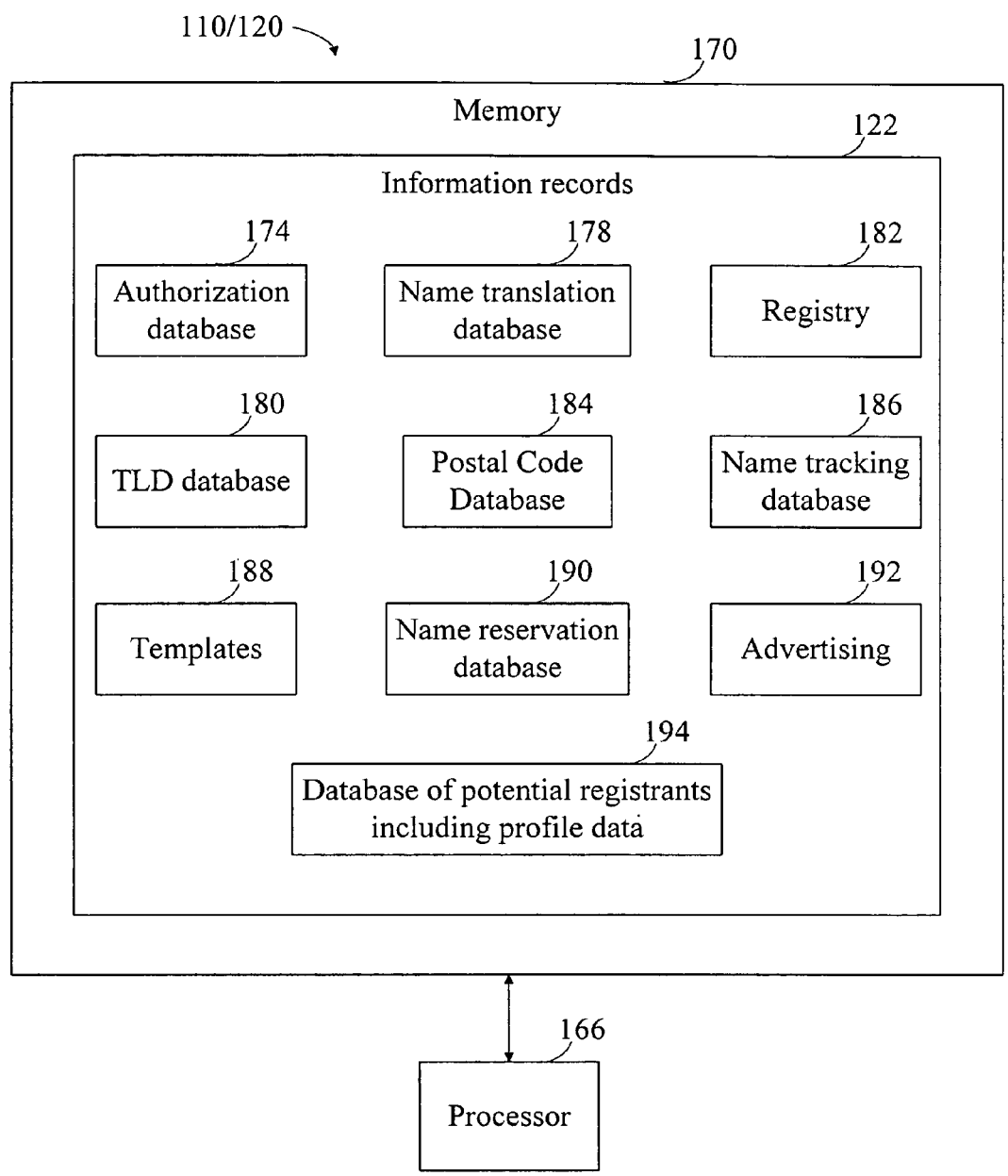
FIG. 1c is a block diagram illustrating exemplary information records stored in memory in accordance with the present invention.

FIG. 1c illustrates a block diagram of a processor 166 coupled to a storage device such as memory 170 in a client 110 or server 120 computing system. Stored in memory are information records 122 having any combination of exemplary content such as lists, files, and databases. Such records can include, for example: authorization information 174, name translation information 178, registry information 182, resolvable TLD information 180, postal code information 184, name tracking information 186, autosearch template information 188, name reservation information 190, advertising (cache) information 192, and information 194 of potential registrants including profile (geographic, demographic, and psychographic) data. These information records are further introduced and discussed in more detail throughout the disclosure of this invention.

Figure 2A:
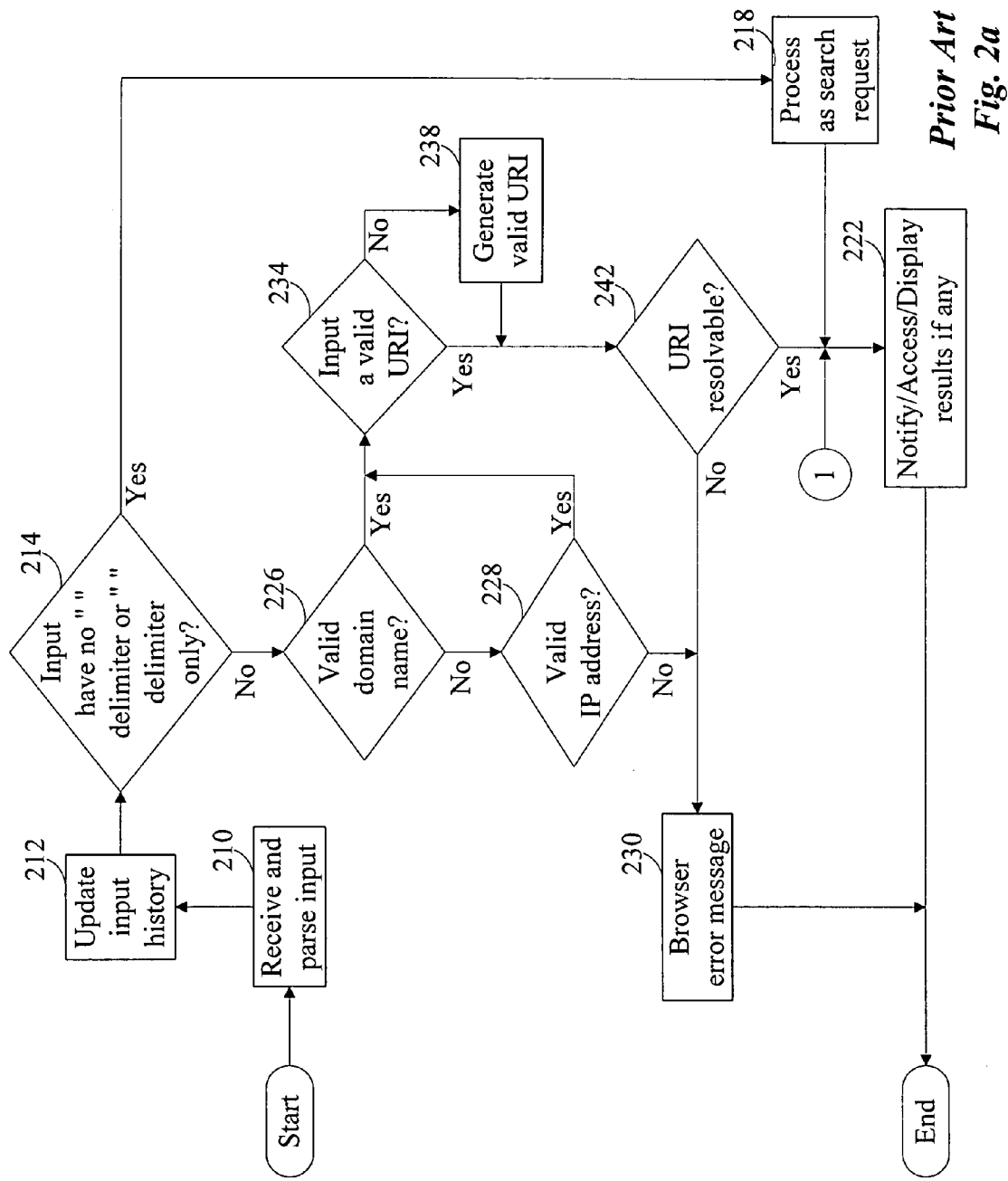
FIG. 2a is a flowchart illustrating the steps performed by a prior art system using resource location services.

FIG. 2a is a top-level flowchart illustrating the steps of an exemplary prior art system for requesting a network resource from an identifier by using resource location and/or name resolution services. A network access apparatus 110, servlet, applet, stand-alone executable program, command line of a device such as a phone browser, or user interface element such as a text box object or location field 154 of a web browser 112, can receive and parse input such as text in step 210. The input 210 can then be updated in step 212 into a history database. Tests can also be performed to determine how to process the received input 210. For instance, when it is determined in step 214 that the input 210 has no "." delimiters or " " delimiters only, it becomes clear that there is no domain name or IP address present and the input 210 can be processed as a search request in step 218. Results if any, can then be notified, accessed, and/or displayed in step 222. When the presence of the "." delimiter is determined in step 214, the input 210 may include either an IP address or a domain name. When a domain name is parsed in step 210, the validity of the domain name is determined in step 226. Validity of URI syntax is provided in T. Berners-Lee, "Informational RFC (Request for Comment) 1630: Universal Resource Identifiers in WWW—A Unifying Syntax for the Expression of Names and Addresses of Objects on the Network as used in the World-Wide Web", Internet Engineering Task Force (IETF), June 1994, "http://www.faqs.org/rfcs/rfc1630.html", which is herein incorporated by reference.

If the parsed domain name is determined in step 226 to be not valid, a browser error message is displayed in step 230. In turn, when an IP address is parsed, the validity of the IP address is determined in step 228. If the IP address is determined in step 228 to be not valid, a browser error message is displayed in step 230. When a domain name is determined valid in step 226 or an IP address is determined valid in step 228, it can then further be determined in step 234 whether the input 210 includes a valid URI. If there is no valid URI, then a valid URI is generated in step 238 from input 210. For instance, if a scheme is missing, the web browser may add the prefix "http://" to the text or add another scheme prefix. After performing input validity tests, the steps of resolvability can be performed. When a received (step 234) or generated (step 238) valid URI is determined resolvable in step 242 then results if any, can then be either notified, accessed, and/or displayed in step 222. However, when a valid URI is determined not resolvable in step 242, a browser error message is displayed in step 230.

In an aspect of the present invention, other browser configurations can process the unresolvable URI as a search request by passing the URI and/or domain name by the autosearch feature, for example, in an attempt to yield results other than that of an error message in step 230. Domain name resolution is explained in P. Mockapetris, "Informational RFC (Request for Comment) 1035: Domain Names—Implementation and Specification", Internet Engineering Task Force (IETF), November 1987, "http://www.faqs.org/rfcs/rfc1035.html", which is herein incorporated by reference.

In a hierarchical naming system such as the DNS, a first domain may represent the highest level domain (HLD). A HLD that is determined not resolvable is referred to as a Top Level Domain Alias (TLDA) whereas a resolvable HLD is referred to as a Top Level Domain (TLD). Any domain name that is valid and not registered as part of the DNS, or that is not valid (e.g., SLD/3LD, etc. is greater than 63 characters, and/or characters other than that of A to Z, a to z, 0 to 9, and hyphen, and/or domain names represented in other character sets) or any domain name having a TLDA is called a fictitious domain name (FDN). For the purposes of illustration the use of TLDs, further includes a plurality of domains that do not represent a hostname. For instance, there are Generic Second Level Domains (gSLDs) that are lower level to ccTLDs (e.g., ".com.au", ".net.au" are generic zones within the Australian domain) and for the purposes of discussion are considered TLDs. For example, the input "example.44106.us" is received and it is determined that ".us" is resolvable. The list of resolvable TLDs further includes state level subdomains (e.g., ".oh.us", ".ca.us", ".ny.us" etc.) to assure ccTLD resolvability. Therefore when a ccTLD such as ".us" is detected, it can further be determined whether ".44106" is resolvable with respect to ".us" where the HLD in this case is defined as ".44106.us" and upon lookup determined to be not resolvable and therefore processed as a TLDA.

Input such as text or a character string is comprised of at least one symbol having at least one domain. In most cases, the character string is comprised of a plurality of symbols separated by at least one delimited symbol. Delimiters are determined from a list of reserved symbols of a given character set. The character set is comprised of a symbol space used to generate at least one character string. The delimiter is what creates a plurality of domains. Each domain comprises at least one symbol. The minimum length of a character string having a plurality of domains is three.

Different reserved symbols can be used as equivalents for generating different character strings that yield the same destination (e.g., A.B=A B=A/B=A!B, etc.). A character string having only one domain most commonly functions as a label or search term (e.g., "a" or "apple" etc.), however a character string having a plurality of domains functions as a domain name (e.g., "a.com" or "sunday.comics"). In some cases, the character string is also equivalent to a URI (e.g., "http://example.com/index.htm") or a domain name with a prefix delimiter (e.g., "$name.game").

Figure 2B:
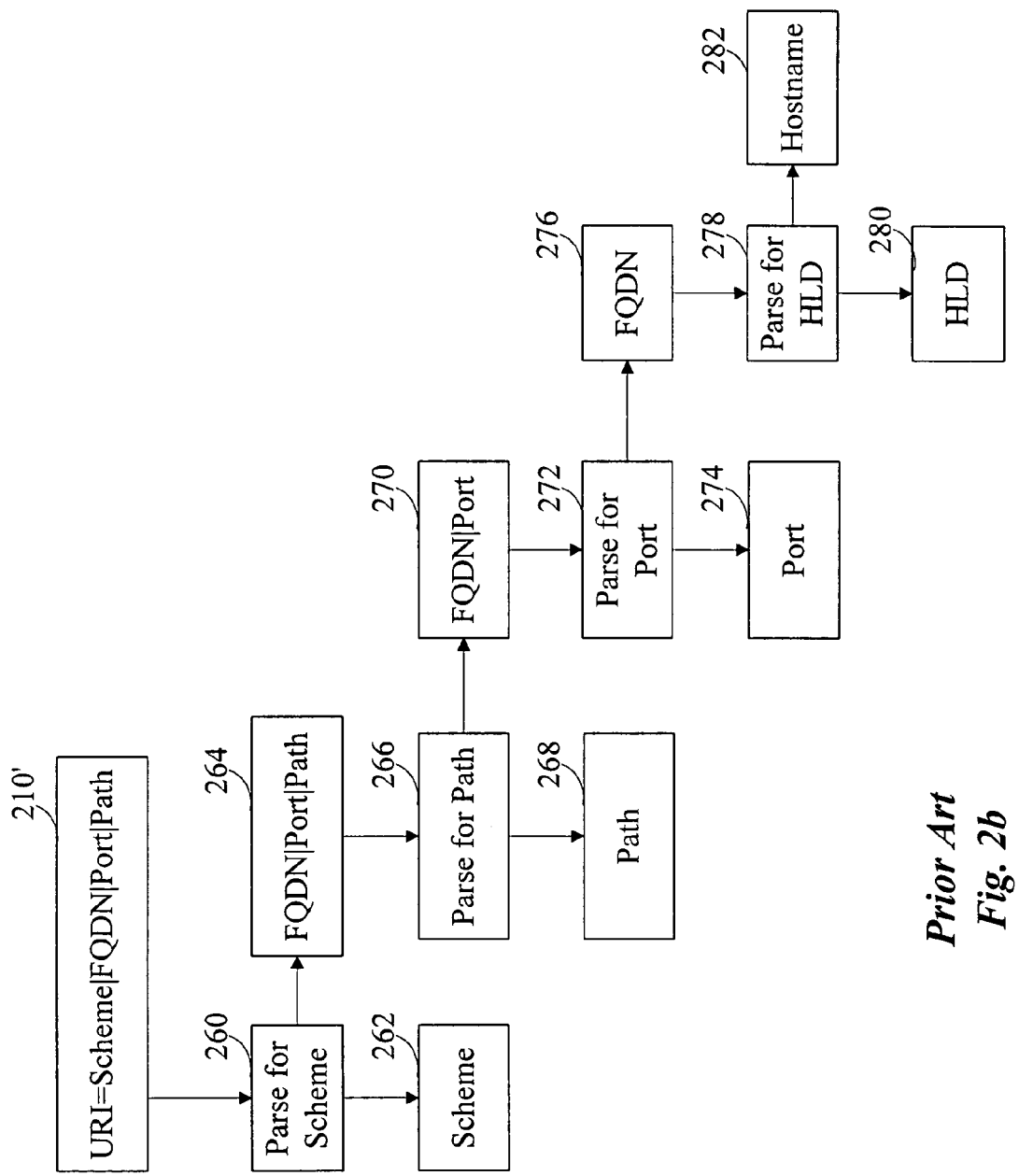
FIG. 2b is a flowchart illustrating the steps performed by a prior art system for parsing a URI.

When input 210 includes a domain name, resolvability can be determined by parsing a HLD from the input 210. Referring now to the prior art of FIG. 2b, a URI 210' including a scheme, Fully Qualified Domain Name (FQDN), port, and path is parsed. The scheme 262 is parsed in step 260 from the URI 210' leaving the FQDN, port, and path 264. The path 268 is parsed in step 266 from the FQDN, port, and path 264 leaving the FQDN and port 270. The port 274 is parsed in step 272 from the FQDN and port 270 leaving the FQDN 276. The HLD 280 is parsed in step 278 from the FQDN 276 leaving a hostname 282. FIG. 2b illustrates one of many parsing schemes that can be applied when parsing input in step 210.

Figure 3:
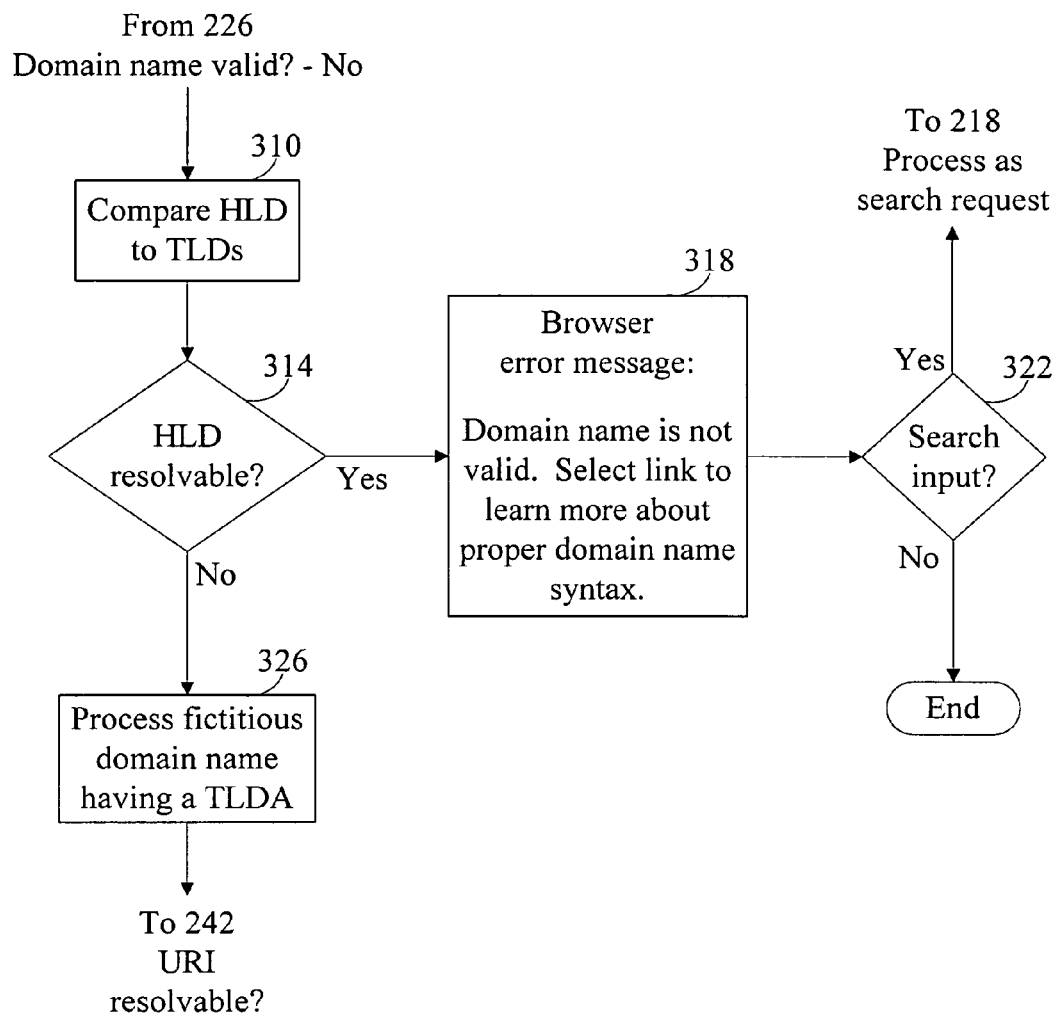
FIG. 3 is a top-level flowchart illustrating the steps performed for determining HLD resolvability in a preferred embodiment of the present invention.

Rather than displaying an error message in step 230 in response to input 210 having a domain name determined in step 226 to be not valid (e.g., fictitious domain name), in a preferred aspect of the present invention, further steps are performed instead as shown in FIG. 3. The HLD 280 is compared in step 310 to a list of resolvable TLDs 180 to determine HLD 280 resolvability in step 314. If the HLD 280 is determined in step 314 to be resolvable, then a more specific browser error message 318 can be displayed stating "Domain name is not valid. Select link to learn more about proper domain name syntax". Upon display, it can further be determined in step 322 whether received input 210 is processed as a search request in step 218. When this is the case, a search request is processed and results if any, can then be notified, accessed, and/or displayed in step 222. When the HLD 280 is determined in step 314 to be not resolvable, then the HLD 280 is a TLDA, and the input 210 now determined to have a FDN is further processed in step 326. After TLDA processing in step 326, the step of URI resolvability can be determined in step 242.

A TLDA is a specific form of aliasing subsidiary to the broader process of Domain Aliasing (DA). Any domain name having at least one domain level alias with respect to a domain name system root can be considered a FDN. For instance, whenever a TLDA is detected, all other parsed domains and subdomains may also possibly be aliases. Each domain or subdomain is considered a data element or component data that may function as an alias whenever a TLDA is detected. Translation databases can be used to register and process other forms of domain aliasing (as will be discussed) in addition to TLDA processing.

Figure 4A:
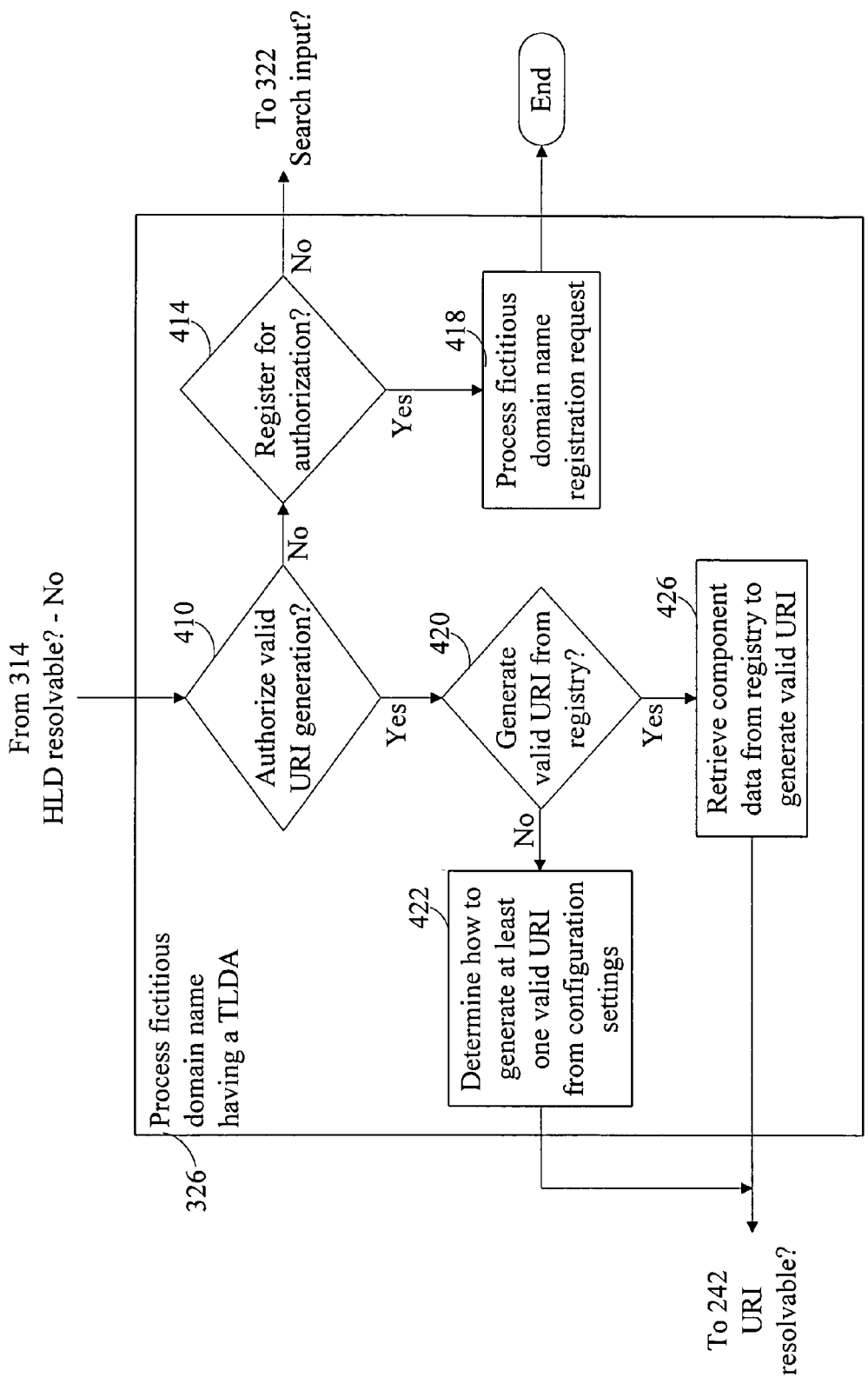
FIG. 4a is a flowchart illustrating the steps performed for processing a fictitious domain name having a TLDA in accordance with the present invention.

Referring now to FIG. 4a, specific steps for processing a fictitious domain name having a TLDA are shown (step 326). First, it is determined in step 410 whether valid URI generation is authorized (authorization techniques will be discussed in conjunction with FIG. 4b) in response to receiving the domain name having a TLDA. When it is determined in step 410 that there is no authorization for URI generation, it is then determined in step 414 whether a user may register for authorization (registration techniques will be discussed in conjunction with FIG. 17). When it is determined in step 414 that no registration for authorization is requested, it is further determined in step 322 whether received input 210 is processed as a search request in step 218. When this is the case, a search request is constructed from the identifier (e.g., domain name) and processed in step 218 and results if any, can then be notified, accessed, and/or displayed in step 222. However, when registration for authorization is requested in step 414, the fictitious domain name is processed in step 418 as a registration request.

Figure 7:
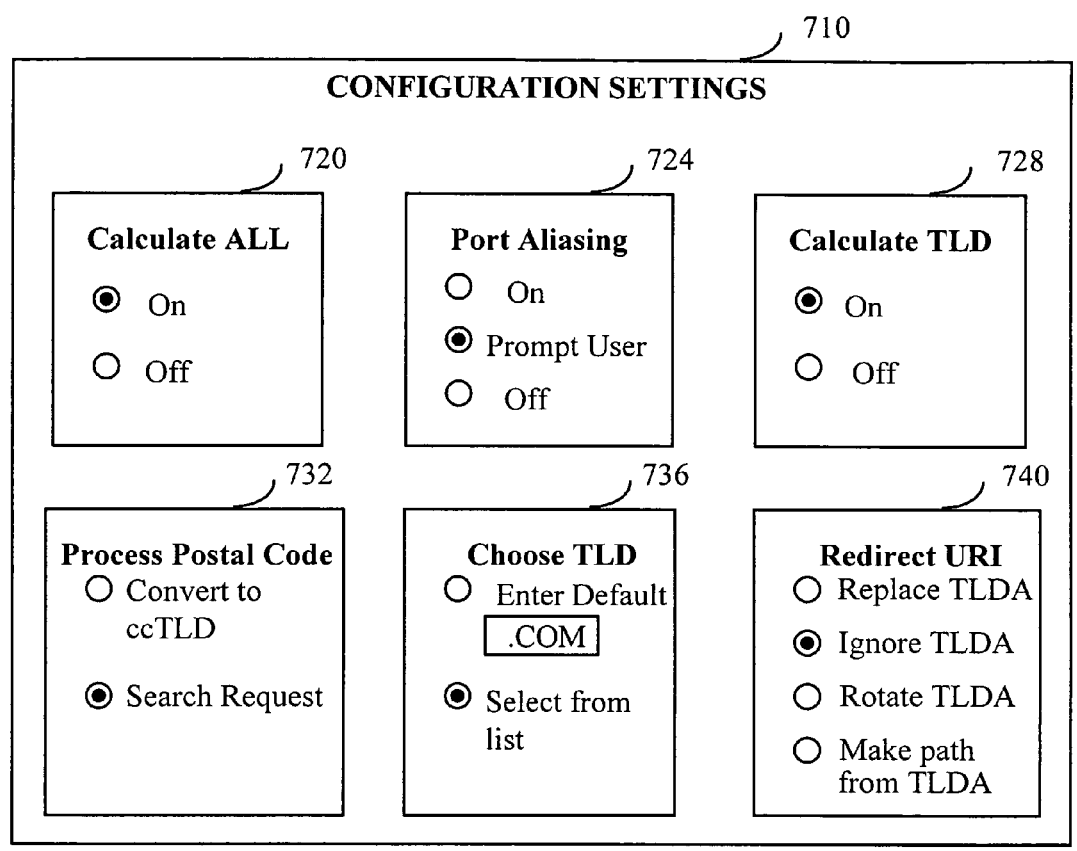
FIG. 7 is a diagram depicting an exemplary configuration settings interface in accordance with the present invention.

When it is determined in step 410 that there is authorization for URI generation, it is further determined in step 420 whether a valid URI is generated by accessing a registry 182 (discussed in conjunction with FIG. 14) or accessing configuration settings 710 (discussed in conjunction with FIG. 7). When it is determined in step 420 that the registry 182 is accessed, then registry component data is retrieved in step 426 to generate a valid URI. However, when it is determined in step 420 that configuration settings 710 are accessed, then configuration settings are retrieved to determine how to generate at least one valid URI in step 422. After processing either step 422 or step 426, the step of URI resolvability is determined in step 242.

Figures 4B, 4C:
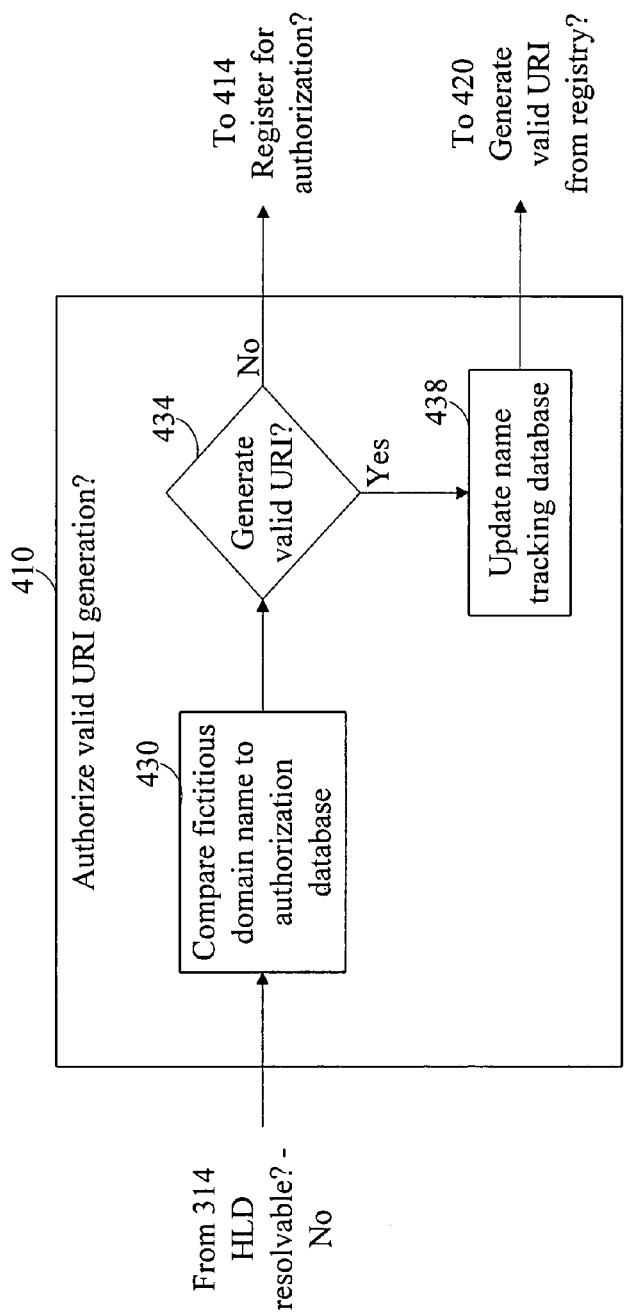
FIG. 4b is a flowchart illustrating the steps performed for determining authorization of URI generation in accordance with the present invention.
FIG. 4c presents an exemplary table in accordance with the present invention illustrating the minimum data structure for name tracking information.

Turning now to FIG. 4b, specific steps for determining authorization for URI generation are shown (step 410). The fictitious domain name is compared in step 430 to an authorization database 174. An authorization database 174 can be constructed with as little as one data field having a list or data records of all registered fictitious domain names that are authorized. The authorization database 174 can function as a "GO LIST" to determine for the presence of the requested fictitious domain name. When a fictitious domain name is found in the "GO LIST" then URI generation is authorized. The authorization database 174 can be combined with other databases such as translation databases 178, tracking databases 186, or the registry 182. Such databases will be discussed in more detail throughout this disclosure. When there is no match in step 430 then a URI is not generated and determination of registration is resumed in step 414. However, when there is a match in step 430, then a URI is 434 generated and a name tracking database 186 is updated in step 438. After the name tracking database 186 update, step 420 is resumed to determine how to generate at least one valid URI.

FIG. 4c illustrates the minimum data structure of the name tracking database 186. The name tracking database 186 is updated in step 438 with information such as name, IP address, date/time, and number of hits. The invention may also be configured by those skilled in the art to update the name tracking database 186 when input history is updated in step 212.

There are numerous methods as will be discussed throughout the present invention for generating a valid URI having a valid domain name (VDN) including a resolvable TLD, from input having a fictitious domain name. In general, a selected resolvable TLD can be combined with a fictitious domain name having a TLDA or a portion thereof. For instance, the method of recursive truncation (discussed in conjunction with FIG. 12) can be used to generate the valid URI, "http://united.st" from the input "united.states" where ".states" is a TLDA and ".st" (the truncation of ".states") is a resolvable ccTLD (abbreviation for the country Sao Tome and Principe).

To generate a new URI, the parsed components (as illustrated in FIG. 2b) are concatenated with a resolvable TLD. For example a fictitious URI such as "http://united.states" is parsed, where "http" is the scheme 262, there is no path 268 or port 274, the hostname 282 is "united", and the HLD 280 is "states". The HLD is determined in step 310 to be a TLDA, which is then modified by recursive truncation to yield the resolvable TLD "st". The parsed components; scheme 262, hostname 282, and TLD can then be concatenated with the "." delimiter to generate in step 422 a new URI "http://united.st". Another example, "http://united.stores" would also yield "http://united.st". Truncation enables a correspondence between abbreviations and names or words. This method yields know-how for new and creative purchasing strategies of domain names from countries around the globe.

When a fictitious telephone number such as '1-800-AUTOMOBILE' is advertised and a telephone used as a means to contact the advertiser, the telephone will connect the call when the caller 'dials' 1-800-AUTOMOB regardless whether the caller has finished dialing the word AUTOMOBILE. Until now, there is no such method, device, or system to allow for the interpretation of fictitious URIs or domain names to be used as indicia in a similar manner. Recursive truncation becomes an inventive step to allow the location field 154 of a web browser 112 or command line of a device to function in the analogous manner of 'dialing' a telephone.

Though "united.states" and "united.stores" etc. can be resolved as "http://united.st" there are other methods of URI generation to create uniqueness from the use of a TLDA. For instance, the parsed components; scheme, TLDA, hostname, and TLD can be concatenated to generate "http://states.united.st" or "http://stores.united.st" etc. By rotating the TLDA from the HLD to the lowest level domain (LLD) uniqueness can be mapped. Other methods of concatenation can be used by those skilled in the art of string manipulation to generate URIs such as "http://united.st/states" or "http://united.st/ates" to provide an infinite one-to-one mapping between a TLDA and a resolvable URI. Though a plurality of URIs can be generated, the URIs all have in common the same SLD which is assigned to a unique entity such as a corporation or individual. Therefore the domain name holder of "united.st" can use redundancy to create uniqueness regardless of which generated URI is used. For instance, "http://united.st", "http://states.united.st", "http://united.st/ates" etc. can all be redirected to another URI such as "http://www.anywhere.com" to create a unique destination for the fictitious domain name "united.states". Since generated URIs are calculated from fictitious domain names this invention does not have to rely upon any kind of database or registry to make such conversion from fictitious domain name to valid URI.

Another example is the resolution of a numerical TLDA. For instance, an entity who has registered the domain name "1212.com" can create subdomains to yield domain names such as "555.1212.com" or "800.555.1212.com". By so doing, the entity can lease out server space to subscribers who would like to associate their telephone number with a URI. There are roughly 200 area codes in the U.S., within each area code on average are about 10 prefixes which yields a targeted marketing list for an entity to call 2,000 telephone numbers to offer such services. Now consider received input such as "1.800.555.1212". The input is parsed and it is determined that "1212" is a TLDA which is then rotated and replaced with a default TLD yielding "1212.1.800.555.com". Under this new system, an entity who has registered the domain name "555.com" can in effect yield a targeted marketing list of 10,000 numbers per area code for the entity to call 2,000,000 telephone numbers to offer such services. The use of TLDA rotation yields a shorter input creating a larger market group by a factor of 1,000.

A URI as a data structure has within it the concatenation of two separate name spaces. The first is the DNS which represents a hierarchical string of domains separated by the "." delimiter which is read from right to left. The second is a path which represents a hierarchical string of directories separated by the "/" delimiter which is read from left to right (e.g., http://third.second.first.com/first/second/third/file.html). The "." is not a delimiter in the directory path name space but rather functions as a valid label character. For instance, "http://example.company" is not resolvable, but "http://example.com/example.company/index.htm" is a valid URI. This fact enables further utilization of TLDA redirection. Input determined to have a TLDA, can all be redirected to the same domain name and/or web server. For example, "top.stories" is redirected to "http://tlda.com/top.stories/index.htm" or "http://top.stories.tlda.com" which can further be redirected to "http://stories.top.com/index.htm" which is yet further redirected to a final destination of "http://anywhere.com". By centralizing all TLDA requests to the same domain name and/or server assures that the tracking of all TLDA redirection activity is logged and accounted for particularly when it pertains to the distribution of revenues to all parties involved.

With the exception of the DNS, most naming systems are interpreted from left to right. A telephone number, a zip code, an IP address, an odometer, and a directory path to name a few, are all data structures that represent descending levels of hierarchy. Trademarks can be considered a hierarchical system that is interpreted from left to right. Trademarks are used to identify a specific brand of product or service. The first part of the name specifies a particular company's version of a product or service. The second part of the name specifies the kind of product or service (e.g., AMAZON Books, KINKO'S Copies, BAYER Aspirin, IVORY soap etc.).

The domain name holder of "example.com" may further differentiate products and services at the "example.com" web site. For instance, "news at the "example.com" web site may be published at the URI "http://example.com/news" or published at the URI "http://news.example.com". In the latter, the web browser accesses a subdomain called "news" from the web server, "example.com". The subdomain "news" can be another server that is connected to and can only be accessed through "example.com". In general, most categories, products, and services have been independently coordinated from computer to computer in a similar manner, but yet it remains non-intuitive for a user to navigate directly to such a desired product or service. Typically, a user will first access the "example.com" web site and then click on a hyperlink called "news" requiring the user to take two steps to obtain desired results.

Advantage can be taken of the 'reverse' hierarchy of the DNS to create a correspondence or mapping between trademarks and domain names. A resolvable VDN can take the form of SLD.TLD such as "yahoo.com". From prior examples it is shown that the FDN of the form SLD.TLDA such as "yahoo.mail" (has 10 characters) is generated from the VDN of the form TLDA.SLD.TLD such as "mail.yahoo.com" (has 14 characters). This is the web address for accessing YAHOO mail. By using (as a trademark) the FDN "yahoo.mail" instead, a user can intuitively navigate (to a specific part of a web site) directly to a desired (result) product or service in one step (rather than two steps), while inputting 4 less characters. By using this system, companies that have invested in branding their ".com" identity can now advertise, for example, indicia such as "microsoft.office" (as a trademark), in addition to, "microsoft.com" for name branding, product differentiation, and helping customers streamline access to information. Due to the emergence of WAP (wireless application protocol), FDNs (as trademarks) will become increasingly useful to the portable wireless device market. Users of hand-held network access devices (e.g., palm pilot, phone browser, pager, etc.) will benefit by entering less input while navigating information more precisely in less steps.

Now consider a company that owns the trademark AMAZON Bread. Amazon.com is in the book business and not the bread business. Opportunity arises for both companies to cooperate. AMAZON Bread can pay licensing fees to AMAZON Books in exchange for web space at URI "http://bread.amazon.com/index.htm" or by redirecting this URI to a destination operated by AMAZON Bread such as "http://amazonbread.net". With over eight million ".com" registrations in effect, creates the possibility for unlikely parties to exchange commerce through licensing or partnering.

There is yet another method of URI generation to consider. Take the SLD.TLDA, "top.stories" and calculate from it a domain name to yield the form of SLD.TLDA.TLD, "top.stories.com". An issue is created with respect to the TLDA rotation method, which yields "stories.top.com". Both URI generation methods allow for the domain name holders of "top.com" and "stories.com" to form a cooperation by using both "stories.top.com" and "top.stories.com" to redirect to the same web address. By so doing, uniqueness of resolution is assured adding value to all parties involved.

Currently, when a word such as "top" is entered in the location field 154 of any web browser, the absence of a TLD is detected by the browser and a default TLD is concatenated to yield "http://top.com". However, when only part of a 3LD (e.g., "top.stories.com") is entered such as "top.stories", there are no such browsers or devices that have the ability to recognize the absence of a TLD. This indicates that such browsers or devices assume that "stories" is a TLD without confirming its resolvability, before performing a resource location request, and in turn, errors upon resolution. This fact demonstrates that no such inventive step for determining HLD resolvability yet exists and has remain overlooked. There has not yet been a need to determine HLD resolvability because virtually all domain names registered to date have only two domain levels. Adding a TLD to create a domain name having a 3LD still remains unobvious to those skilled in the art. Only recently, as business partnerships and portal sites have grown, 3LDs are becoming more commonly used as a distinct address such as "infoseek.go.com" or "hotbot.lycos.com". Certainly, the increase in 3LDs over the next few years will necessitate such solutions as presented in this invention.

Figure 5:
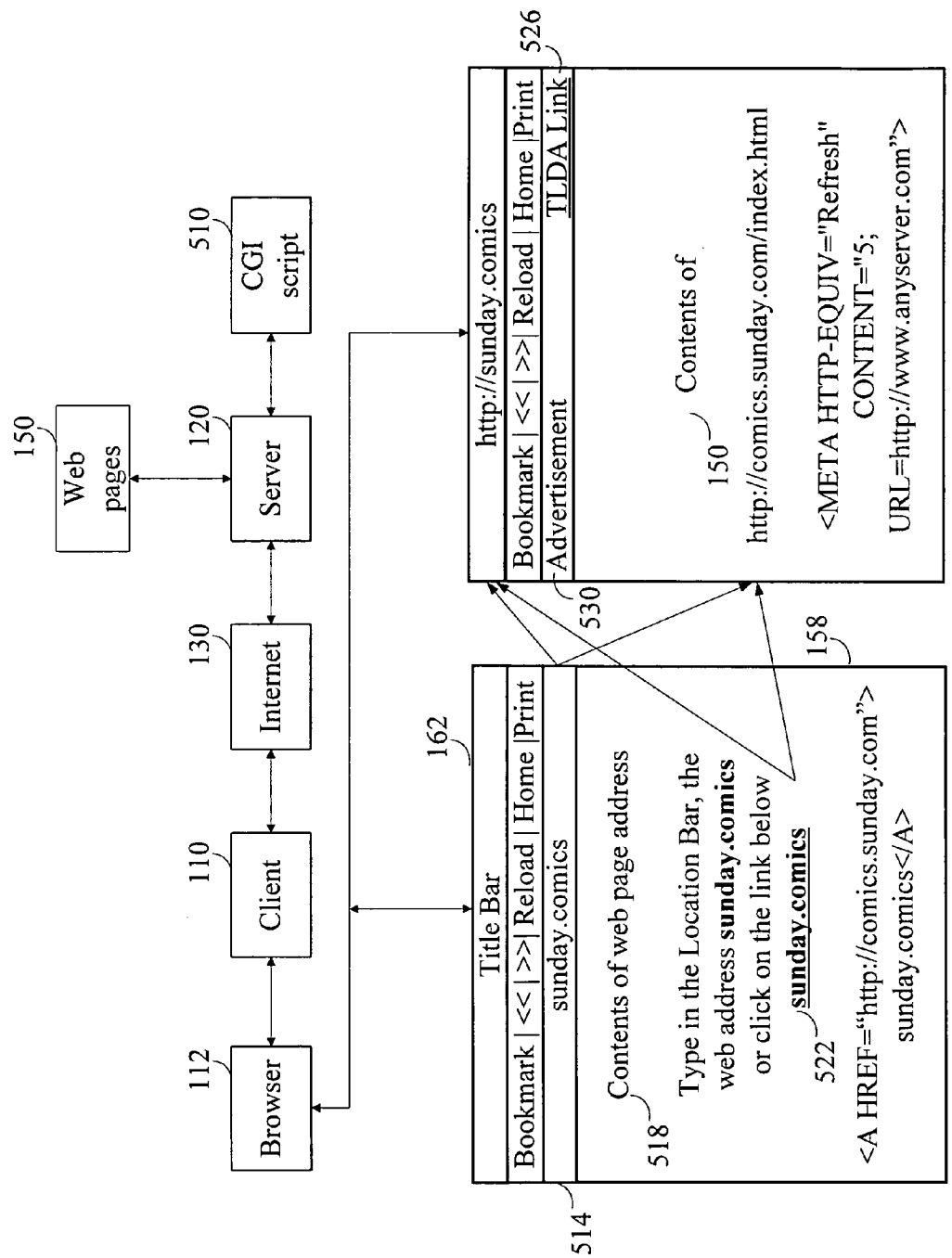
FIG. 5 is an illustration of how a web page emulates name space in accordance with the present invention.

Referring now to FIG. 5, a client 110 web browser 112 having a first displayed 158 web page is used to connect to a server 120 via the Internet 130 that executes a CGI script 510. The location field 154 of the web browser 112 is suppressed and the web page 158 displays at least two frames. The first frame is the web based location field 514 and the second frame 518 is used to display the contents 150 of a web address. An input device (e.g., keyboard, mouse, pen light, touch screen, or microphone etc.) of a client computer or network access apparatus 110 can be used to receive an input web address such as a domain name or URI 210' either directly from a hyperlink 522 in the displayed 158 web page, or from the web based location field 514 of the displayed 158 web page. The acceptance of input 210 from an input device causes the web browser 112 to generate a HTTP GET request. The web browser 112 forwards the request to a server 120, which processes the request by executing a CGI script 512 to determine resolvability. The CGI script 512 can then perform a registry lookup, access configuration settings, authorize and determine URI generation. A resolvable URI is generated and the requested web page 150 is sent to the web browser 112. The content 150 of the URI can be displayed in the second frame 518 of the displayed 158 web page. The URI having a TLDA is generated by the CGI script 512 and displayed in the title bar 162 of the displayed 158 web page and the web based location field 514 of the first frame could either persist by displaying the input 210 or cleared out for entering the next web address. Furthermore, the first frame may further include a hyperlink 526 to a TLDA directory service and related context sensitive advertising 530 retrieved from an advertising cache 192 as will be discussed.

The displayed 158 web page can include an HTML <META> tag as a means to further redirect to another URI after a specified period of time to allow for comprehension of content, accounting or statistical processing on the server side, and to display advertising wherein the content of such advertisements 530 may be context sensitive with respect to the TLDA name. For instance, "sunday.comics" is entered and resolved through the TLDA Rotation method yielding "http://comics.sunday.com". There is included in the page source a <META> tag with a ten second delay during which time an advertisement can be retrieved from an advertising cache 192 and displayed for MARVEL comics before the page is redirected to another web address. The context of the name is analyzed to match and display related advertising banners that exist in an advertising cache stored on either the client or server side.

When the displayed 158 web page is minimized, the content of the title bar 162 displays the fictitious URI "http://sunday.comics" in the taskbar of an operating system (OS) but yet the contents of the web page is retrieved from "http://comics.sunday.com" with no immediate visible identification of the URI for the page source. By so doing, persistence is maintained so that a fictitious domain name (FDN) appears to be have the same properties as a valid domain name (VDN) having a resolvable TLD, thereby achieving domain name space emulation.

The hyperlink 522 can be written as an HTML anchored reference tag that has a label. Web page development tools can include a program or script to create hyperlinks to resolvable URIs that were calculated from indicia such as fictitious domain name labels. This illustrates how another aspect of name space is emulated. The case when the label is underlined in a web page as a hyperlink having a destination that can be calculated from that label. For instance, "sunday.comics" is entered and a script will create an HTML anchored hyperlink <A HREF="http://comics.sunday.com">sunday.comics</A> that can be pasted into a HTML file for web page development. An HTML web page can already exist and the program can automatically parse and modify the web page for all hyperlinks by creating SLD.TLDA reference labels in association to such links for the purposes of displaying underlined SLD.TLDA labels to the user and keep name space emulation of the web page consistent. This inventive aspect is not limited to HTML but can be applied to other tagging systems including SGML, XML, etc. Emulation can further be applied to a plurality of e-mail applications by having scripts orchestrate a system of insertions and deletions or make use of a mail proxy server for altering header information such that the appearance of SLD.TLDA name space is emulated when sending and receiving e-mail.

Though the above aspect demonstrates how name space is emulated through a web based version 514 of a location field. The same teachings can be applied to those skilled in the art by providing a text box object as input that can be located anywhere and on any web page including a text box that is embedded or part of an on-line advertisement. The text box object can be used in a stand-alone application and stored on magnetic and/or optical media that is either non-volatile, writable, removable, or portable. The text box object can be incorporated as an applet or servlet and embedded in other applications. The text box can be integrated in the task bar or any part of the GUI's OS, or the OS bypassed and overlaid as a graphic on a display device based on modifications to a video card and/or it's associated firmware or software drivers. The command line text box can be further overlaid as an interactive graphical object in other embodiments such as Internet television, cable television, digital television, or interactive television through an Internet appliance or set top box.

Figure 6:
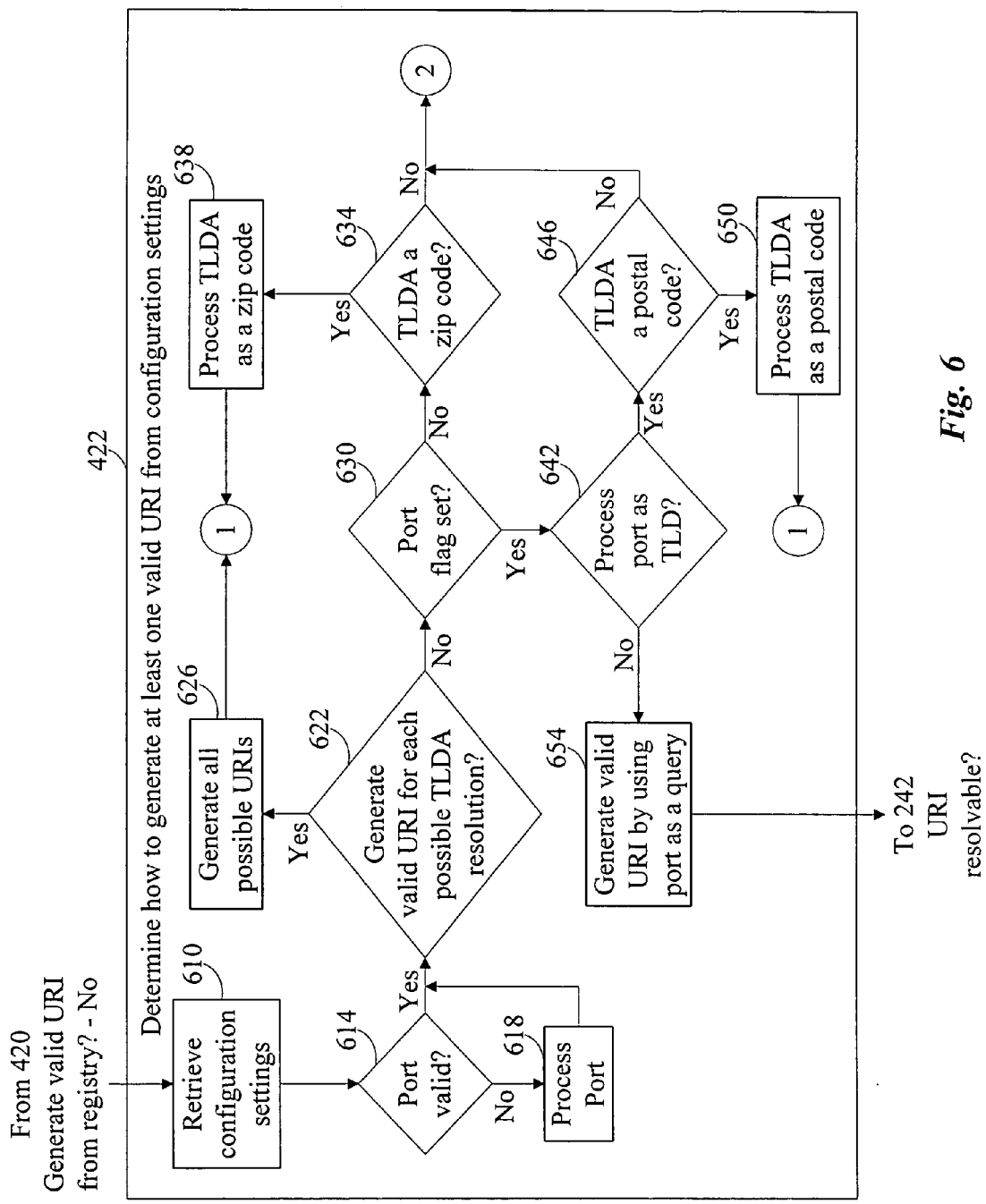
FIG. 6 is a flowchart illustrating the steps performed for determining how to generate at least one valid URI from configuration settings in accordance with the present invention.

Referring now to FIG. 6, specific steps for determining how to generate at least one valid URI from configuration settings are shown (step 422). Configuration settings 710 are retrieved in step 610. Port validity is determined in step 614 for input 210 having a port 274. When the port 274 is determined not valid in step 614 then the port is processed in step 618 (discussed in conjunction with FIG. 8). However, when the port 274 is determined valid in step 614, it is then determined in step 622 whether a valid URI for each possible TLDA resolution is generated. When this is the case, all possible URIs are generated in step 626, otherwise it is determined in step 630 whether a port flag is set. When the port flag is not set in step 630, then it is determined in step 634 whether the TLDA is a zip code by comparing the TLDA to a database 184 of zip codes (illustrated in FIG. 10*b*). When the TLDA is a zip code, the TLDA is processed as a zip code in step 638. However, when the TLDA is determined in step 634 not to be a zip code then further steps for processing the TLDA are discussed in conjunction with FIG. 11.

When the port flag is determined in step 630 as set, then it is determined in step 642 whether to process the port as a TLD or query. A determination is made by the specific kind of port flag that is set. When the set flag is a TLD flag, it is determined in step 646 whether the TLDA is a postal code by comparing the TLDA to a database of postal codes (illustrated in FIG. 10*b*). When the TLDA is a postal code, the TLDA is processed as a postal code in step 650. However, when the TLDA is determined in step 646 to not be a postal code then further steps for processing the TLDA are discussed in conjunction with FIG. 12. When the set flag in step 642 is determined to be a query flag, then a valid URI by using port as a query is generated in step 654. After URIs of any form are generated based on the previous steps (626, 638, 650, 654), processing can be continued by determining URI resolvability in step 242.

Turning now to FIG. 7, user modifiable configuration settings 710 includes a multi-resolution feature 720 for generating all possible URIs, a port aliasing feature 724 to allow the use of port information to generate a valid URI, a TLD calculation feature 728 to enable generation of a resolvable TLD from a TLDA through recursive truncation, a postal code feature 732 for processing a postal code as either a query or for ccTLD conversion, a TLD selection feature 736 to allow for a selected or default TLD to be used to add or replace the TLDA particularly when a TLD can not be calculated, and a URI redirect feature 740 which helps determine what resolution method is used to generate a valid URI.

Figure 8:
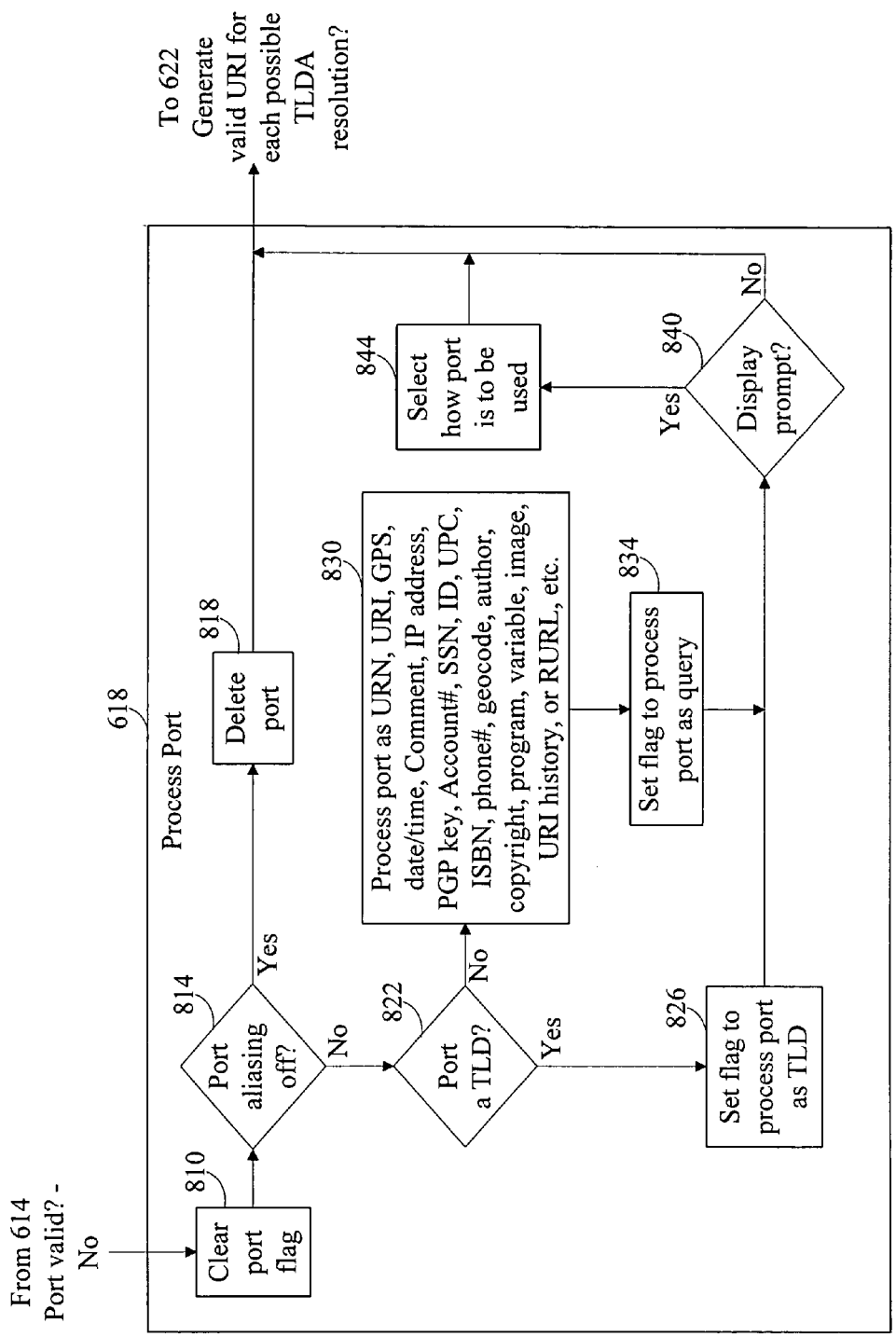
FIG. 8 is a flowchart illustrating the steps performed for processing an invalid port in accordance with the present invention.

Referring now to FIG. 8, specific steps for processing an invalid port are shown (step 618). First, a port flag is cleared in step 810. If port aliasing is OFF in step 814 as determined from the selection of the port aliasing feature 724 retrieved from configuration settings 710 then the port can be deleted in step 818 and no flags are set. When port aliasing is ON in step 814 and it is determined in step 822 that the port is a TLD then a flag is set in step 826 to process the port as a TLD. If port aliasing is on in step 814 and it is determined in step 822 the port is of other resource types 840 (e.g., URN, URI, GPS, date/time, Comment, IP address, PGP Key, Account#, SSN, ID, ISBN, phone#, geocode, Author, Copyright, program variable, image, URL history, or RURL, etc.) then a flag is set in step 834 to process the port as a query. After any flag is set and it is determined in step 840 from the port aliasing feature 724 retrieved from configuration settings 710 that the prompt user mode is selected, then a prompt in step 844 is displayed for a user to choose how the port information is to be used. The prompt in step 844 can be bypassed when it is determined that the port aliasing feature 724 is on. The invention also makes use of multiple URLs or recursive URLs (RURLs) which can be used to track navigational history or manage other functions in lieu of double delimiters (e.g., URLa is placed within the port of URLb which is placed within the port of URLc, etc). After port processing is performed, it can then be determined in step 622 whether a valid URI for each possible TLDA resolution is generated.

Figure 9:
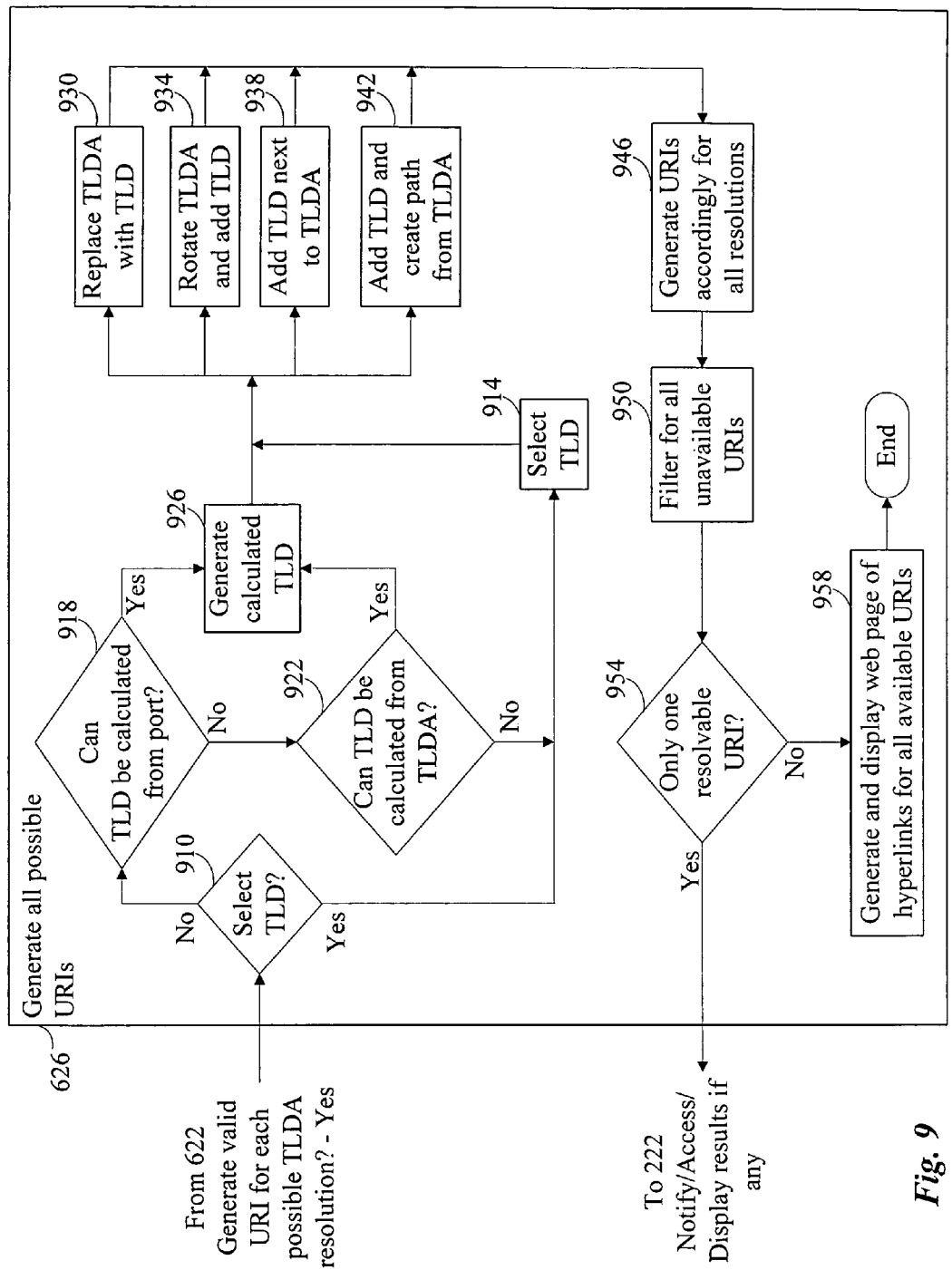
FIG. 9 is a flowchart illustrating the steps performed for generating and resolving at least one valid URI in accordance with the present invention.

Turning now to FIG. 9, specific steps for generating all possible URIs are shown (step 626). When all resolutions are determined to be calculated in step 622, it can further be determined whether a TLD is generated or selected in step 910. When the TLD is determined in step 910 to be selected, either a predetermined default TLD is retrieved or a list of TLDs is prompted for the user to select a TLD in step 914 based on the configuration settings 710 of the TLD selection feature 736. However, when the TLD is determined in step 910 is be generated instead of selected, then it is determined in step 918 whether a TLD can be calculated from the port. If not, then it is determined in step 922 whether a TLD can be calculated from a TLDA based on the configuration settings 710 of the TLD calculation feature 728 to enable generation of a resolvable TLD from a TLDA through recursive truncation.

When TLD calculation is enabled, an input such as "united.states" is redirected to "united.st", where ".st" is a resolvable ccTLD. Consider the input "free.love", ".lo" is not a resolvable ccTLD, therefore TLD calculation would not apply, yielding a default or selected TLD (e.g., ".com") to generate "http://free.com/love" as one outcome. There are 676 two-letter permutations (e.g., the set [aa..zz]) whereas there are only 243 ccTLDs creating a discrepancy for the application of TLDAs allowing only 36% of words to be used as TLDAs that can be resolved through the method of recursive truncation. A solution to allow unlimited usage of TLDAs is to include the use of port aliasing for TLD redirection. An extension of the above example would process the input of the form SLD.TLDA:TLD to yield a result of the form SLD.TLD/TLDA or TLDA.SLD.TLD (e.g., "free.love:to" yields "http://free.to/love" or "http://love.free.to").

If a TLD can not be generated from the port in step 918 or through recursive truncation in step 922 then a TLD is selected in step 914. If the TLD can be calculated from either the port in step 918 or TLDA in step 922 then the TLDA is replaced in step 926 with the calculated TLD. In both cases, whether the TLD was selected or generated, methods for URI name generation in steps (930, 934, 938, 942) are applied. All generated URIs in step 946 are filtered in step 950 for any unavailable URIs. If it is determined in step 954 that there is only one available URI, then results, if any, are notified, accessed, and/or displayed in step 222. When it is determined in step 954 that there is more than one available URI, a web page is generated in step 958 by displaying all available URIs as hyperlinks. URI availability is determined by transparently initiating a HTTP (GET, POST, OR HEAD) request and receiving a HTTP RESPONSE message having a status code. If a response message is not received, timed-out, or returns a numeric status code of "400" or higher then it is determined that the URI is unavailable. All unavailable links can then be filtered by removing such links before displaying or redirecting results. Other protocols can be used to make similar availability determinations.

Figure 10A:
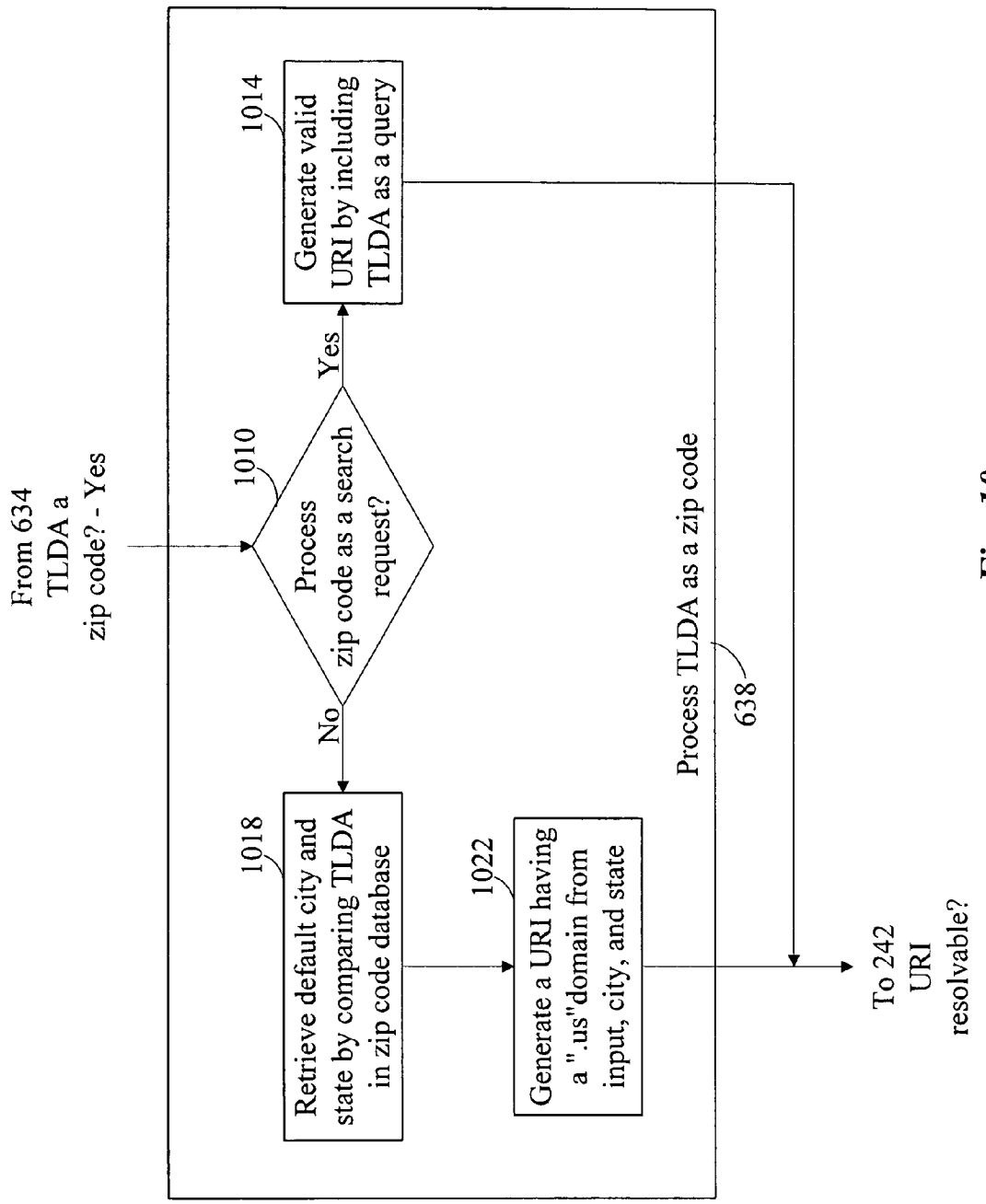
FIG. 10a is a flowchart illustrating the steps performed for processing a TLDA as a zip code in accordance with the present invention.

Referring now to FIG. 10a, specific steps for processing a TLDA as a zip code are shown (step 638). First it is determined in step 1010 whether the zip code TLDA is processed as a search request by retrieving the status of the postal code feature 732 from the configuration settings 710. When the zip code TLDA is processed as a search request, a valid URI is generated in step 1014 by including the zip code TLDA as a query. For instance, "example.44116" is received as input and then determined that the TLDA ".44116" is to be processed as a search request resulting in the generated URI "http://example.com/cgi-bin/tlda.cgi?zip=44116". Quite often a zip code is used at a web site to help personalize search results by locating geographic specific information to the user. For instance, a user may access the URI "http://example.com" and then enter a zip code such as "44116" into a text box object that processes zip codes. Results are obtained in two steps. By entering "example.44116" as input, more specific personalized results pertinent to the user are generated in one step.

When it is determined in step 1010 that the zip code TLDA is processed as a zip code, then default city and state data can be retrieved in step 1018 by comparing the TLDA in the zip code database 1040 (FIG. 10b). A URI is generated in step 1022 by combining the input 210 with the retrieved default city and state and concatenating ".us" as the default ccTLD. For instance, "example.44116" is entered as input and yields the resulting URI "http://example.rockyriver.oh.us". There are many zip codes that match a city and many cities that match a zip code. Because of this it is possible to yield many URIs from input thus creating a one to many correspondence between input and URI. FIG. 10b illustrates the data structure of a zip code database that includes a logical field labeled "default" which is one technique used (as discussed in conjunction with FIG. 10a) to assure uniqueness of URI generation assuring a one to one correspondence between zip code and city.

Figure 10C:
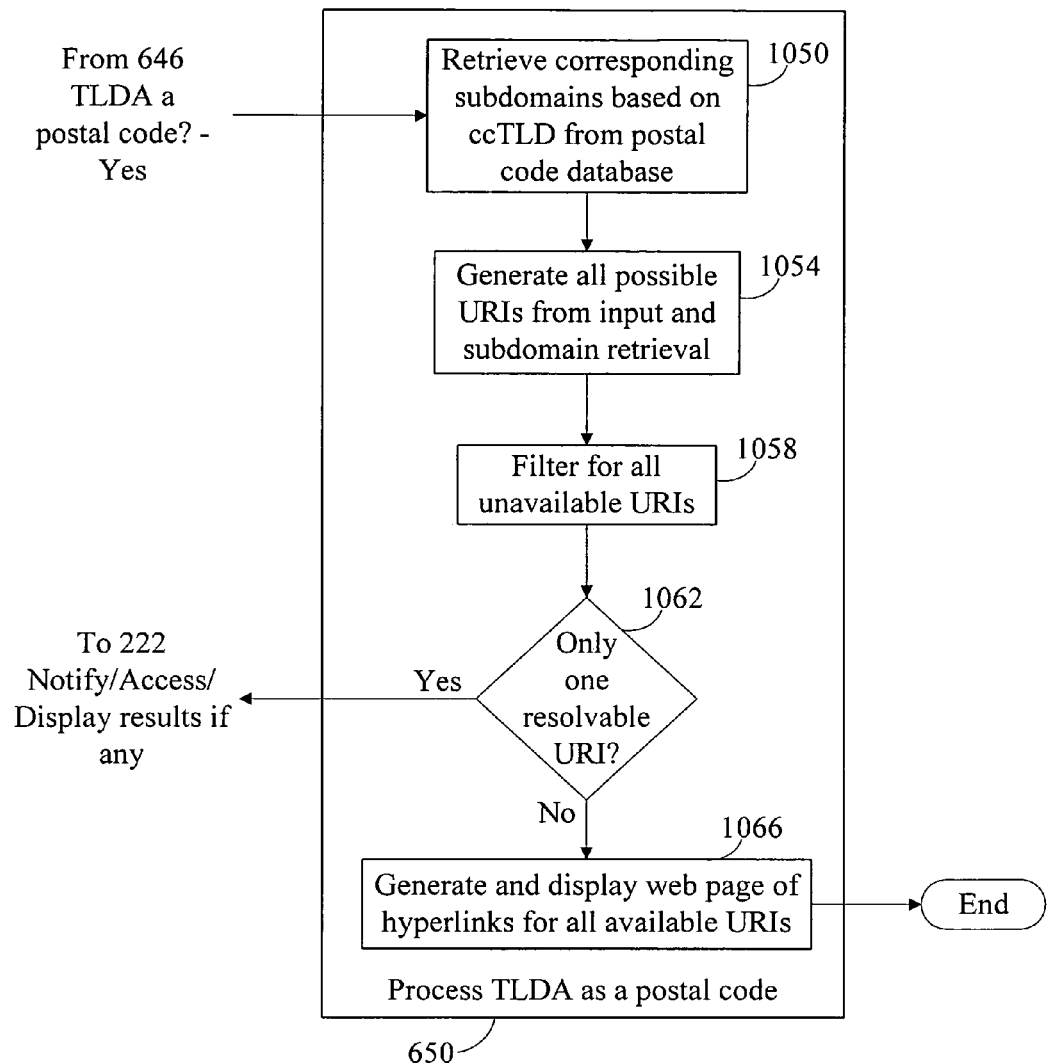
FIG. 10c is a flowchart illustrating the steps performed for generating at least one valid URI from a postal code in accordance with the present invention.

The zip code database can be part of a larger more generalized postal code database. The postal code database provides conversion for other ccTLDs besides the ".us" domain. Turning now to FIG. 10c, specific steps for processing a TLDA as a postal code are shown (step 650). When the port is a ccTLD and the TLDA is a postal code then corresponding subdomains based on the ccTLD and TLDA can be retrieved in step 1050 from a postal code database. All possible URIs are then generated in step 1054 from the input, ccTLD, and subdomain retrieval. All generated URIs in step 1054 can be filtered in step 1058 for any unavailable URIs. If it is determined in step 1062 that there is only one successful resolution, then results if any, can be notified, accessed, and/or displayed to the user in step 222. When it is determined in step 1062 that there is more than one resolvable URI, a web page can be generated in step 1066 by displaying all resolvable URIs as hyperlinks.

For instance, "example.44116" is entered into the location field 154 of a web browser 112. "44116" is parsed and determined to be a TLDA, and more specifically represents a zip code. The lookup table as shown in FIG. 10b is utilized to generate at least one URI from "44116". An HTML web page is generated which includes two links.

<HTML><BODY>
<B><U><CENTER>Results for example.44116</CENTER>
</U></B><HR>
<A HREF="example.cleveland.oh.us">example.cleveland.oh.us</A>
<BR>
<A HREF="example.rockyriver.oh.us">example.rockyriver.oh.us</A>
</BODY></HTML>

If "example.cleveland.oh.us" is available for display but "example.rockyriver.oh.us" is not available, then the browser is automatically redirected to the one and only available URI.

Another method to assure a one to one correspondence is by using ZIP+4 as a more precise means for determining city and state. In fact, ZIP+4 creates enough of a distribution to offer uniqueness for registrants of a given ZIPSPACE™. For instance, a registrant who holds the ZIPNAME™ "example.44118-3204" can distribute such indicia through different media sources. The name is used as a send or return address indicia on mail and parcel either in print or as machine readable code. This allows recipients to respond electronically and allows postal workers to more quickly route materials to their destination. The indicia creates a way to easily connect an e-mail address to a physical location to be used for sending billing information without disclosing a full mailing address. A utility program can be used to convert the indicia to be printed as machine-readable code on labels to be used for sending and receiving mail.

Figure 11:
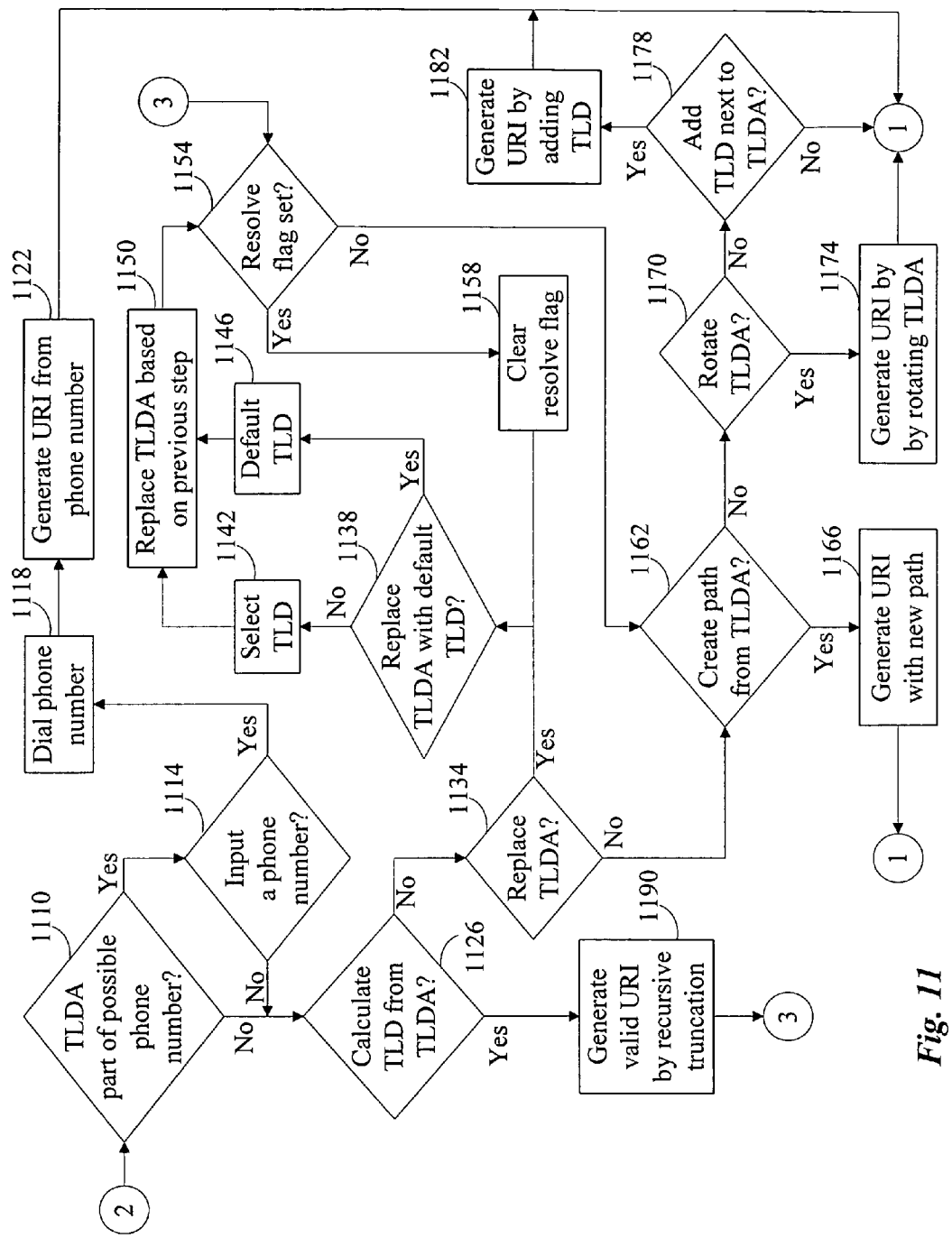
FIG. 11 is a flowchart illustrating the steps performed for traversing a hierarchy of name resolution decisions in accordance with the present invention.

Referring now to FIG. 11, further steps for TLDA processing can be performed upon determination that the TLDA is not a postal code or more specifically a zip code. When it is determined in step 1110 that a TLDA is part of possible phone number, and input 210 represents a phone number in step 1114, then the phone number can be dialed in step 1118 and a URI corresponding to the phone number can be generated in step 1122. If the TLDA is determined in step 1110 or input is determined in step 1114 to not correspond to a phone number, and the TLD is not calculated from the TLDA in step 1126 based upon the TLD calculation feature 728 from the configuration settings 710, then it can be determined in step 1134 whether the TLDA is to be replaced by the URI redirect feature 740 from the configuration settings 710. If so, then it can be determined in step 1138 whether the TLDA is replaced with a selected TLD in step 1142 or a default TLD in step 1146. In either case, a URI can be generated in step 1150 with the parsed input and the selected TLD from either step 1142 or 1146.

If the resolve flag is determined in step 1154 to be set, which can only occur when the TLD calculation feature 728 from the configuration settings 710 is active (to be discussed in more detail in conjunction with FIG. 12) then the resolve flag is cleared in step 1158 and it is determined in step 1138 whether the TLDA is replaced with a selected TLD or default TLD as discussed above. When the resolve flag is determined in step 1154 to be not set, or it is determined in step 1134 that the TLDA is not replaced, then it is determined how the URI is generated if at all. If it is determined in step 1162 by the URI redirect feature 740 from the configuration settings 710 that the TLDA is used to create a new path, then a URI is generated in step 1166 by using the TLDA to create a new path. If not, and it is determined in step 1170 by the URI redirect feature 740 from the configuration settings 710 that the TLDA is to be rotated from the HLD to the LLD, then a URI is generated in step 1174 by rotating the TLDA. If not, and it is determined in step 1178 by the URI redirect feature 740 from the configuration settings 710 that a TLD is to be added, then a URI is generated in step 1178 by concatenating the TLD after the TLDA making it the HLD. In all cases when a URI is generated (steps 1122, 1166, 1174, 1182) URI resolvability is then determined in step 242. When it is determined in step 1126 that a TLD is to be calculated from the TLDA then a URI is generated in step 1190 by recursive truncation.

Figure 12:
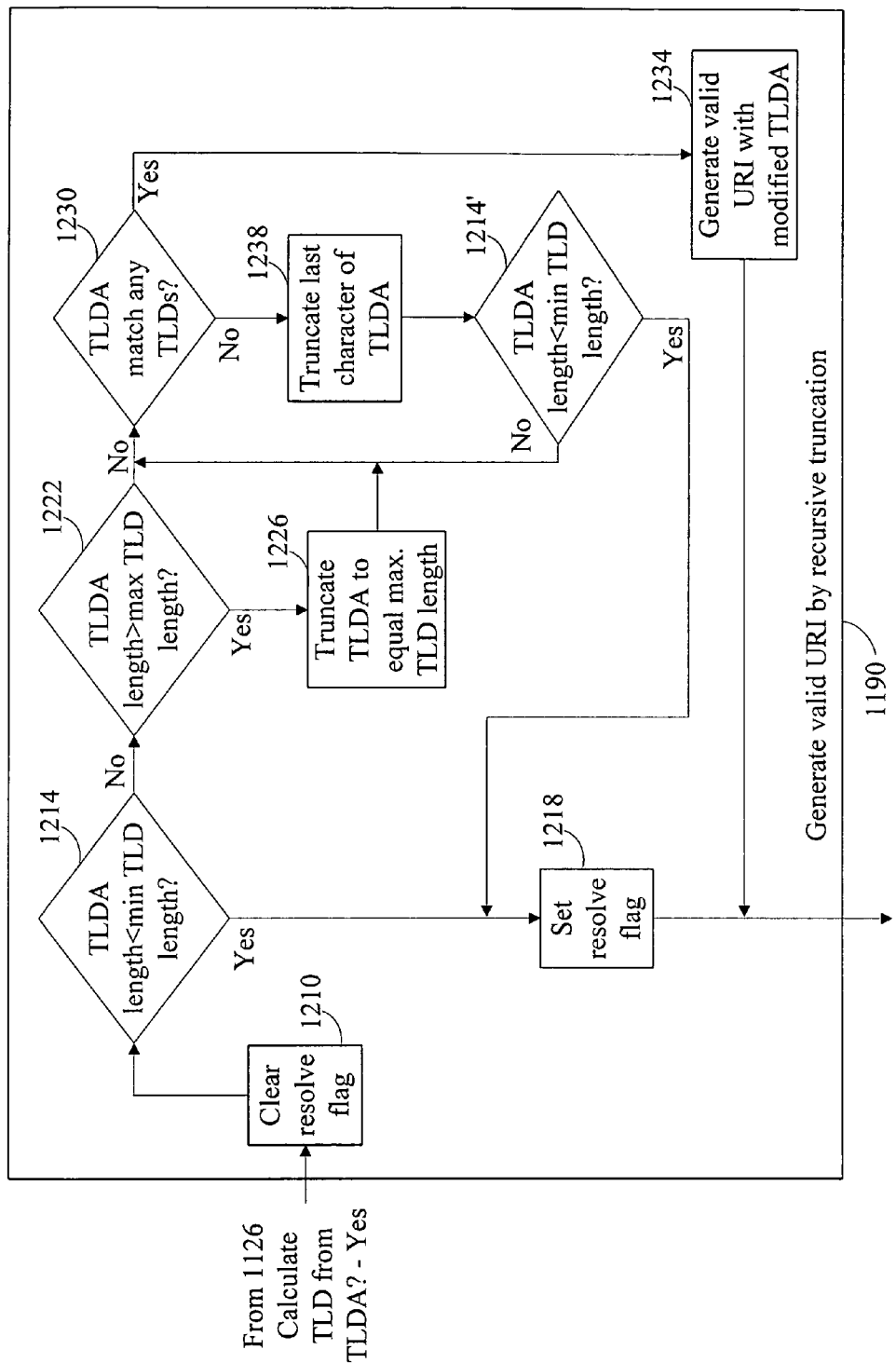
FIG. 12 is a flowchart illustrating the steps performed for generating a valid URI by recursive truncation in accordance with the present invention.

Turning now to FIG. 12, specific steps for URI generation by recursive truncation are shown (step 1190). First, a resolve flag is cleared in step 1210. The values of the minimum and maximum character length from the list or database of resolvable TLDs is determined or predetermined [e.g., Min. Length=len(ccTLD)=2 and Max. Length=len (gTLD)=3]. If the TLDA length is less than the minimum TLD length as determined in step 1214 then the resolve flag is set in step 1218. If the TLDA length is greater than the maximum TLD length as determined in step 1222 then the TLDA is truncated in step 1226 to equal the maximum TLD length. When the TLDA length is not greater than the maximum TLD length or when the TLDA is truncated in step 1226 and the modified TLDA matches any TLDs in step 1230 then a new URI is generated in step 1234 with the modified TLDA. When there is no match in step 1230, then the last character of the modified TLDA is truncated in step 1238. If the modified TLDA length is less than the minimum TLD length as determined in step 1214' then the resolve flag is set in step 1218. If this is not the case, then steps 1230, 1238, and 1214' are repeated to perform recursive truncation until the modified TLDA either matches a TLD or is less than the minimum TLD length.

FIG. 13 shows a table of input and the variety of corresponding URIs generated as a result from processing such input. Row 1 shows prior art of generated output from input. Row 2 shows a variety of URI generations from a FDN having a TLDA. Row 3 shows how input with invalid ports can be processed. Row 4 shows how phone numbers can be processed. Row 5 shows how postal codes can be processed. Row 6 shows how e-mail can be processed.

Figure 14A:
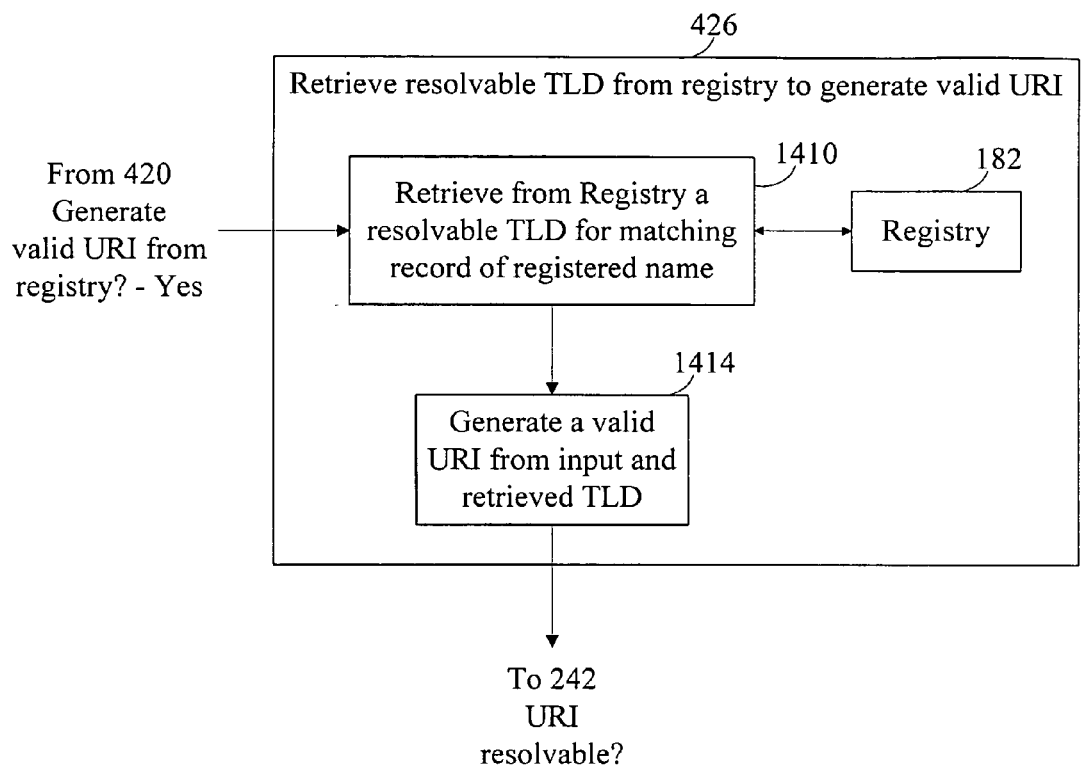
FIG. 14a is a flowchart illustrating the steps performed for retrieving a resolvable TLD from a registry to generate a valid URI in accordance with the present invention.

Though a user can adjust configuration settings (as discussed in conjunction with FIGS. 7, 8, 9, 10a, 11) in lieu of accessing a registry or translation database for URI generation through different methods of calculation/resolution, such configurations can be cumbersome adding extra steps for the user to obtain desired results. Accordingly, FIG. 14a shows how a registry is used (in lieu of configuration settings) instead to generate a valid URI (step 426). First, a registered resolvable TLD is retrieved in step 1410 from a matching registration record of the registered name in the registry 182 and then a valid URI is calculated and generated in step 1414 from the parsed input 210 and retrieved resolvable TLD.

FIG. 14b illustrates an aspect of the data structure or registration record of the registry 182 including information such as but not limited to registered name 1420 and registered resolvable TLD 1424, registrant name, address, phone number, e-mail address, password, expiration date, or miscellaneous psychographic and demographic information. Though retrieval can be performed directly from the registry 182, the data structure illustrated in FIG. 14b can be redundantly stored as a database separate from the registry 182 for the sake of minimizing storage and retrieval time and database updates. This separate database is more specifically referred to as the name translation database 178. When a registry 182 is used directly to retrieve the minimum information needed to generate a valid URI then the registry 182 is performing the equivalent function of the name translation database 178. FIG. 14c illustrates the minimum data structure of the name translation database 178 including a registered name 1420 and a registered resolvable TLD 1424.

By using a registry 182 or name translation database 178 to correspond a registered resolvable TLD 1424 with input having a TLDA enables a wider and more balanced distribution of name space. For example, "search.me" can be registered to "search.com", "search.again" can be registered to "search.net", and "search.fast" can be registered to "search.to". Any user or registrant who is the domain name holder of "search" as a SLD for any given resolvable TLD qualifies the registrant to correspond "search" in the form search.TLDA (or TLDA.search), where TLDA can have infinite aliases. The use of a registry 182 to translate a TLDA into a corresponding resolvable TLD (rather than translating ".com" by default) allows for many names in the form of SLD.TLDA to compete with the form of SLD.COM thereby enabling the creative purchasing of domain names around the globe. By providing a TLD registry, SLD holders (who may share similar trademarks) across different TLDs can now compete by registering TLDA names and emulate a shared SLD name space thereby reducing the likelihood of trademark disputes.

Generic TLDAs (gTLDAs) or any TLDA can be reserved for the purpose of creating directories of sitemaps and white pages, etc. For instance, when indicium such as ".sitemap" is received (as input) by a browser (or the like), and only a TLDA is detected, then the browser can be automatically redirected to a URI such as "http://tlda.com/directories/sitemap/index.html". The content accessed via the URI lists a directory or sitemap of all entities who have registered a FDN that includes the ".sitemap" TLDA. When other TLDAs are received (e.g., ".cars", ".sports", ".movies", etc.), a user could be redirected to a vertical market directory service that can be endorsed, branded, and sponsored by organizations that serve such markets. For example, the ".cars" directory service can be endorsed by GM, Ford, and Chrysler or the ".sports" directory service can be sponsored by the NFL, MLB, and NBA, etc. When output to the browser is rendered from a FDN having a TLDA, the web based location field 514 may further include a hyperlink 526 and retrieve from an advertising cache 192, context-sensitive advertising 530 to the corresponding TLDA directory service so when a user is at the "acme.cars" web site, there is a link to access the ".cars" directory service for finding industry information or competitor pricing and the like. In effect, new information spaces are created as a result of reorganizing how TLDA name space is distributed to SLD holders.

Redirection to directory services can further include TLDs and SLDs as well. For example:

.game=TLDA directory service for all registered FDNs that include ".game"

.net=TLD directory service for all registered VDNs that include ".net"

name. =SLD directory service for all registered FDNs and VDNs of the form

"name.TLD" or "name.TLDA"

Component Data and Resolution Methods

A resolvable TLD can be further considered a data element or component data that is used with other data elements to form a URI. For instance, protocol, hostname (including all domains and subdomains), port, path, query, or fragment of a URI are regarded as data elements used as component data for generating a resolvable URI. All combinations for concatenating component data that does not yield a full URI is referred to as a Partial Uniform Resource Identifier (PURI). The same applies for Partial Uniform Resource Locators (PURLs) and other similar resources.

Since there are numerous combinations of PURIs within a given URI, each combination can be assigned a unique resolution/generation/calculation method for determining how to arrange the individual data elements of the component data to form a PURI. Using the registry 182 or name translation database 178 for retrieving a registered resolvable TLD 1424 is only one resolution method. TLDA truncation, TLDA rotation, TLDA path, delimit TLDA, or ignore TLDA etc. as discussed earlier are examples of other methods. In fact, any method including multi-resolution methods, port and recursive resolution, or zip code resolution of ZIPNAMES™ can be used as a method of resolution/calculation/generation of the present invention.

Each resolution method can be assigned a method number/template number (templates can be selected and specified as will be discussed) which further corresponds to a set of heuristics or rules such as a database of procedure calls that specify a function with the associated parameters such as component data or other fields in the name translation database that are used for generating a resolvable URI from a registered name. For example, method number "4" could call the TLDA Path procedure which uses a registered resolvable TLD as its only parameter. Method number "5" can call the TLDA rotation procedure and so forth. As noted, the particular selection and arrangement of component data can be assigned a method number with a corresponding procedure call and parameters that are used for URI generation.

For instance, method number "27" can equal the retrieval of scheme and port information only to be combined with the fictitious domain name in question to calculate and generate a valid URI whereas method number "28" could equal the retrieval of port, path, and TLD information for URI generation. Furthermore, resolution methods can also be assigned to providers that maintain registries in other name spaces or alternative naming systems (e.g., method number "15" can represent the retrieval of a registered name in Netword's registry).

Another resolution method is using the TLDA as a query to call a procedure and have the TLDA function as a search request or variable: "top.stories"="http://top.st/index.cgi?tlda=stories"

Though a URI can be generated from the TLDA search method by default without a translation database, a more versatile approach for processing a TLDA as a search request is to allow a registrant to specify a search string as part of the registry along with a method number which denotes how the registered name is resolved.

For example, the registrant for "yahoo.lawyer" can select the TLDA search method from a list of resolution methods, which may include other variations of TLDA search or any other method type. The user might enter a search string such as "http://search.yahoo.com/bin/search?p=" which is stored as component data in the registry or name translation database. After registration, when a device receives, by any means, the fictitious domain name or registered name "yahoo.lawyer" for use by the invention, it is detected that ".lawyer" is a TLDA and then determined from the name translation database that method number "40" which is a TLDA search method can be used to call a function which requires a registered search string corresponding to "yahoo.lawyer" for generating a resolvable URI. More specifically, method number "40" concatenates the search string with the TLDA to form the URI. As a result of the function call, the valid URI generated and resolved is:

"http://search.yahoo.com/cgi-bin/search.cgi?p=lawyer"

Quite often a zip code is used at a web site to help personalize search results by locating geographic specific information to the user. Another example of the TLDA search method is by receiving the name "yahoo.44106" to be processed by a device, network access apparatus 110, command line, or location field 154 of a web browser. By configuring and registering a resolution method to such a name, the steps of accessing a resource and then searching a resource are combined into a single step by simultaneously accessing and searching a given resource where SLD.TLDA takes the form SLD.SEARCHTERM creating a FDN. The search term used for personalized content is not limited to zip codes but can include any search term or identifier associated to the geographic, demographic, or psychographic identification or profile of a user (identifiers such as account number, license plate, telephone number, address, e-mail address, or social security number etc.) wherein the results of such indicia or TLDA name form a sense of personalized results.

By registering a resolution method, the processing of a zip code TLDA as a ccTLD web address or as a search term can be determined. The present invention can be further modified to consider both methods appropriate and filter and display all available links of generated URIs based on processing a plurality of methods at the same time.

For instance, "weather.44116" is received as input by a device. The ".44116" is parsed and determined to be a TLDA, and more specifically represent a zip code. The zip code lookup database is utilized to convert "44116" into the appropriate address, and "44116" is further used as a search term at the resolvable domain name "weather.com". An HTML web page can be generated which includes three links.

<HTML><BODY>
<B><U><CENTER>Results for weather.44116</CENTER>
</U></B><HR>
<A HREF="http://weather.cleveland.oh.us">weather.cleveland.oh.us</A>
<BR>
<A H REF="http://weather.rockyriver.oh.us">weather.rockyriver.oh.us</A>
<BR>
<A HREF="http://weather.com/index.cgi?zip=44116"> LOCAL WEATHER</A>
<BR>
</BODY></HTML>

If both "weather.cleveland.oh.us" and "weather.rockyriver.oh.us" are not available, leaving only one available link, then the user can be automatically redirected to the third link listed above and access the resource for local weather.

Each resolution method further includes what component data, if any may be stored in the registry 182 or name translation database 178. The registry 182 can be expanded to support more than registered resolvable TLDs. Such component data may further include domain aliasing for any combination of subdomains other than that of the HLD. FIG. 15*a* illustrates an expanded data structure of the registry 182 or name translation database 178. Users can also register component data 1510 or register a method number 1514 corresponding to a resolution method that is stored in the registry 182 or name translation database 178 for use by the present invention. When a method number 1514 is retrieved, a function can be called to perform a specified calculation that may include corresponding parameters used for string manipulation to derive and generate a resulting valid URI.

These methods of resolution can have a definable ranking or hierarchy by enabling registrants to favor resolution methods that may provide a strategic buying advantage or gain broader appeal for the distribution of the registered name as indicia. For instance, input such as "united.states" can take ranking or precedence over "united.foods" when translating such input to the URI "http://united.st" (TLDA truncation as a resolution method takes precedence over TLDA replacement). If "united.states" is registered for truncation, to maintain uniqueness, "united.foods" can be registered for replacement as long as the registered resolvable TLD is not ".st" otherwise "united.foods" can be registered for say TLDA rotation as a resolution method to yield "http://foods.united.st". FIG. 15*b* is a table that lists different resolution methods and arbitrary associated ranking or priority level. Though the illustration shows different ranking versus method numbers, the method number that denotes a resolution method may be constructed to equal the ranking or priority of the resolution method. In addition, the Form column shows (with the exception of rows rank 7 and 8) the relationship between input of the form SLD.TLDA and the resulting form after a resolution method has been applied. Rows rank 7 and 8 show how these resolution methods can be further applied to 3LDs or other level domains as needed. Regardless of the number of domain levels, there can remain a corresponding relationship between a N-level FDN (as a trademark) and a (N+1)-level VDN.

Figure 16:
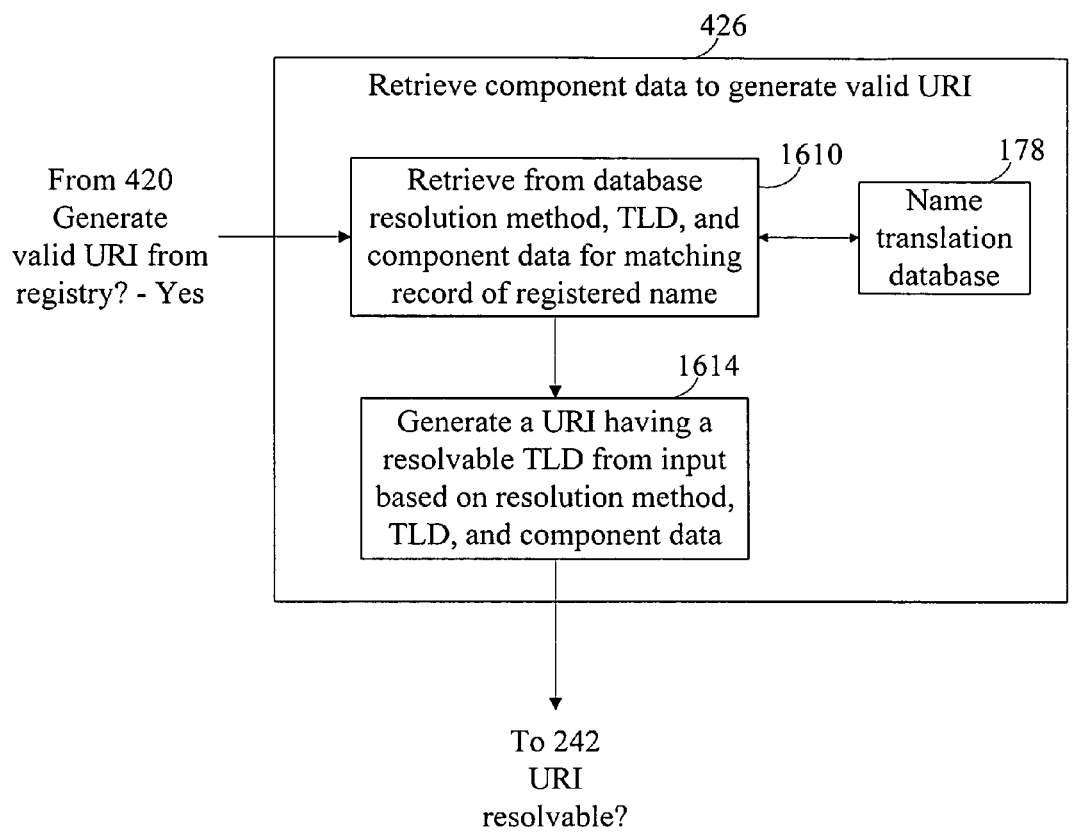
FIG. 16 is a flowchart illustrating the steps performed for retrieving component data from a name translation database to generate a valid URI in accordance with the present invention.

Referring now to FIG. 16, a broader set of steps can be performed (in lieu of steps illustrated in FIG. 14*a*) for URI generation by retrieving component data from a name translation database 178 are shown (step 426). When it is determined in step 420 that a valid URI is generated from a registry instead of configuration settings then any combination of resolution method, resolvable TLD, and/or component data can be retrieved in step 1610 from the name translation database 178 having a matching record of the registered fictitious domain name. A URI having a resolvable TLD can then be generated in step 1614 from input 210 based on the retrieved resolution method, TLD, and/or component data.

Figure 17:
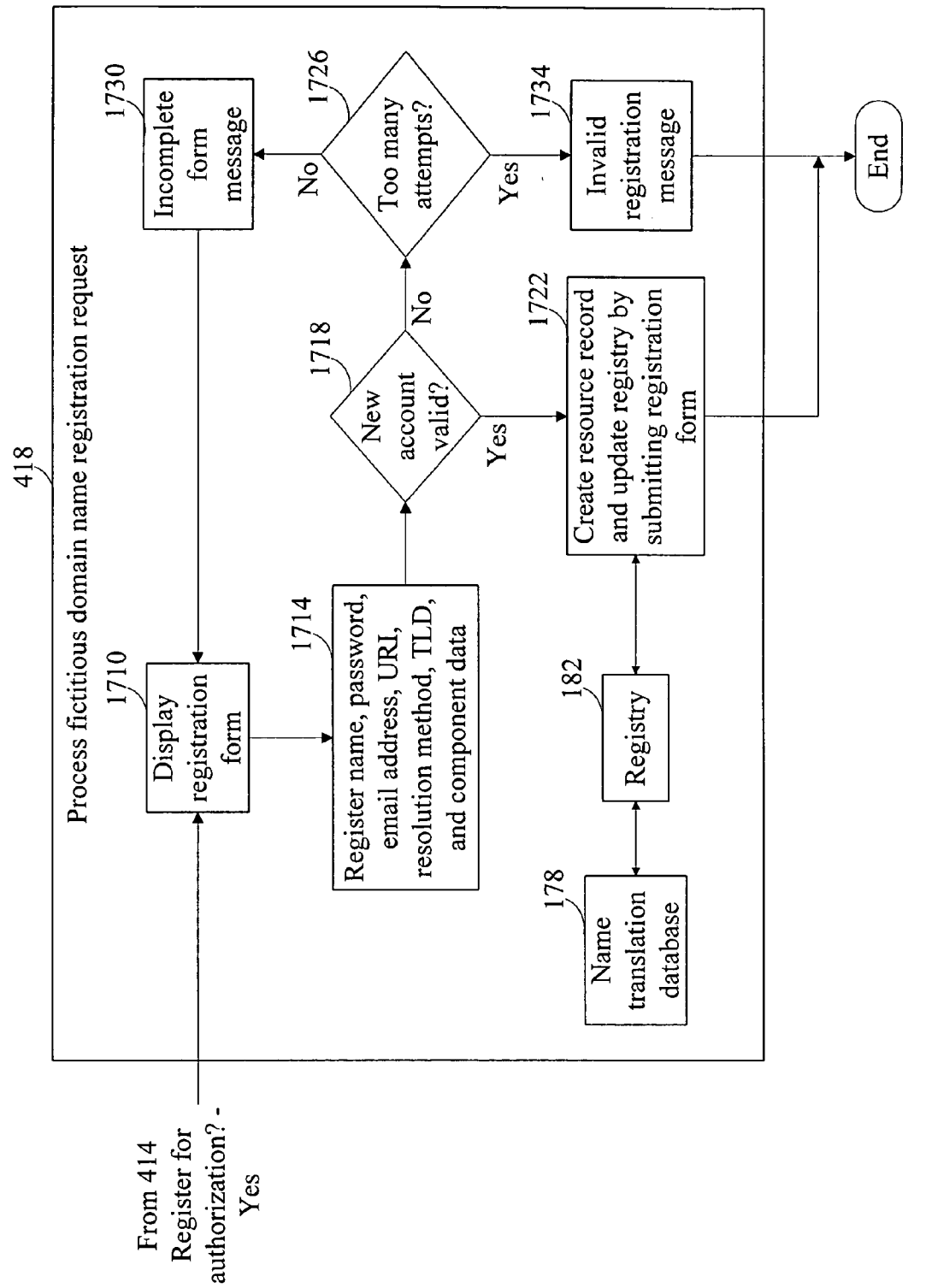
FIG. 17 is a flowchart illustrating the steps performed for processing a fictitious domain name registration request in accordance with the present invention.

Turning now to FIG. 17, specific steps for processing a fictitious domain name registration request are shown (step 418). When it is determined in step 414 that authorized registration is desired, a registration form can be displayed to the user in step 1710. When new information such as but not limited to registered name and registered resolvable TLD, registrant name, address, phone number, e-mail address, password, expiration date, and miscellaneous psychographic/demographic information, etc. is registered in step 1714 and the new information is determined valid in step 1718 then a new account is created in step 1722 and the registry 182 and name translation database 178 are in turn updated by adding a newly created registration/resource record. If the account is determined not valid in step 1718 and it is determined in step 1726 that there have not been too many registration attempts then an incomplete form message is displayed in step 1730 and the registration form can be redisplayed and corrected in step 1710. However, when it can be determined in step 1726 that there are too many registration attempts then an invalid registration message is displayed in step 1734.

URI Notation

URIs can be generalized by the following notation:
URI=prefix(PURI)+name+suffix(PURI)
where there exists at least a prefix, a suffix, or both.
Other equivalents to the above notation are:
URI=prefix(PURI)+name
URI=name+suffix(PURI)

EXAMPLE name="name.game"
prefix(PURI)="http://www2.same."
suffix(PURI)=".com/samegame/index.html"
name=either a FDN, VDN, keyword or other identifier A registrant provides a prefix and/or suffix associated with a FDN. When the FDN is entered in the location field 154 of a web browser 112 or command line of a device, it is determined that the FDN does not have a resolvable TLD. A resolution method and its corresponding component data such as the prefix and/or suffix listed can be retrieved from the registry to determine how to calculate and generate a resulting URI.

The resultant URI from the above example is: "http://www2.same.name.game.com/samegame/index.html"

As mentioned, each combination of PURI can be assigned a unique resolution method for determining how to arrange the individual data elements of the component data to form the PURI prefix. For instance the separate component data, scheme (http), web (www2), domain (same) can be registered and used by either a preset or user defined resolution method to concatenate the component data or data elements to form the PURI prefix of "http://www2.same." in lieu of a separate PURI (prefix) entry upon registering "name.game". A resolution method can call a function, procedure, or template that defines the specific component data parameters and their respective arrangement to generate a valid URI.

Extending Usage of Registered Names

A registered name can serve extended use by adding a prefix/suffix delimiter to augment the original function of the name. For example "name.game" is registered with resolution method "4" yielding the valid URI "http://name.net/game/index.html". In the case where "name.game" is used as indicium to yield a calculated destination address, the indicia can be modified with the following notation: "@name.game", where "@" is a prefix delimiter that designates the use of the "mailto:" protocol. A destination e-mail address becomes an additional field in the registry 182 and/or corresponding name translation database 178. There are other prefix delimiters that can be also used.

—!name.game=paging/instant messaging
@name.game=e-mail
name.game=phone number
*name.game=fax
$name.game=payment
?name.game=WHOIS record Input parsing 210 can be modified to detect a prefix (or suffix) delimiter so as to determine which destination address to retrieve from the registry 182 or name translation database 178. Extra fields such as e-mail, phone number, fax, RTN/BIN, IRC/ICQ Channel, or link to a WHOIS record, etc. can also be included in the registry 182 or name translation database 178 to support the extended use of a registered name. This allows for variations of the same fundamental registered name to expand the functionality of its use. There are reserved symbols from a given character set that are assigned as prefix delimiters. The list of prefix delimiters listed above are only a few examples of extended usage for the purpose of illustration and such delimiters and their corresponding functions can be expanded as needed. In summary, the present invention can process both prefix and suffix delimiters to resolvable domain names and FDNs.

Figure 18:
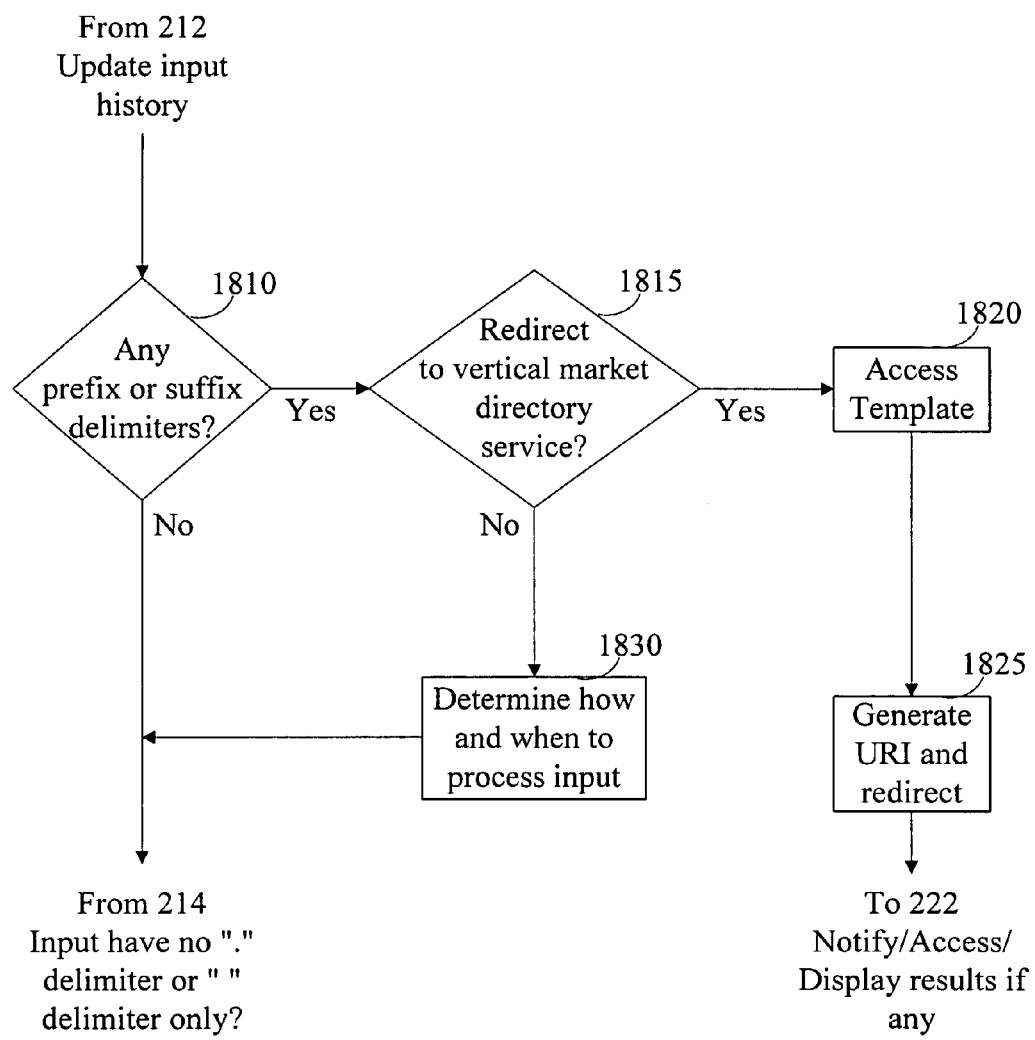
FIG. 18 is a flowchart illustrating the steps performed for processing a prefix or suffix delimiter in accordance with the present invention.

FIG. 18 illustrates the steps for processing detected prefix/suffix delimiters. After input is read and parsed in step 210, it is determined in step 1810 whether the parsed input includes any prefix or suffix delimiters. If there are no such delimiters then processing is continued in step 214. However, when there is such a delimiter it can further be determined in step 1815 whether the input is redirected to a vertical market directory service (as discussed earlier). If so, then a corresponding template 188 is accessed in step 1820 and used to generate and redirect to a valid URI in step 1825. Results if any can then be either notified, accessed, and/or displayed in step 222. When input is not redirected to a directory service (step 1815), then it can be determined in step 1830 how and when to process input. Processing can then be continued in step 214.

Distribution of Indicia

As discussed, generated URIs can serve as a control point for an entity to track demographics, accounting data, or display targeted advertising to a user before redirecting the generated URI to a final destination. For instance, an entity that controls the domain name "united.st" can distribute indicia such as fictitious domain names through different media sources. The entity can advertise "united.states" on television, "united.steel" in the newspaper, "united.stores" on the radio, or "united.stamps" on the Internet. All such indicia can be calculated to generate unique URIs that are resolvable through the "united.st" domain and at the same time measure response rate per media to determine market share and effectiveness of targeted advertising.

The indicia is not limited to being advertised as readable characters but can be used for automated retrieval by encoding such indicia as machine-readable but practically indiscernible by most humans such as a glyph, or one-dimensional or a two-dimensional bar code. Examples of one-dimensional bar codes include, but are not limited to, 3 of 9, UPC-A, Code 128, Codabar, MSI, Extended 3 of 9, Code 93, Extended Code 93, Industrial 2 of 5, Standard 2 of 5, Code 11, and UCC/EAN-128. Examples of two-dimensional bar codes include, but are not limited to, Data Matrix and PDF417. The indicia can also be printed to be invisible to the end user but readable by an input device such as an optical reader. If desired, the indicia can be selected to be readable by more than one type of data reader. For example, printed data can be printed with a magnetic substance, such as magnetic ink, so as to be readable by both an optical reader and a magnetic reader.

Preferably, the data reader or input device includes an optical imaging reader such as a page scanner, a photograph reader, a business card reader, a scanning wand, a reader in a fax machine, a linear CCD (charge coupled device) reader, or a two-dimensional CCD reader. In response to receiving the indicia, the network access apparatus 110 links and establishes a network connection 116 to the resource. The network access apparatus 110 receives content from the resource, and displays at least a portion of the content on a display device.

Extending Usage of Available Names

InterNIC's glossary posted on the Internet defines domain name space as the sum total of domain names that currently represent networks and computers, as well as all of the possible domain names—not yet in use—which may potentially represent networks and computers. This means that registered domain names are only a part of the total name space. This definition of name space also includes the universe of domain names that do not exist as of yet.

Consider the heated political debates with respect to the so called depletion of ".com" and the struggle of lobbying for the addition of more gTLDs to the DNS (e.g., ".info", ".store", ".web", "arts", ".rec", etc.). In Fall of 1997 after years of speculation, it was expected that seven new gTLDs were to be added to the DNS in March of 1998 when the NSI contract was to originally have expired. As a result of this expectation, web sites offered pre-registration services by allowing a user to register potentially new domain names to be stored in a queue with a registration submission form forwarded on a first come first serve basis to a registrar in the event of new gTLD availability. This "pre-registration" is equivalent to the registration of a fictitious domain name demonstrating that there is at least some application for registering domain names that are not resolvable or do not yet exist.

As discussed, this invention finds immediate utilization for domain names that are not resolvable or that do not yet exist. For instance, "example.info" can be registered as a FDN. In the event, that ".info" becomes accepted as a resolvable TLD in the future then secondary use can be derived from this invention by submitting the name on behalf of the registrant at a future date to the new ".info" registry. By demonstrating plural use of the invention it is shown that there is no need for potential registrants to wait for the approval of more TLDs in the DNS by currently registering a FDN that may become a resolvable VDN at a later date.

Figure 19A:
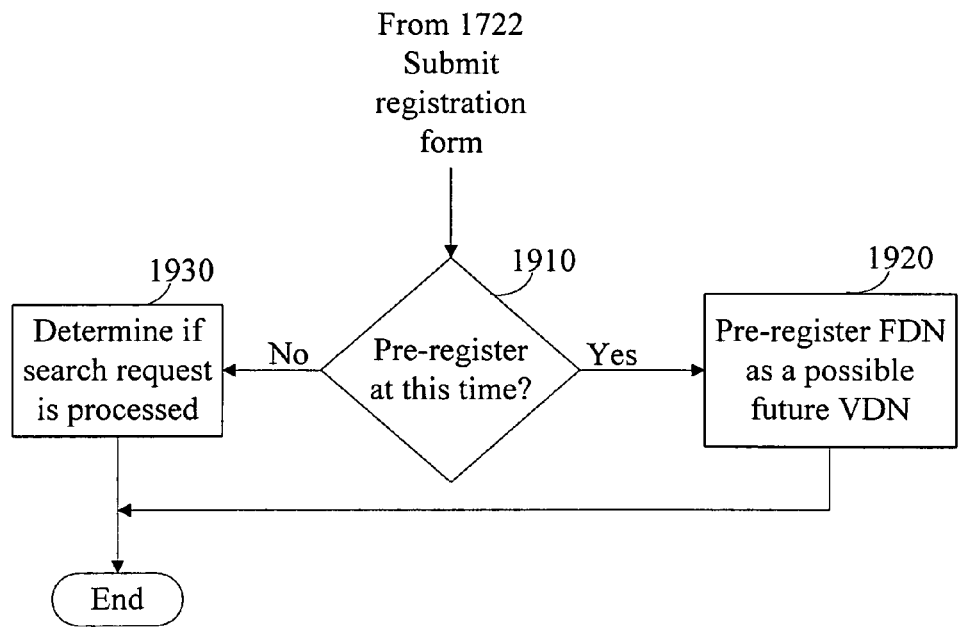
FIG. 19a is a flowchart illustrating the steps performed for pre-registering a registered FDN as a resolvable VDN at a later date in accordance with the present invention.
Figure 19B:
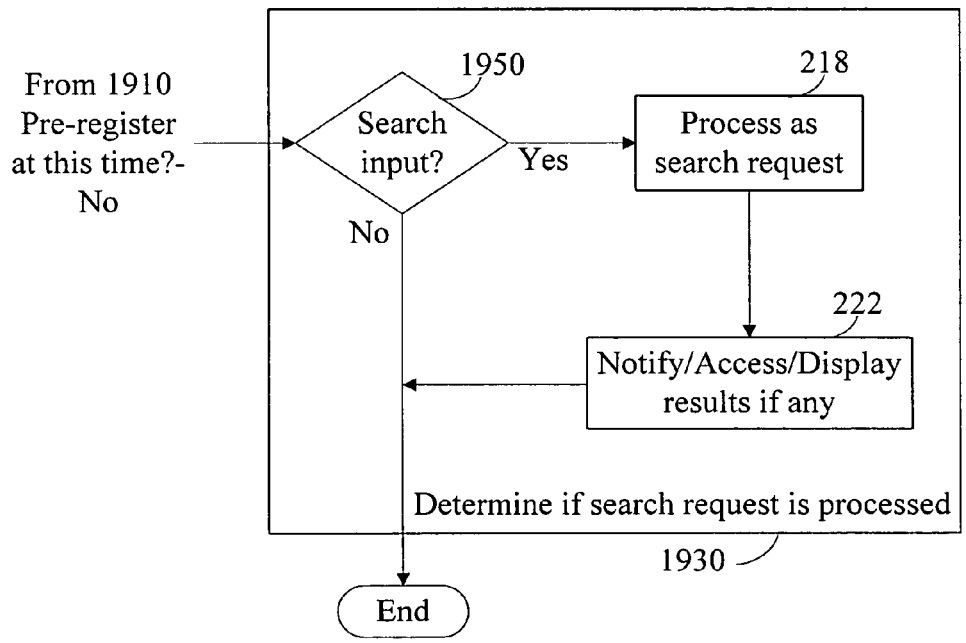
FIG. 19b is a flowchart illustrating the steps performed for further integrating registration services with search services in accordance with the present invention.

FIG. 19a illustrates the additional optional step of pre-registering a FDN as a resolvable VDN at a later date. After the registration form is successfully submitted in step 1722, it can be determined in step 1910 whether to pre-register the FDN as a potential VDN at this time. If so, then the FDN is pre-registered in step 1920 as a possible future VDN. If not, then it can be determined in step 1930 whether a search request is processed. Though not illustrated, please note that step 1930 may also be performed after step 1920. FIG. 19b illustrates whether a search request is processed (step 1930). More specifically, it can further be determined in step 1950 whether received input 210 is to be processed as a search request in step 218. When this is the case, a search request is constructed from the identifier (e.g., domain name) and processed in step 218 and results, if any, are then notified, accessed, and/or displayed in step 222.

Figure 20A:
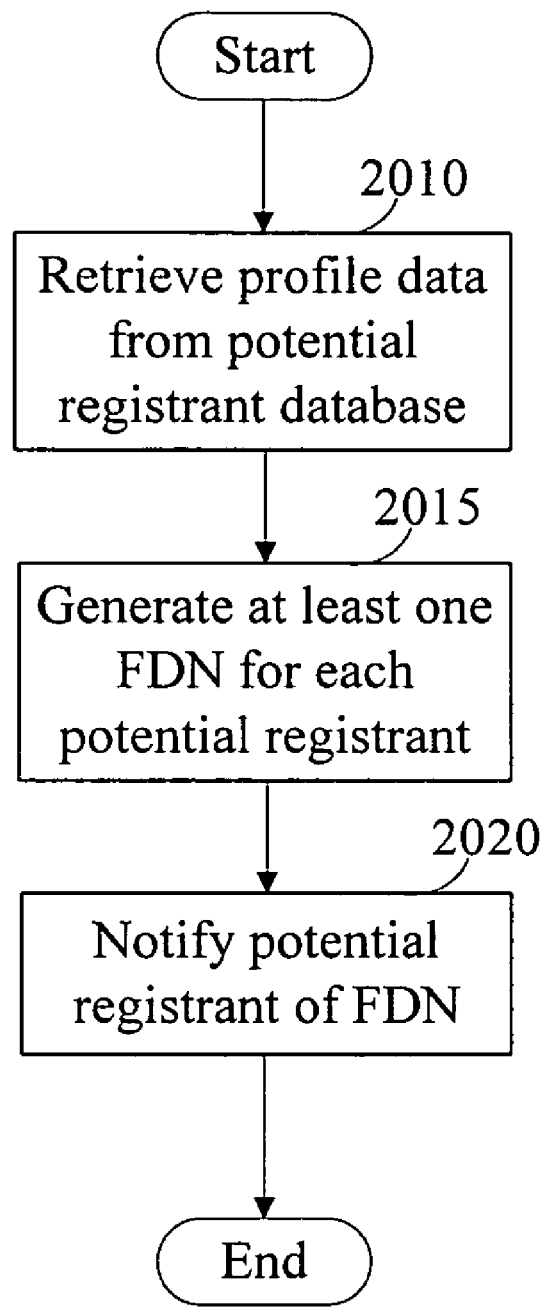
FIG. 20a is a flowchart illustrating the steps performed for providing potential registrants with personalized FDNs in accordance with the present invention.

FIG. 20a illustrates the steps for distributing generated FDNs to potential registrants. Profile data is retrieved in step 2010 from the potential registrant database 194 and a least one FDN is generated in step 2015 for each potential registrant. Potential registrants are then notified (via phone, mail, e-mail, CATV, or the like) in step 2020 of FDN availability. To encourage the immediate use of TLDA name registration, indicia such as a FDNs having a TLDA are generated, sent, and sold to potential registrants via e-mail, postal mail, and other methods of delivery. These TLDA names can be targeted or personalized to the potential registrant based on knowledge of geographic, demographic, or psychographic data. For instance, it is known that John Doe from 123 Coventry Rd. of Smithtown has a pizza shop and likes fine wine. FIG. 20b illustrates an example of how to incorporate John Doe's reserved TLDA names to better target user response of sent correspondence via letter, postcard, fax, or e-mail, telephone, television, etc. to introduce the benefits of the TLDA name experience. Adjacent to the TLDA name is machine-readable code 2030 that can be used to access the Internet for registering the TLDA name.

Figure 20C:
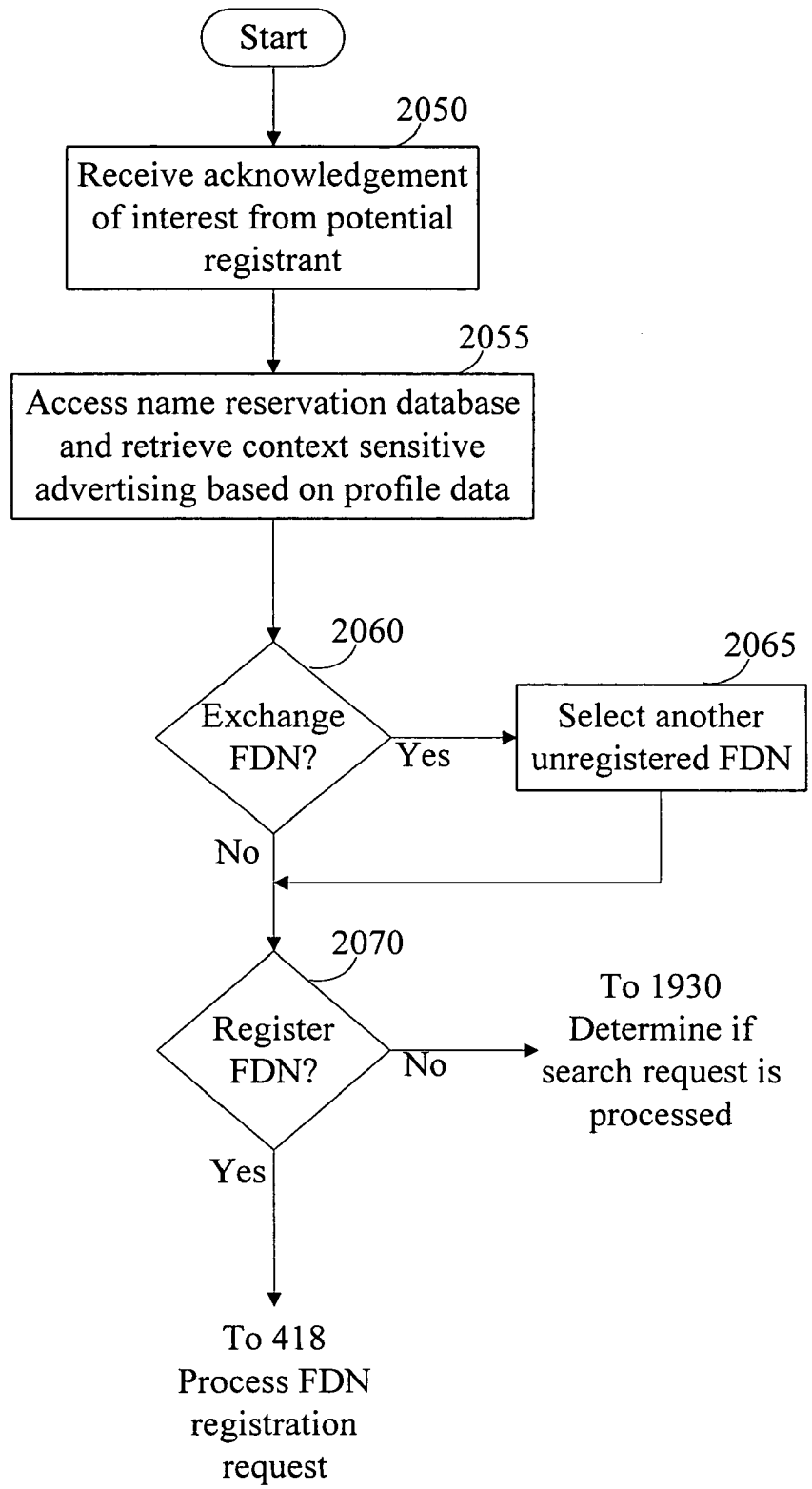
FIG. 20c is a flowchart illustrating the steps performed for exchanging and/or registering a received FDN in accordance with the present invention.

FIG. 20c illustrates how FDNs are registered in response to distributing FDNs to potential registrants. Acknowledgement of interest is received in step 2050 from potential registrant via telephone call, a hyperlink, accessing machine readable code 2030, interactive television, or the like. A name reservation database 190 can be accessed in step 2055 to retrieve context sensitive advertising from the advertising cache 192 based on profile data that can also be stored in the name reservation database 190 or accessed from the potential registrant database 194. It is then determined in step 2060 whether the potential registrant wishes to exchange the FDN for another. If so, an unregistered FDN is selected in step 2065. After selection or when no exchange is desired, it is then determined in step 2070 whether the potential registrant will register the FDN. If so, then the FDN is processed in step 418 as a registration request otherwise it is determined in step 1930 whether a search request is processed.

A telephone call can be made to notify a potential registrant of this available FDN. Suggestive selling provides the possibility to facilitate the friendly introduction to first time users of the Internet experience. The generated name might not be a first choice, but could be used to attract the user to learn more about the versatility of how FDNs can be used as identifiers such as trademarks. This offer also allows the user to redeem their generated name in exchange for one selected by the user. When a TLDA name is redeemed via telephone or web page, a name reservation database 190 can be accessed to identify who the potential registrant is and unique advertising messages 192 can then be displayed in conjunction with standard content which guides the registration process based on the potential registrant's user profile derived from geographic, demographic, and psychographic data.

Figure 21A:
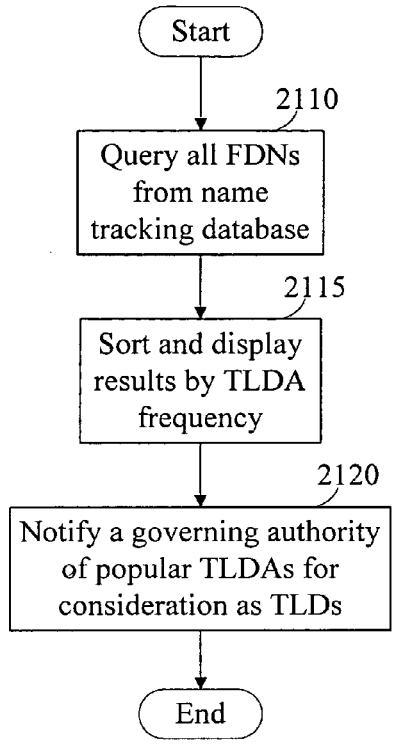
FIG. 21a is a flowchart illustrating the steps performed for notifying a governing authority of possible future TLDs in accordance with the present invention.

Further uses can be derived from both registered and unregistered FDNs. FIG. 21a illustrates how query results from the name tracking database can be used. A name tracking database 186 (or server logs) is queried by TLDA in step 2110 to rank the most frequently requested TLDAs. For instance, the query may show that there are 80,000 requests for an FDN having a ".web", 60,000 for ".info", and "50,000 for ".store" within the last month. The results of such query can then be sorted and displayed in step 2115 and used as survey data to promote statistics of what TLDAs may become possible TLDs in the future due to popular demand. This is accomplished in step 2120 by notifying a governing authority (e.g., ICANN or IANA) of popular TLDAs that may be considered as future TLDs.

Figure 21B:
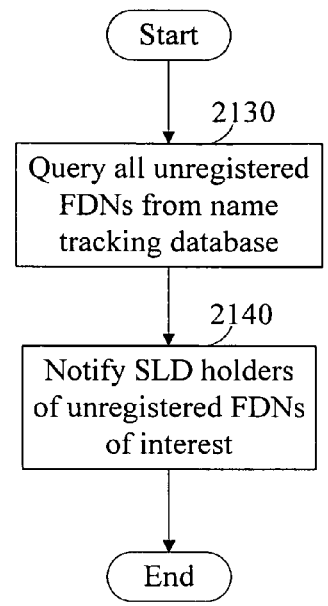
FIG. 21b is a flowchart illustrating the steps performed for notifying SLD holders of unregistered FDNs of interest in accordance with the present invention.

Another use is illustrated in FIG. 21b, where unregistered FDNs from the name tracking database 186 can be queried in step 2130 by frequency to determine public demand of popular web sites that have not yet been registered to authorize URI generation from a FDN. Competing SLD holders can be notified in step 2140 of unregistered FDNs that may be of interest. The results of such a query can be used as sales leads to contact companies and educate them about how TLDA names can be used for advertising, branding, market segmentation, and product differentiation.

Figure 21C:
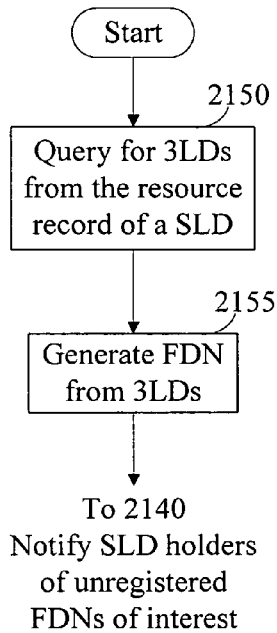
FIG. 21c is a flowchart illustrating the steps performed for generating FDNs from 3LDs of SLD holders in accordance with the present invention.

FIG. 21c illustrates another way of how FQDNs can be generated and promoted. The DNS resource record of a SLD holder is queried in step 2150 to determine what 3LDs, if any, exist for each SLD. For instance, it is determined that 3LDs such as "sports.cleveland.com" and "classifieds.cleveland.com", etc., are found when "cleveland.com" zone files are queried. TLDA names or FDNs such as "cleveland.sports" and "cleveland.classifieds" can then be generated in step 2155 from these results and such information used as sales leads for contacting each respective domain name holder and provide a personalized demonstration of how TLDA names can be used. Once again, competing SLD holders can be notified in step 2140 of unregistered FDNs that may be of interest. To the user, TLDA names simplify Internet navigation. To the corporation, TLDA names makes it simpler to promote their companies and brands on the Internet.

Other Implementations

Figure 22:
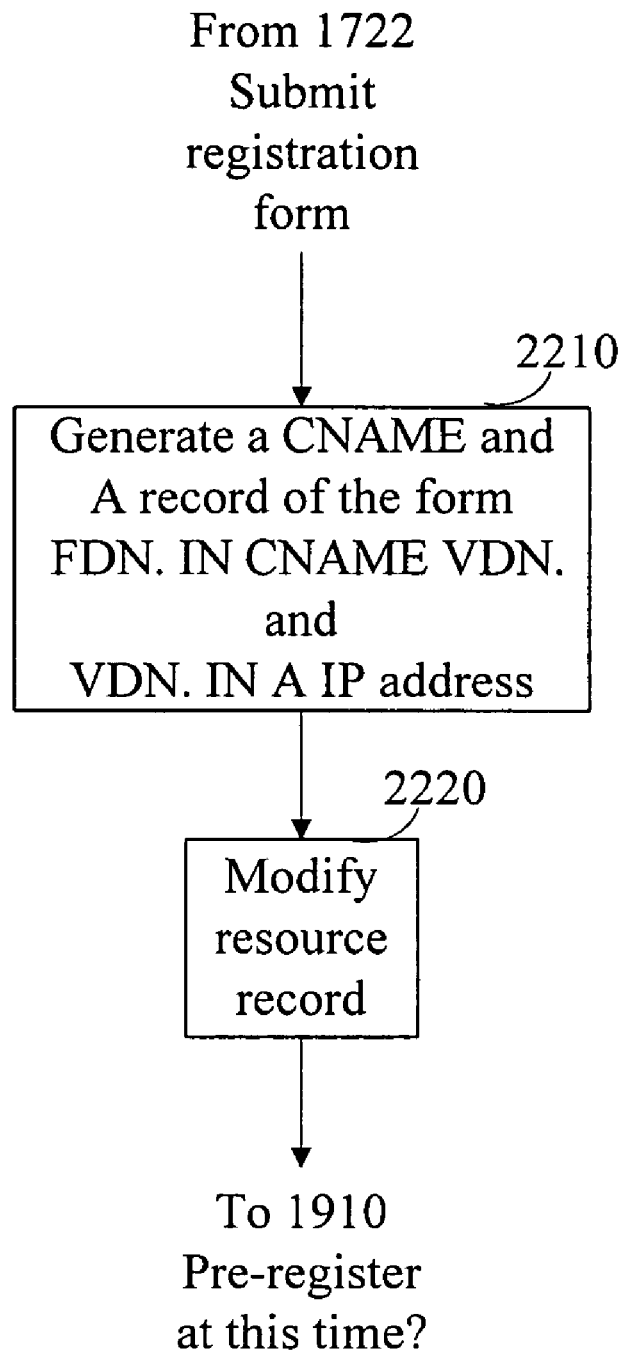
FIG. 22 is a flowchart illustrating the steps performed for emulating resolvable VDNs with FDNs in accordance with the present invention.

Similar to how (name space) VDNs provide a (topology or layer) mapping to IP addresses (address space), FDNs constitute a FDN space that serves as a (mutually exclusive) separate topology (or name space) that can be applied to or layered on top of the existing VDN space (topology) now in use. Because each and every point of VDN space can be mapped without conflict in FDN space, those skilled in the art can also modify the browser program 112 to have a FDN persist in the location field 154 instead of displaying the mapped VDN as a result of URI redirection. One example of such modification is illustrated in FIG. 22. After a registration form is successfully submitted in step 1722, a "CNAME" record of the form "FDN. IN CNAME VDN." (and "A" record) can be generated in step 2210 for insertion next to an "A" record of the form "VDN. IN A IP address". For example, the FDN "name.game" is registered to the SLD holder of "name.com" at IP address "31.141.59.26". The following "CNAME" and "A" record can then be generated:

name.game. IN CNAME game.name.com.

game.name.com. IN A 31.141.59.26

The DNS resource record 124 can be modified in step 2220 to either manually or automatically include the generated "A" and/or "CNAME" records from step 2210. An "A" record may already exist and not need to be added. After the appropriate records are added, the choice of pre-registration is determined in step 1910. The addition of these records can assist in enabling the location field to allow the FDN "name.game" to persist as an alias to the canonical name "game.name.com". This further supports name space emulation by having the FDN "behave" similar to that of a resolvable VDN, hence VDN emulation through FDNs become supported directly in the browser location field 154 rather than through the frame of a web based location field 514.

For instance, "name.game" is entered in the location field 154 of a web browser 112 and input is determined to be a registered FDN. An aspect of the present invention translates the FDN by TLDA rotation method, which is used by default to generate the VDN "game.name.com". The VDN is resolved by accessing the resource records 124 stored at "name.com". The resource records 124 validate that "name.game" is an alias to "game.name.com" and retrieves the corresponding IP address and returns the address back to the browser 112. A connection is established to the server, to access the fictitious URI "http://name.game" from the IP address corresponding to the VDN "game.name.com". Minor modifications may be needed to the browser program 112 or resolver library 114 to assure full support of such emulation. Resource records are also explained in P. Mockapetris, "RFC 1035: Domain Names—Implementation and Specification".

Those skilled in the art can make and use a computer program product separate from all others. In addition, the program may be a part of an operating system or may be a plug-in for a web browser 112. Such a program may be downloaded and installed for integration into the command line of a device or location field 154 of a browser program 112. Modifying the source code of the browser program 112 may be more desirable, in effect, enabling hundreds of millions of users to take advantage of more creative ways to use indicia such as FDNs as a means to access a network resource corresponding to a valid URI. For any of the above implementations, HLD resolvability may be determined on the client side or at any point on a network including hubs, routers, resolvers, and nameservers, etc. In addition, HLD resolvability may further reside in firmware (e.g., network card, BIOS, adapter cards, etc.).

In the case of MSIE (or other programs that use the MSIE shell), modifications can be made to the script on the server "auto.search.msn.com" that generates the "response.asp" web page and all FDNs can be processed as a search request. An extra template 188 can be created and used in the registry of the MSIE autosearch feature. When the "auto.search.msn.com" server detects that the request includes a TLDA, the extra template can be used as a means to access an authorization database, registry, name translation database, or "GO LIST", to determine how to generate a valid URI that corresponds to the received FDN having a TLDA.

By using an extra template 188, the browser program does not have to be modified, thereby eliminating distribution costs for a browser version update. For instance, when a registered FDN (e.g., "aol.love") is processed by MSIE and determined to have a TLDA, an extra name/value pair is passed generating the following URI:

"http://auto.search.msn.com/response.asp?MT=aol.love&srch=3&prov=&utf8&authorize=tlda.com"

A specific template can be accessed when the name/value pair "authorize=tlda.com" can then be parsed and passed as a variable. The fictitious domain name is inserted into the accessed template to generate the URI:

"http://www.tlda.com/cgi-bin/tlda/authorize.cgi?name=aol.love&refer=msie"

The accessed URI will authorize that "aol.love" is a registered FDN name and retrieve "TLDA rotation" as the resolution method and retrieve ".com" as the resolvable TLD, to generate the valid URI, "http://love.aol.com". The browser can be immediately redirected to the valid URI upon generation. The name/value pair "refer=msie" is parsed and passed as a variable to determine the source of the URI redirection for the purposes of billing, tracking, and accounting. Other name/value pairs can be passed as well to determine whether the output is redirected to either registration services, search services, or both, etc. In the event that "aol.love" is not authorized and remains an unregistered FDN then the FDN can be inserted into another template to generate the URI, "http://www.tlda.com/cgi-bin/tlda/register.cgi?name=aol.love&refer=msie". The browser can then be immediately redirected to the valid URI upon generation. Other templates 188 can be included and used for processing prefix/suffix delimiters, URI redirection from SLD or HLD (e.g., "acme.", ".net", or ".sports") to a corresponding vertical market directory service, using a TLDA as a customized search term (e.g., TLDA Query), using a template for each resolution method, and creating a user definable template in conjunction with specified component data at the time of registration or thereafter.

One method of implementation does not rely upon a TLD registry and instead a template can be made to use ".com" as a default TLD and use TLDA rotation or TLDA Query as a resolution method for valid URI generation. The template 188 can be distributed as part of a client and/or server side script to simplify name translation and not rely on any kind of registration. Though the template 188 does not need to rely upon an authorization database to generate valid URIs from FDNs, it is preferred that the minimum of a "GO LIST" is used to track and acknowledge name translation. Furthermore, entries of other gTLDs, can be added to override the concatenation of a default ".com" with ".edu", ".gov", ".int", and ".mil" instead. For instance, when the FDN "uspto.5987464" is received as input, an override is detected from the "GO LIST" and ".gov" is used instead to construct a URI to access U.S. Pat. No. 5,987,464 from the "uspto.gov" web site instead of and/or in addition to accessing information from "uspto.com". Other override entries may include method number/template number. In addition, the "GO LIST" may be constructed in a manner similar to DNS resource records including time-to-live (TTL) values, etc. By so doing, updates can easily be propagated in a distributed system.

In one aspect of the present invention, name tracking databases, name translation databases, or registries can be centrally maintained and updated through redundant servers. All requests can be routed to a round-robin DNS for the purposes of distributing bandwidth and load balancing across a server farm. The server farm may include dedicated servers for each database or parts of a single database that operate in parallel to assure high throughput. In other aspects the name translation databases or registries can be maintained and updates propagated in a distributed hierarchy similar to that of the DNS. The name tracking database can be enhanced by combining the data from the name translation database and storing it at the Internet Service Provider (ISP) level to act as a distributed cache for minimizing bandwidth of server requests across the backbone of the Internet. The enhanced name tracking database can also be distributed as a client side cache for even quicker access, particularly when the network is unstable or unreliable causing retrieval delays, or when a network connection is lost. A method for distributing the enhanced name tracking database is to divide the database into zone files by truncating the TLDA. For instance, "united.states" and "top.stories" can be provided in a "ST" zone file that is maintained by an authorized ISP. There are 676 two-letter zone files (zone files can be adapted and distributed to account for numeric symbols or symbols from other character sets accordingly) that could be distributed around the globe and updates can propagate through a FDN system similar to that of the DNS.

This invention may be implemented in networks and distributed systems of varying scope and scale. The registry, registration records, name translation database, or name tracking database can be located at separate sites and separate computers in a large distributed system. However, the various servers and clients described can actually be processes running on various computers and interacting to form one distributed system. In smaller implementations, some or all of the various servers described may actually be processes running on a single computer. Thus, the various servers are actually cooperating processes, and these may cooperate within a single site or computer or across distributed or networked systems.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

I claim:

1. A method comprising:
   requesting a network resource from a first identifier, the first identifier not directly corresponding to the network resource;
   determining that the first identifier is or includes a domain name having valid syntax with respect to a domain name system (DNS) but cannot be resolved by the DNS when said requesting the network resource from the first identifier;
   generating from the first identifier, a second identifier having a resolvable domain name with respect to the DNS, wherein said second identifier includes at least a portion of the first identifier and directly corresponds to the network resource; and,
   requesting the network resource from said second identifier.

2. The method, as set forth in claim 1, wherein said determining that the first identifier is or includes said domain name having valid syntax with respect to the DNS but cannot be resolved by the DNS includes determining that the first identifier includes a domain name that is determined a fictitious domain name (FDN) with respect to root of the DNS.

3. The method, as set forth in claim 1, further including inputting the first identifier from a user interface element, said user interface element including one of a browser location field, text box, command line, speech to text interface, and optical recognition interface.

4. The method, as set forth in claim 1, wherein said generating said second identifier includes generating a plurality of second identifiers and selecting said second identifier from said plurality of second identifiers.

5. The method, as set forth in claim 2, wherein the domain name includes a plurality of domain levels and further including determining that at least one domain level of said plurality of domain levels is not a resolvable domain level.

6. The method, as set forth in claim 2, wherein the domain name includes a highest level domain (HLD) and said determining that the domain name is said FDN includes determining whether said HLD is resolvable.

7. The method, as set forth in claim 6, wherein said determining whether said HLD is resolvable includes comparing said HLD to a list of resolvable top level domains (TLDs).

8. The method, as set forth in claim 7, wherein the domain name is a RFC1035 compliant domain name and said list of resolvable TLDs is a list of ICANN approved TLDs that is one of a stored in and retrieved from at least one of a client, server, DNS server, user modifiable configuration settings, operating system registry, and template.

9. The method, as set forth in claim 7, wherein said comparing said HLD to said list of resolvable TLDs includes one of a comparing said HLD without processing a DNS query, comparing said HID before processing a DNS query, comparing said HLD while processing a DNS query, and comparing said HLD after processing a DNS query.

10. The method, as set forth in claim 7, wherein said HLD that is determined resolvable is a TLD and said HLD that is determined not resolvable is a top level domain alias (TLDA).

11. The method, as set forth in claim 1, wherein said requesting the network resource from said second identifier includes resolving said second identifier.

12. The method, as set forth in claim 1, wherein said generating said second identifier includes updating a name tracking database with at least one of a first identifier and second identifier.

13. The method, as set forth in claim 1, wherein said second identifier includes a domain name having a resolvable TLD and said generating said second identifier includes determining which resolvable TLD of a list of resolvable TLDs is selected to construct said domain name from the first identifier.

14. The method, as set forth in claim 1, wherein said generating said second identifier includes determining whether said generating said second identifier is authorized.

15. The method, as set forth in claim 14, wherein said determining whether said generating said second identifier is authorized includes comparing at least one of a first identifier and domain name to at least template, GO LIST, authorization table, name translation table, and registry.

16. The method, as set forth in claim 14, further including determining whether to register for authorization in response to determining said generating said second identifier is not authorized.

17. The method, as set forth in claim 16, further including registering the domain name as a FDN for authorization when registration is chosen and determining whether to process a search request when registration is not chosen.

18. The method, as set forth in claim 17, further including pre-registering said FDN as a domain name that may at a later date become a domain name having a resolvable TLD in response to said registering the domain name as said FDN for authorization.

19. The method, as set forth in claim 17, further including determining whether to process a search request either before, during, or after processing the registration request.

20. The method, as set forth in claim 17, wherein said determining whether to process said search request includes determining if a search may be constructed from at least a portion of the first identifier.

21. The method, as set forth in claim 20, further including constructing a search from said at least a portion of the first identifier determined to allow a search, processing said search constructed from said at least a portion of the first identifier, and presenting the results of said search constructed from said at least a portion of the first identifier.

22. The method, as set forth in claim 1, wherein said generating said second identifier includes retrieving information from at least one of a user modifiable configuration settings, template, GO LIST, name translation table, and operating system registry.

23. The method, as set forth in claim 2, wherein said second identifier is a valid domain name (VDN) having a resolvable TLD that includes the domain name.

24. The method, as set forth in claim 1, wherein said generating said second identifier includes accessing a template from an autosearch.

25. The method, as set forth in claim 1, wherein said second identifier is a locatable second identifier having a resolvable domain name further including accessing a network resource from said locatable second identifier.

26. The method, as set forth in claim 25, wherein said accessing said network resource from said locatable second identifier includes translating said resolvable domain name into a corresponding IP address.

27. The method, as set forth in claim 25, wherein said accessing said network resource includes receiving content from said network resource corresponding to at least one of a first identifier and second identifier, wherein said second identifier includes at least one of a predetermined VDN and at least a portion of the first identifier.

28. The method, as set forth in claim 27, wherein said content includes at least one of a redirect command to a third identifier and advertising corresponding to the first identifier.

29. The method, as set forth in claim 1, wherein the first identifier includes a FDN, said second identifier includes a VDN having a resolvable TLD and said generating said second identifier includes selecting from at least one of a resolvable TLD, resolution method, and component data.

30. The method, as set forth in claim 29, wherein said component data is at least one of a scheme, host, domain, TLD, port, path, query, fragment, and partial uniform resource identifier (PURI).

31. The method, as set forth in claim 29, wherein said selecting said resolvable TLD includes choosing which resolvable TLD of a list of resolvable TLDs is selected to construct said VDN.

32. The method, as set forth in claim 29, wherein said selecting said resolution method includes choosing which resolution method from a table of resolution methods.

33. The method, as set forth in claim 32, wherein said table of resolution methods includes one of a rotation method, truncation method, replace method, path method, delimit method, reverse method, append method, prepend method, substitute method, query method, custom method, and namespace provider method.

34. The method, as set forth in claim 1, wherein said second identifier includes at least one of a predetermined VDN having a resolvable TLD and at least a portion of the first identifier.

35. The method, as set forth in claim 1, wherein said second identifier includes at least a portion of the first identifier and at least one of a PURI prefix and PURI suffix.

36. The method, as set forth in claim 2, further including determining that the FDN is one of a numerical FDN and FDN having a numerical TLDA.

37. The method, as set forth in claim 1, wherein said generating said second identifier includes determining that the first identifier includes a port alias, determining whether said port alias includes a resolvable TLD, generating said second identifier having said resolvable TLD in response to determining that said port alias includes a resolvable TLD, and generating said second identifier including said port alias as a query in response to determining that said port alias does not include a resolvable TLD.

38. The method, as set forth in claim 1, wherein said generating said second identifier includes generating an identifier for each resolution method from a plurality of resolution methods.

39. The method, as set forth in claim 38, further including determining the resolvability of each said generated identifier, removing all identifiers from each said generated identifier that is determined not resolvable, generating a hyperlink for each remaining identifier, and presenting at least one said generated hyperlink.

40. The method, as set forth in claim 1, wherein the first identifier includes a TLDA having a postal code and said generating said second identifier includes determining whether to process said postal code as a TLDA or search request, generating said second identifier including said postal code as a query in response to determining that said postal code is to be processed as said search request, retrieving from a postal code database one of a resolvable country code top level domain (ccTLD) and at least one subdomain corresponding to said postal code in response to determining that said postal code is to be processed as said TLDA, and generating said second identifier by replacing said TLDA of the first identifier with any retrieved subdomains and said ccTLD.

41. The method, as set forth in claim 40, wherein the first identifier includes a TLDA having a zip code is of the form "host.tlda" and said generating said second identifier includes retrieving from a zip code database at least one city and state corresponding to said zip code and generating an identifier for each retrieved said city and said state by replacing said TLDA with said city, said state, and a ".us" ccTLD, wherein each said identifier is of the form "host.city.state.us".

42. The method, as set forth in claim 40, wherein the first identifier includes a TLDA having a postal code and a port alias having a ccTLD and said generating said second identifier includes selecting said ccTLD from said port alias.

43. The method, as set forth in claim 2, further including determining that the first identifier includes at least one of a prefix delimiter, suffix delimiter, and domain name.

44. The method, as set forth in claim 43, further including requesting content from a directory service, said directory service content corresponding to the first identifier, wherein the first identifier is of one of the form ".TLD", ".TLDA", and "SLD.".

45. The method, as set forth in claim 44, wherein said directory service is a vertical market portal and said content includes advertising, sponsoring, endorsements, and branding of products and services that correspond to at least one of a first identifier and vertical market.

46. The method, as set forth in claim 43, further including determining an operative function to perform corresponding to the first identifier.

47. The method, as set forth in claim 46, wherein said determining said operative function to perform includes selecting said operative function corresponding to said prefix delimiter from one of a instant message, e-mail, phone call, fax, payment, and WHOIS request.

48. The method, as set forth in claim 2, wherein said determining that the domain name is said FDN includes determining that the domain name is a FDN without resolving the domain name.

49. The method, as set forth in claim 2, wherein said determining that the domain name is said FDN includes performing an automatic search adapted to detect said FDN.

50. The method, as set forth in claim 2, wherein said determining that the domain name is said FDN includes retrieving information from at least one of a client, server, DNS server, operating system registry, user modifiable configuration settings, template, GO LIST, and name translation table.

51. The method, as set forth in claim 1, wherein said generating said second identifier includes performing an automatic search adapted to generate said second identifier.

52. An apparatus comprising:
a processor;
a memory including a program, said memory coupled to said processor, said program configured to request a network resource from a first identifier, the first identifier not directly corresponding to the network resource, determine that the first identifier is or includes a domain name having valid syntax with respect to a domain name system (DNS) but cannot be resolved by the DNS when said requesting the network resource from the first identifier, generate from at least a portion of the first identifier, a second identifier having a resolvable domain name, wherein said second identifier includes at least a portion of the first identifier and directly corresponds to the network resource, and request the network resource from said second identifier.

53. A method comprising:
determining that a fictitious domain name (FDN) having a top level domain alias (TLDA) is available for registration as part of a FDN registry wherein said FDN includes a domain name having valid syntax with respect to a domain name system (DNS) but cannot be resolved by the DNS and said FDN is fictitious with respect to root of said DNS;
registering the FDN with the FDN registry; and,
providing the option of pre-registering the FDN to be automatically registered at a later date as a resolvable valid domain name that is not fictitious when it is determined that the TLDA has become approved as a domain name system (DNS) top level domain (TLD).

54. A method comprising:
attempting to send a message to a first email address having a first domain name;
determining that the first domain name is a fictitious domain name (FDN) with respect to a domain name system (DNS) root wherein the FDN is or includes a domain name having valid syntax with respect to a domain name system (DNS) but resolved by the DNS when said attempting to send said message to said first email address;
generating a second email address having a second domain name that is not fictitious, the second email address including at least a portion of the first email address; and,
sending the message to said second email address.

55. The method, as set forth in claim 54, wherein said generating said second email address includes retrieving information from one of a client, server, DNS server, mail proxy server, operating system registry, user modifiable configuration settings, template, GO LIST, and name translation table.

56. A fictitious identifier generation and registration method comprising:
receiving from a user a domain name wherein said domain name is resolvable with respect to a domain name system (DNS);
generating at least one available fictitious domain name (FDN) including at least a portion of said domain name, wherein said FDN is fictitious with respect to root of the DNS and said FDN includes a domain name having valid syntax with respect to the DNS but cannot be resolved by the DNS; and,
providing said user with an interface to register said at least one available FDN to at least one of a FDN registry, operating system registry, user modifiable configuration settings, template, and name translation table.

\* \* \* \* \*